(12) United States Patent
Birdwell et al.

(10) Patent No.: US 8,429,153 B2
(45) Date of Patent: Apr. 23, 2013

(54) METHOD AND APPARATUS FOR CLASSIFYING KNOWN SPECIMENS AND MEDIA USING SPECTRAL PROPERTIES AND IDENTIFYING UNKNOWN SPECIMENS AND MEDIA

(75) Inventors: John Douglas Birdwell, Oak Ridge, TN (US); Carl G. Sapp, Columbia, SC (US); Tse-wei Wang, Oak Ridge, TN (US); David J. Icove, Knoxville, TN (US); Roger Horn, Knoxville, TN (US); Mark S. Rader, Huntsville, AL (US); Dale V. Stansberry, Oak Ridge, TN (US)

(73) Assignees: The United States of America as Represented by the Secretary of the Army, Washington, DC (US); University of Tennessee Research Foundation, Knoxville, TN (US)

( * ) Notice: Subject to any disclaimer, the term of this patent is extended or adjusted under 35 U.S.C. 154(b) by 38 days.

(21) Appl. No.: 13/469,320

(22) Filed: May 11, 2012

(65) Prior Publication Data

US 2013/0054603 A1 Feb. 28, 2013

Related U.S. Application Data

(60) Provisional application No. 61/485,206, filed on May 12, 2011.

(51) Int. Cl.
*G06F 7/00* (2006.01)
*G06F 17/30* (2006.01)

(52) U.S. Cl.
USPC .............................. 707/722; 707/723; 707/737

(58) Field of Classification Search .................. None
See application file for complete search history.

(56) References Cited

U.S. PATENT DOCUMENTS

| | | | |
|---|---|---|---|
| 4,992,797 A | 2/1991 | Gjessing et al. | |
| 5,012,252 A | 4/1991 | Faulkner | |
| 5,828,334 A | 10/1998 | Deegan | |
| 6,337,654 B1 | 1/2002 | Richardson et al. | |
| 6,580,388 B1 | 6/2003 | Stoyonov et al. | |
| 7,046,192 B2 | 5/2006 | Nagel | |
| 7,127,372 B2 | 10/2006 | Boysworth | |
| 7,653,245 B2 * | 1/2010 | Love et al. | 382/190 |
| 7,945,526 B2 | 5/2011 | Birdwell et al. | |
| 8,044,798 B2 | 10/2011 | Icove et al. | |

(Continued)

OTHER PUBLICATIONS

Hierarchical Classification for Automatic Image Annotation, by Fan et al., SIGIR '07, Jul. 23-27, 2007, Amsterdam, The Netherlands.*

(Continued)

*Primary Examiner* — Jay Morrison
(74) *Attorney, Agent, or Firm* — Cameron LLP

(57) ABSTRACT

Method and apparatus for determining a metric for use in predicting properties of an unknown specimen belonging to a group of reference specimen electrical devices comprises application of a network analyzer for collecting impedance spectra for the reference specimens and determining centroids and thresholds for the group of reference specimens so that an unknown specimen may be confidently classified as a member of the reference group using the metric. If a trait is stored with the reference group of electrical device specimens, then, the trait may be predictably associated with the unknown specimen along with any traits identified with the unknown specimen associated with the reference group.

24 Claims, 34 Drawing Sheets

U.S. PATENT DOCUMENTS

| | | | |
|---|---|---|---|
| 8,140,271 | B2 | 3/2012 | Wang et al. |
| 2003/0130855 | A1* | 7/2003 | Babu et al. ................... 704/500 |
| 2003/0157525 | A1* | 8/2003 | Mintier et al. ................... 435/6 |
| 2003/0200189 | A1* | 10/2003 | Meng et al. ................... 706/26 |
| 2005/0055351 | A1* | 3/2005 | Barton et al. ................... 707/10 |
| 2005/0182712 | A1* | 8/2005 | Angell ........................... 705/39 |
| 2006/0020391 | A1* | 1/2006 | Kreiswirth et al. ............ 702/19 |
| 2006/0120411 | A1* | 6/2006 | Basu et al. ................... 370/539 |
| 2007/0011146 | A1* | 1/2007 | Holbrook ......................... 707/3 |
| 2007/0073664 | A1* | 3/2007 | Ahn ................................ 707/3 |
| 2007/0124276 | A1* | 5/2007 | Weissman et al. .............. 707/2 |
| 2007/0226640 | A1* | 9/2007 | Holbrook et al. ............ 715/765 |
| 2007/0271278 | A1* | 11/2007 | Acharya ....................... 707/100 |
| 2007/0282827 | A1* | 12/2007 | Levin ............................. 707/5 |
| 2009/0030864 | A1* | 1/2009 | Pednault et al. ............... 706/45 |
| 2009/0144122 | A1* | 6/2009 | Ginsberg et al. .............. 705/10 |
| 2009/0177496 | A1* | 7/2009 | Tuck et al. ...................... 705/3 |
| 2009/0228245 | A1 | 9/2009 | Gilbert et al. |

OTHER PUBLICATIONS

J. D. Birdwell and B. C. Moore, chapter title: "Condensation of Information from Signals for Process Modeling and Control," Hybrid Systems II, Springer, Berlin/Heidelberg, 1995, pp. 45-63.

K. Anchukaitis and S. P. Horn, A 2000-year reconstruction of forest disturbance from southern Pacific Costa Rica, Palaeogeography, Palaeoclimatology, Palaeoecology 221 (2005), pp. 35-54.

F. Aurenhammer, "Voronoi diagrams: a survey of a fundamental geometric data structure," ACM Comp. Surveys (CSUR), 23 (3) 1991, pp. 345-405.

Bengea et al., "Optimal Control of Switching Systems," Automatica 41, (2005), pp. 11-27.

Bengea et al., Optimal and Suboptimal Control of Switching Systems, Proceedings of the 42nd IEEE Conference on Decision and Control, (2003), pp. 5295-5300.

S. Benson, C. Lennard, P. Maynard, and C. Roux, "Forensic applications of isotope ratio mass spectrometry—a review," Forensic Science International 157, (2006), pp. 1-22.

S. Boyd et al., Linear Matrix Inequalities in System and Control Theory, Society for Industrial Mathematics (1997), ISBN 978-0898714852.

S. P. Boyd et al., "A new CAD method and associated architectures for linear controllers," IEEE Transactions on Automatic Control, 33 (1988), pp. 268-283.

W. A. Burkhard and R. M. Keller, "Some approaches to best-match file searching," Comm. ACM, 16 (4) 1973, pp. 230-236.

R. C. Elston and J. Stewart, A General Model for the Genetic Analysis of Pedigree Data, Human Heredity 21 (1971), pp. 523-542.

C. E. Garcia and A. M. Morshedi, Quadratic programming solution of dynamic matrix control (QDMC), Chemical Engineering Communications, 46 (1986), pp. 73-87.

D. G. Gavin, W. W. Oswald, E. R. Wahl, and J. W. Williams, "A statistical approach to evaluating distance metrics and analog assignments for pollen records," Quaternary Research, vol. 60, pp. 356-367, Nov. 2003.

K. A. Haberyan, S. P. Horn, and B. F. Cumming, "Diatom assemblages from Costa Rican lakes: An initial ecological assessment," Journal of Paleolimnology 17 (1997), pp. 263-274.

Z. Huang, "Extensions to the k-means Algorithm for Clustering Large Data Sets with Categorical Values," Data Mining and Knowledge Discovery 2, (1998), pp. 283-304.

L. M. Kennedy, S.P. Horn, and K. H. Orvis, "A 4000-yr record of fire and forest history from Valle de Bao, Cordillera Central, Dominican Republic," Palaeogeography, Palaeoecology, Palaeoclimatology 231 (1996), pp. 279-290.

G. N. Lance and W. T. Williams, "Computer programs for hierarchical polythetic classification ("similarity analyses")," Computer Journal, vol. 9, pp. 60-64, 1966.

Z. Shen, Database Similarity Search in Metric Spaces: Limitations and Opportunities, MS Thesis, Electrical Engineering, University of Tennessee, Aug. 2004.

Paul Jaccard, "The distribution of the Flora in the Alpine Zone," The New Phytologist, Feb. 1912, pp. 37-50.

P. C. Mahalanobis, "On the generalised distance in statistics," Proceedings of the National Institute of Science, India, vol. 2, pp. 49-55, Apr. 1936.

M. McGill, "An evaluation of factors affecting document ranking by information retrieval systems," tech. rep., Syracuse Univ., N. Y. School of Information Studies, Oct. 1979.

T. Noreault, M. McGill, and M. B. Koll, "A performance evaluation of similarity measures, document term weighting schemes and representations in a boolean environment," in Proceedings of the 3rd annual ACM conference on Research and development in information retrieval, (Cambridge, England), pp. 57-76, Jun. 1980.

J. T. Overpeck, T. Webb, and I. C. Prentice, "Quantitative interpretation of fossil pollen spectra: Dissimilarity coefficients and the method of modern analogs," Quaternary Research, vol. 23, pp. 87-108, Jan. 1985.

Y. Pan, J. D. Birdwell and S. M. Djouadi, "Preferential image segmentation using trees of shapes," IEEE Trans. Image Processing, 18 (2009), pp. 854-866.

E. Puryear, D. Angulo, A. Schilling, K. Drew, and G. von Laszewski, "Comparing mass spectra," pp. 1-7, 2006.

K. Reitsma and J. Sagalyn, "Correlation measures," Information Storage and Retrieval, vol. 13, p. Ch. IV, 1967. vol. 13, pp. Ch. IV-1-30, 1967.

K. X. Wan, I. Vidaysky, and M. L. Gross, "Comparing similar spectra: From similarity index to spectral contrast angle," Journal of The American Society for Mass Spectrometry, vol. 13, pp. 85-88, 2002.

P. Yianilos, "Data structures and algorithms for nearest neighbor search in general metric spaces," Proc. of the 4th Annual ACM-SIAM Symp. On Discrete Algorithms, Austin, TX, 1993, pp. 311-321.

W. L. G. Koontz, P. M. Narendra, and K. Fukunaga, "A branch and bound clustering algorithm," IEEE Trans. Comp., C 24, 1975, pp. 908-915.

L. A. Milne, V. M. Bryant Jr., and D. C. Mildenhall, "Forensic palynology," in Forensic Botany: Principles and Applications to Criminal Casework, H. M. Coyle (ed.), CRC Press, Boca Raton, FL, 2005, pp. 217-252.

B. Moerdyk et al., "Hybrid optimal control for load balancing in a cluster of computer nodes," Proc. of the 2006 IEEE Int. Conf. on Control Applications (2006), pp. 1713-1718.

M. Morari and J. H. Lee, "Model predictive control: past, present and future," Computers and Chemical Engineering 23 (1999), pp. 667-682.

A. Oakly, "A Database Management System for Vision Applications," Proceedings of the Conference on British Machine Vision, vol. 2, (1994), pp. 629-639.

Y. Pan, Image Segmentation using PDE, Variational, Morphological and Probabilistic Methods, PhD Dissertation, Electrical Engineering, University of Tennessee, Dec. 2007.

M. H. Plawecki et al., "Improved transformation of morphometric measurements for a priori parameter estimation in a physiologically-based pharmacokinetic model of ethanol," Biomed Signal Process Control 2 (2007), pp. 97-110.

J. Ross Quinlan, "Induction of decision trees," Machine Learning 1, (1986), pp. 81-106.

D. J. Rogers and T. T. Tanimoto, "A computer program for classifying plants," Science, vol. 132, No. 3434, pp. 1115-1118, 1960.

C. Shen, K.-B. Liu, L. Tang, and J. T. Overpeck, "Numerical analysis of modern and fossil pollen data from the Tibetan Plateau," Annals of the Association of American Geographers 98 (2008), pp. 755-772.

J. T. Tou and R. C. Gonzalez, Pattern Recognition Principles, Addison-Wesley, Reading, MA, 1981 printing.

S. Wei et al., "Applications of numerical optimal control to nonlinear hybrid systems," Nonlinear Analysis: Hybrid Systems 1 (2007), pp. 264-279.

\* cited by examiner

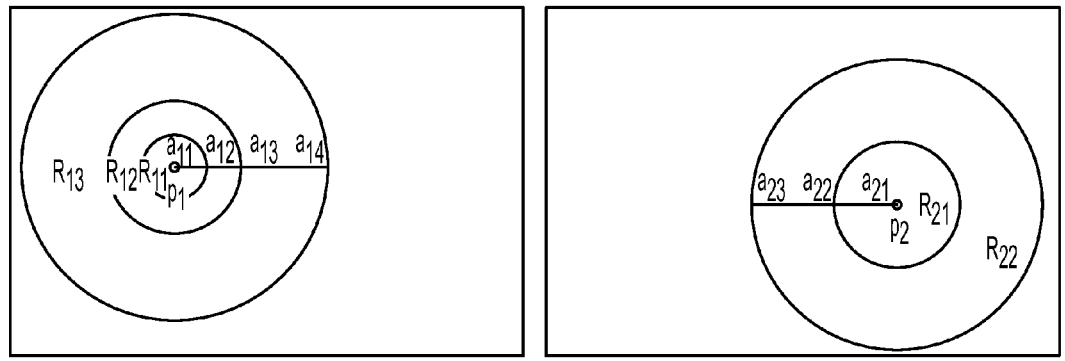
PARTITION AT LEVEL 1
FIG. 5a
PARTITION AT LEVEL 2
FIG. 5b
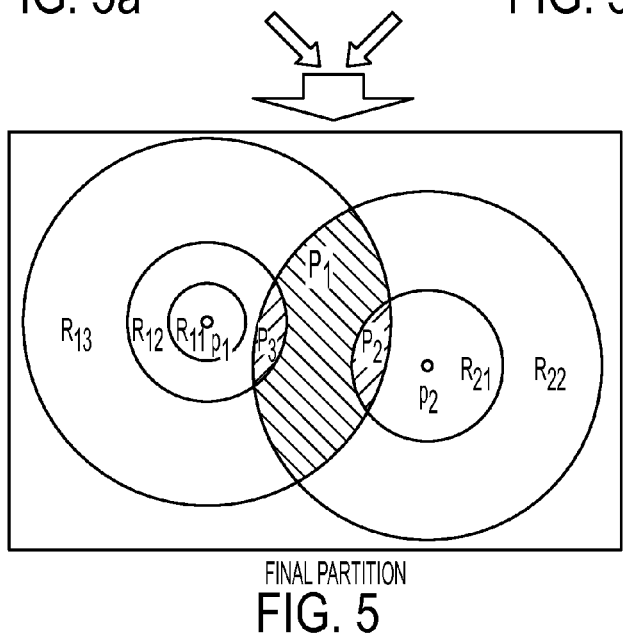
FINAL PARTITION
FIG. 5

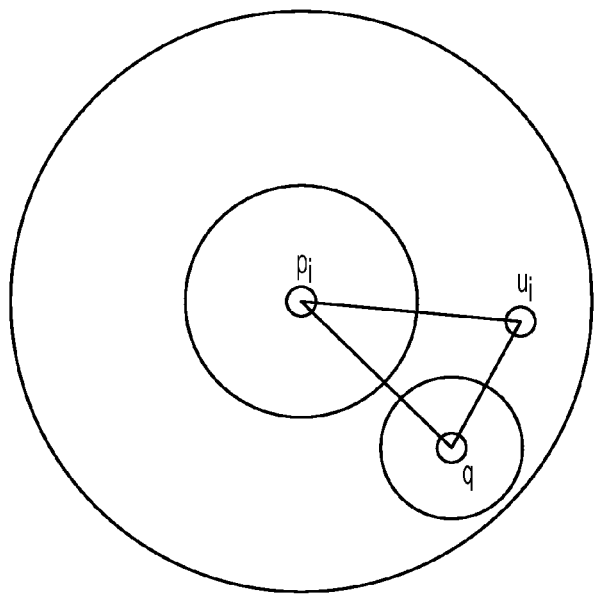
FIG. 6
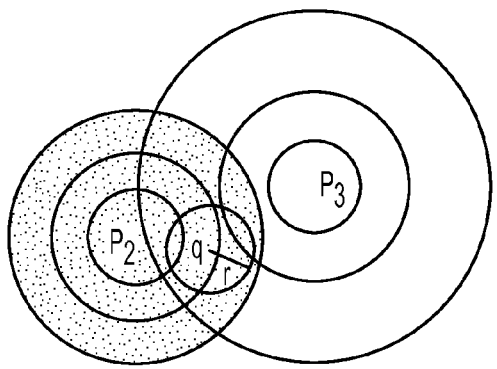
FIG. 7a
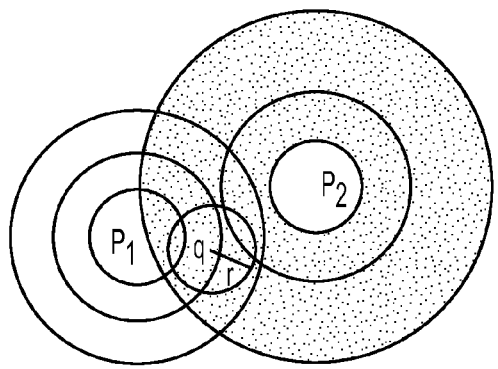
FIG. 7b
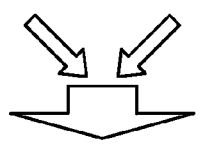
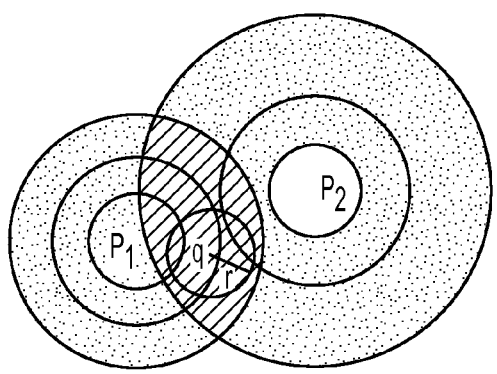
FIG. 7c

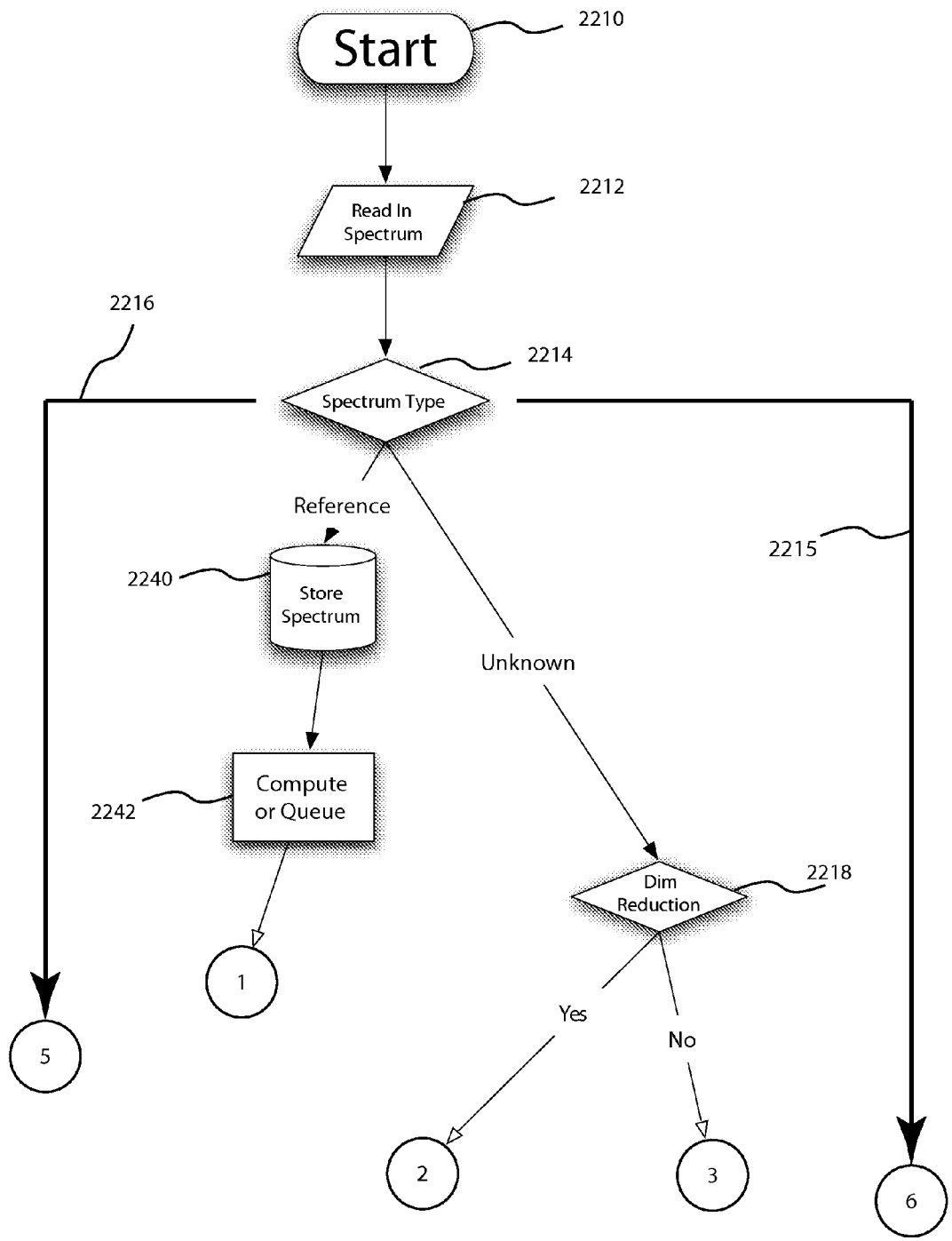
FIG. 22A Flowchart - Part A

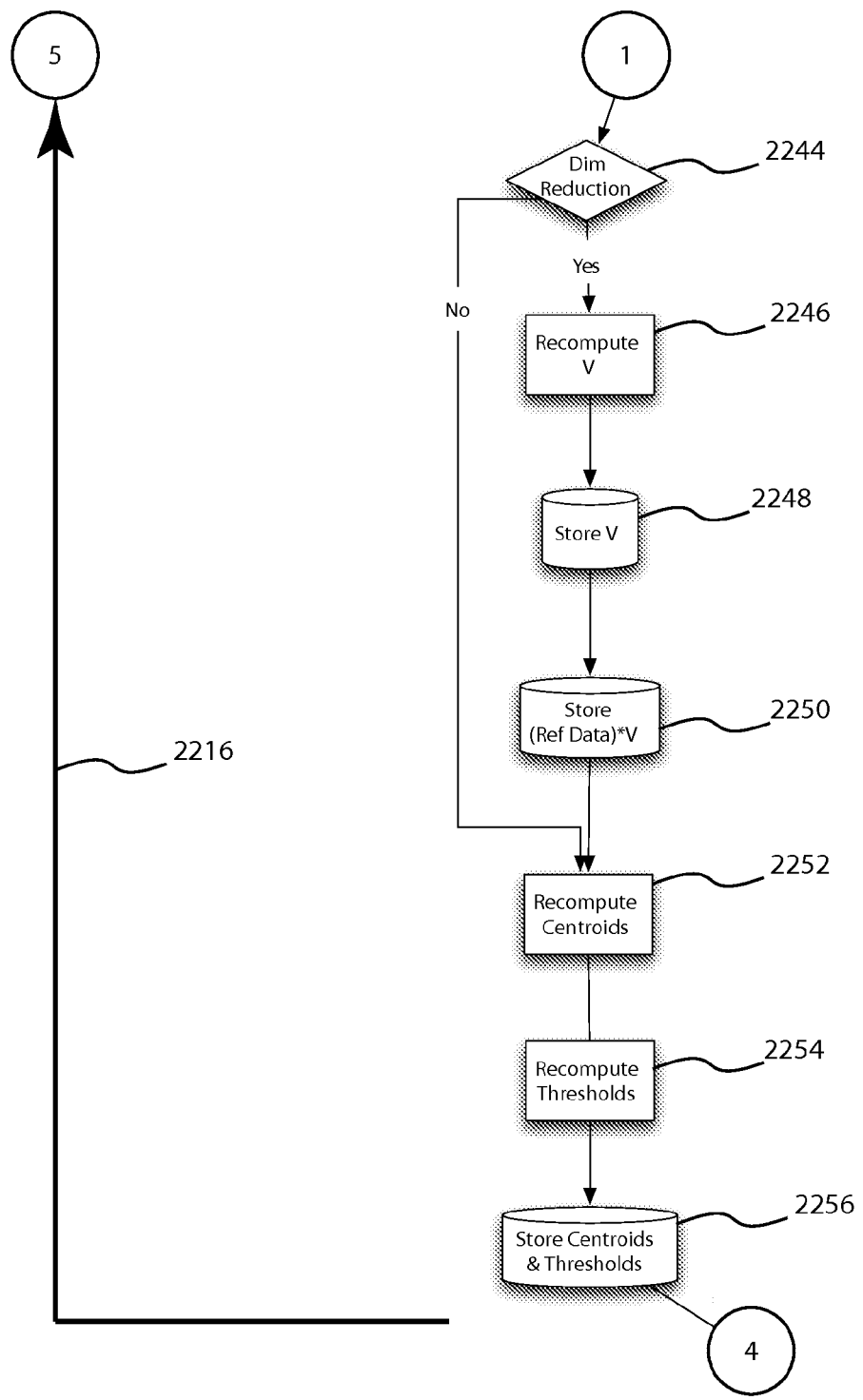
FIG. 22B Flowchart - Part B

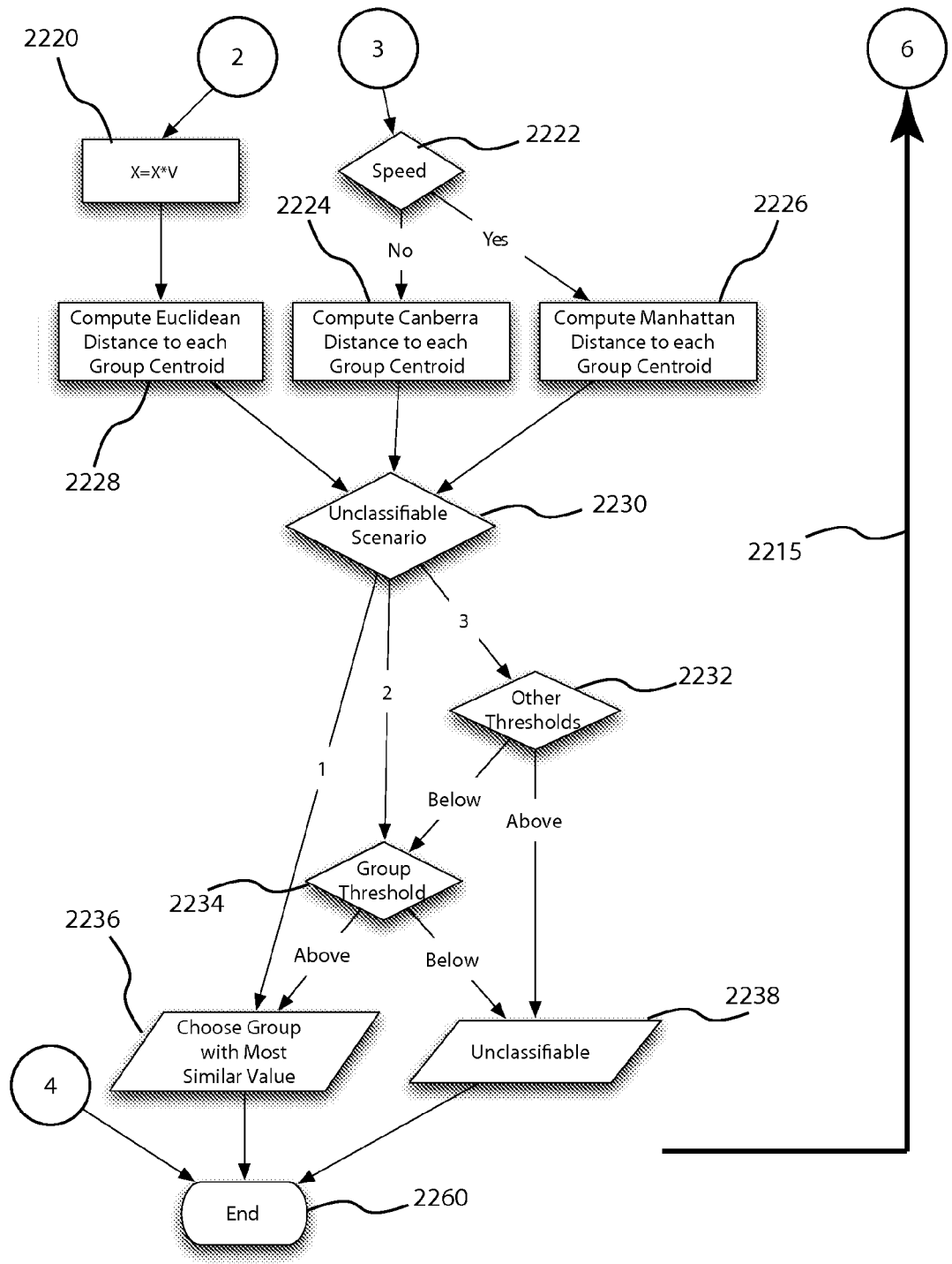
FIG. 22C Flowchart - Part C (A) Exemplary Equivalent Circuit $$Z = (A)s^7 + (B)s^6 + (C)s^5 + (D)s^4 + (E)s^3 + (F)s^2 + (G)s + (H)$$

(B) Exemplary 7th or Higher Order Polynomial Equation

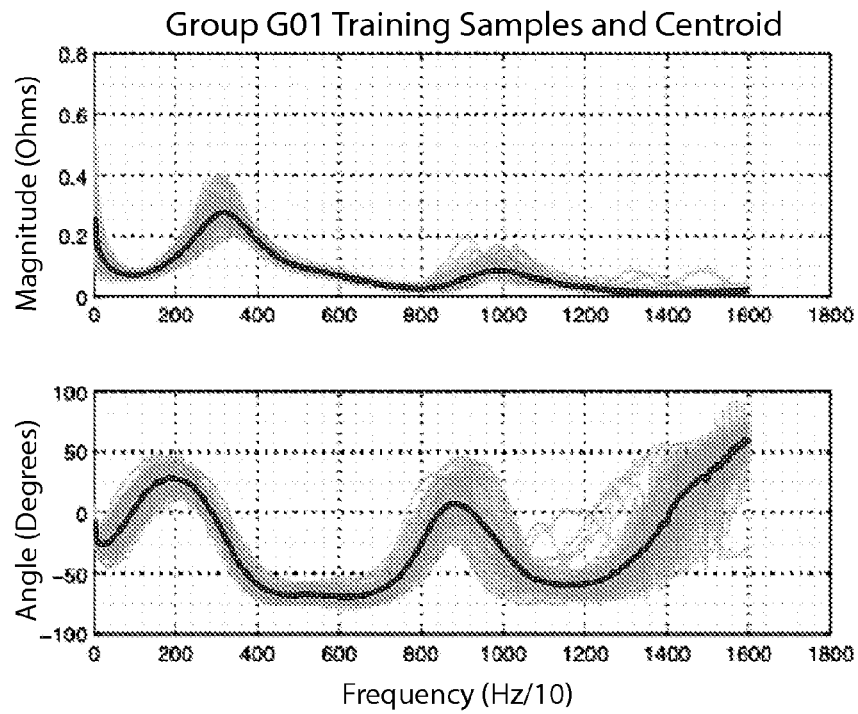
FIG. 24 Training Group Centroids for Group G01
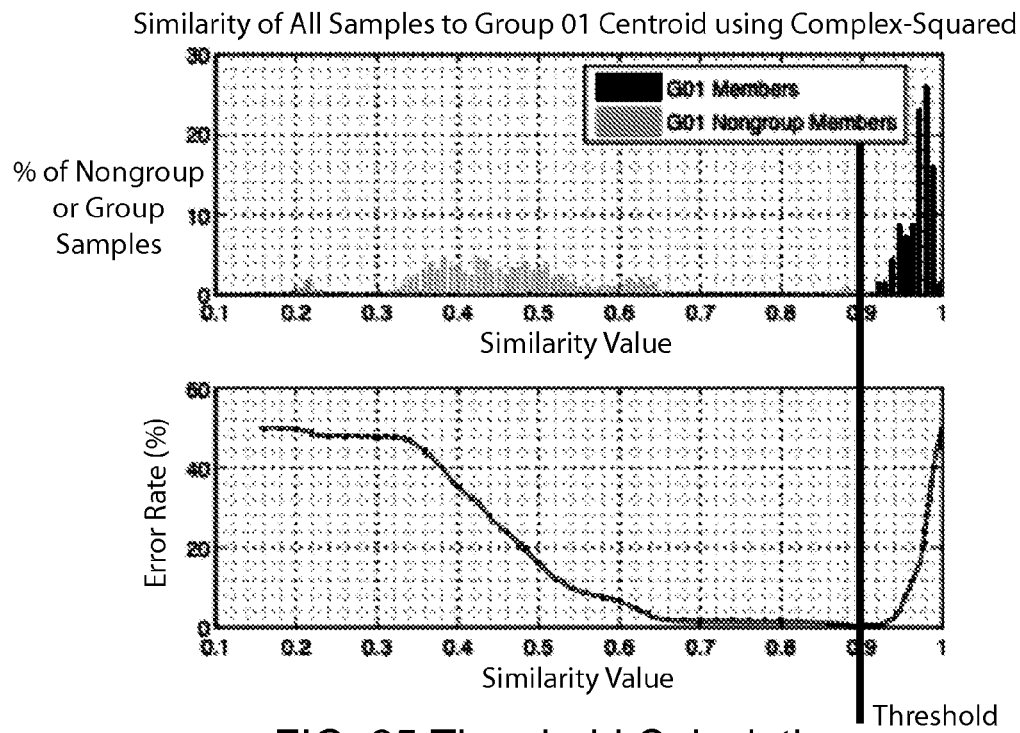
FIG. 25 Threshold Calculation

| Metric | Correctly Classified | Incorrectly Classified | Unclassifiable |
|---|---|---|---|
| Canberra | 640 (87%) | 97 (13%) | 0 (0%) |
| Manhattan | 624 (85%) | 113 (15%) | 0 (0%) |
| Similarity Index | 622 (84%) | 115 (16%) | 0 (0%) |
| Cosine | 597 (81%) | 140 (19%) | 0 (0%) |
| Euclidean | 596 (81%) | 141 (19%) | 0 (0%) |
| Coe of Divergence | 594 (81%) | 143 (19%) | 0 (0%) |
| Overlap | 590 (80%) | 147 (20%) | 0 (0%) |
| Mahalanobis | 518 (70%) | 219 (30%) | 0 (0%) |
| Squared Chord | 503 (68%) | 234 (32%) | 0 (0%) |
| Inner Product | 479 (65%) | 258 (35%) | 0 (0%) |
| Average | 372 (50%) | 365 (50%) | 0 (0%) |
| Avg Weight | 206 (28%) | 531 (72%) | 0 (0%) |
| Tanimoto's | 231 (31%) | 506 (69%) | 0 (0%) |
| Mod Bool Correlat | 206 (28%) | 531 (72%) | 0 (0%) |

FIG. 26 Scenario 1

| Metric | Correctly Classified | Incorrectly Classified | Unclassifiable |
| --- | --- | --- | --- |
| Canberra | 631 (86%) | 87 (12%) | 19 (2%) |
| Manhattan | 617 (84%) | 107 (14%) | 13 (2%) |
| Similarity Index | 620 (84%) | 107 (15%) | 10 (1%) |
| Cosine | 588 (80%) | 130 (18%) | 19 (2%) |
| Euclidean | 590 (80%) | 133 (18%) | 14 (2%) |
| Coe of Divergence | 588 (80%) | 122 (16%) | 27 (4%) |
| Overlap | 583 (79%) | 126 (17%) | 28 (4%) |
| Mahalanobis | 545 (74%) | 172 (23%) | 20 (3%) |
| Squared Chord | 482 (65%) | 214 (29%) | 41 (6%) |
| Inner Product | 467 (63%) | 76 (10%) | 194 (26%) |
| Average | 347 (47%) | 350 (48%) | 40 (5%) |
| Avg Weight | 205 (28%) | 61 (8%) | 471 (64%) |
| Tanimoto's | 217 (29%) | 492 (67%) | 28 (4%) |
| Mod Bool Correlat | 200 (27%) | 46 (6%) | 491 (67%) |

FIG. 27 Scenario 2

| Metric | Correctly Classified | Incorrectly Classified | Unclassifiable |
| --- | --- | --- | --- |
| Canberra | 424 (58%) | 3 (0.4%) | 310 (42%) |
| Manhattan | 378 (51%) | 5 (1%) | 354 (48%) |
| Cosine | 382 (52%) | 2 (0.3%) | 353 (48%) |
| Euclidean | 243 (33%) | 3 (0.4%) | 491 (67%) |
| Similarity Index | 332 (45%) | 4 (1%) | 401 (54%) |
| Overlap | 346 (47%) | 6 (1%) | 385 (52%) |
| Coe of Divergence | 373 (51%) | 2 (0.3%) | 362 (49%) |
| Squared Chord | 283 (39%) | 10 (1%) | 444 (60%) |
| Inner Product | 25 (3%) | 0 (0%) | 712 (97%) |
| Mahalanobis | 307 (42%) | 7 (1%) | 423 (57%) |
| Average | 37 (5%) | 2 (0.3%) | 698 (95%) |
| Avg Weight | 0 (0%) | 0 (0%) | 737 (100%) |
| Tanimoto's | 71 (10%) | 3 (0.4%) | 663 (90%) |
| Mod Bool Correlat | 0 (0%) | 0 (0%) | 737 (100%) |

FIG. 28 Scenario 3

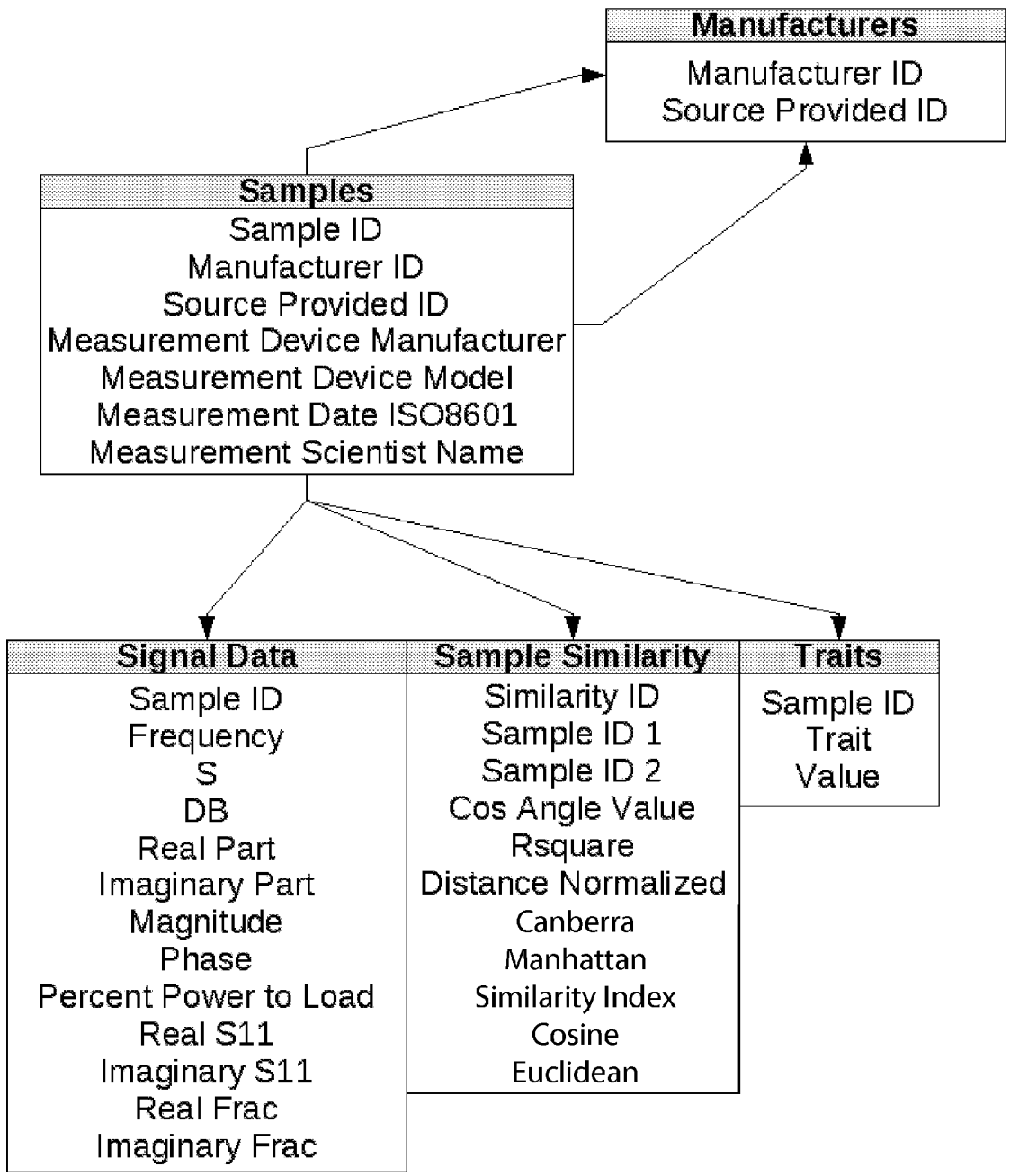
FIG.29 ESD Structure

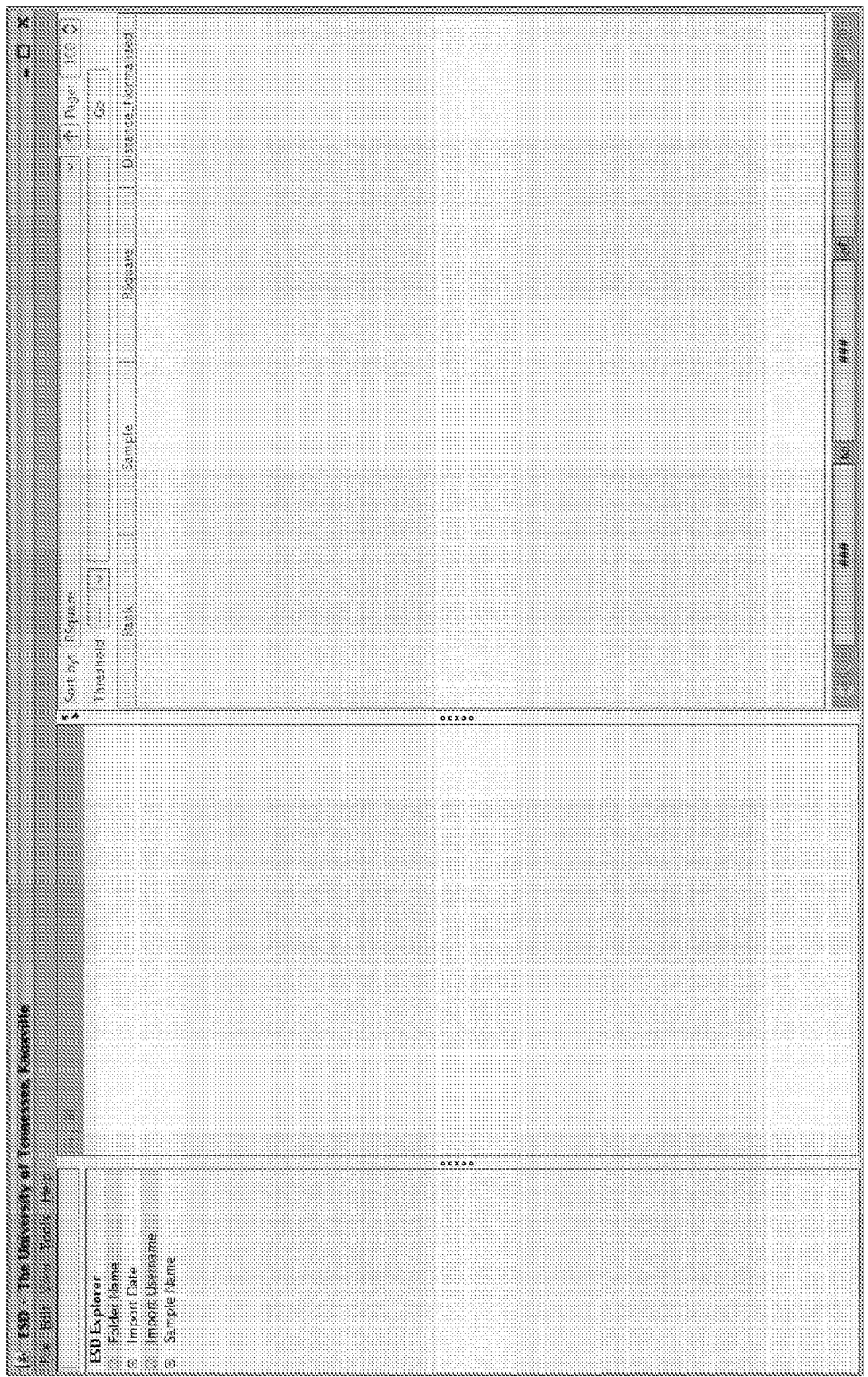
FIG. 30 Main GUI Screen

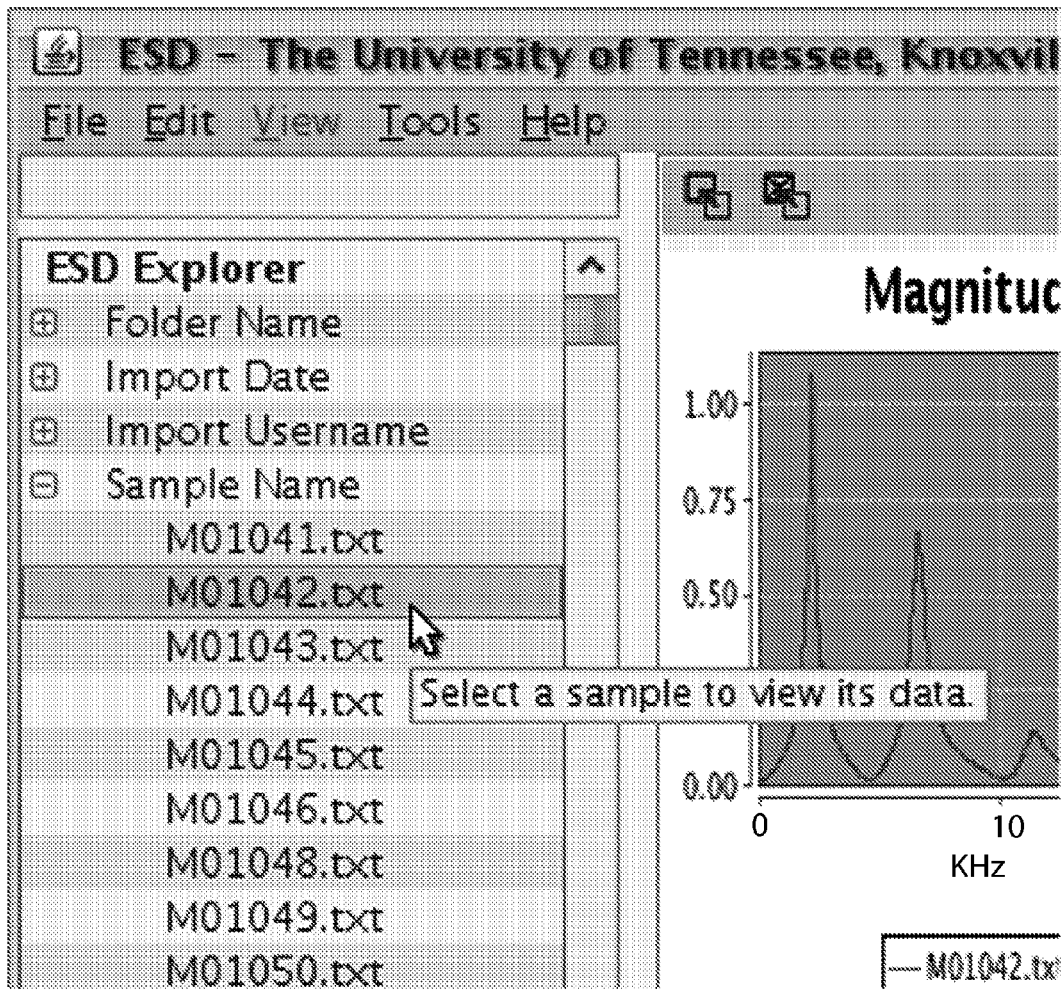
FIG. 31 View a Sample
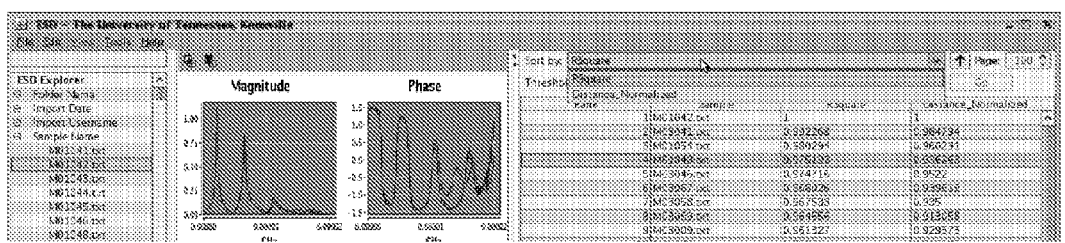
FIG. 32 (Pick a Metric)

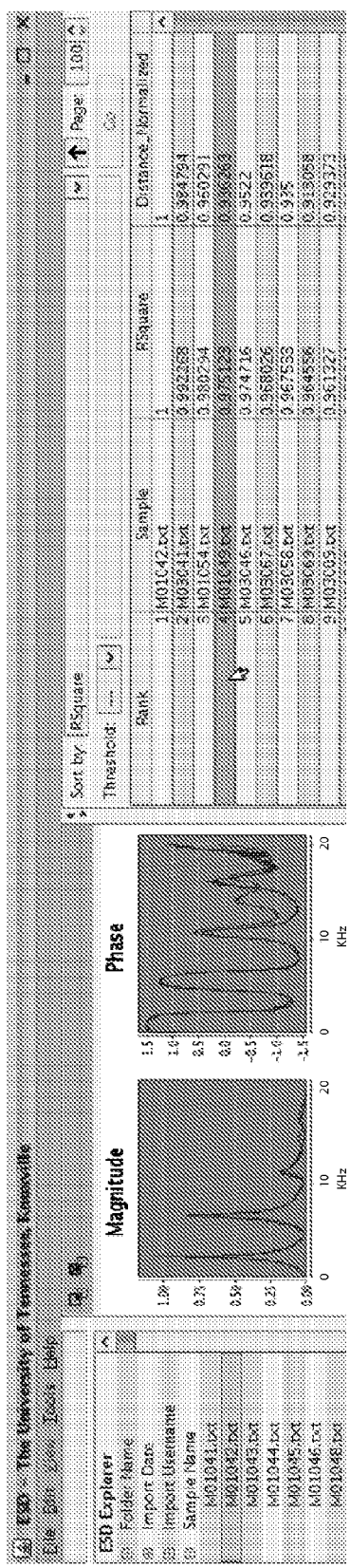
FIG. 33 (Pages up/down)
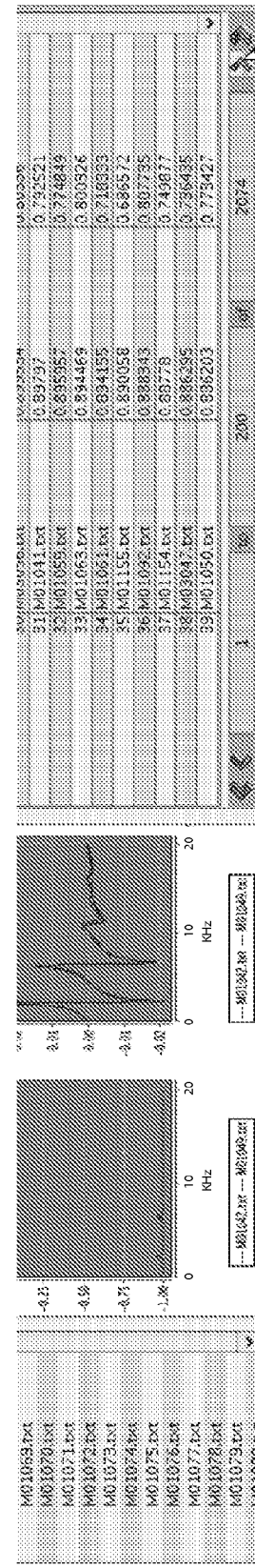
FIG. 34 Page Navigation

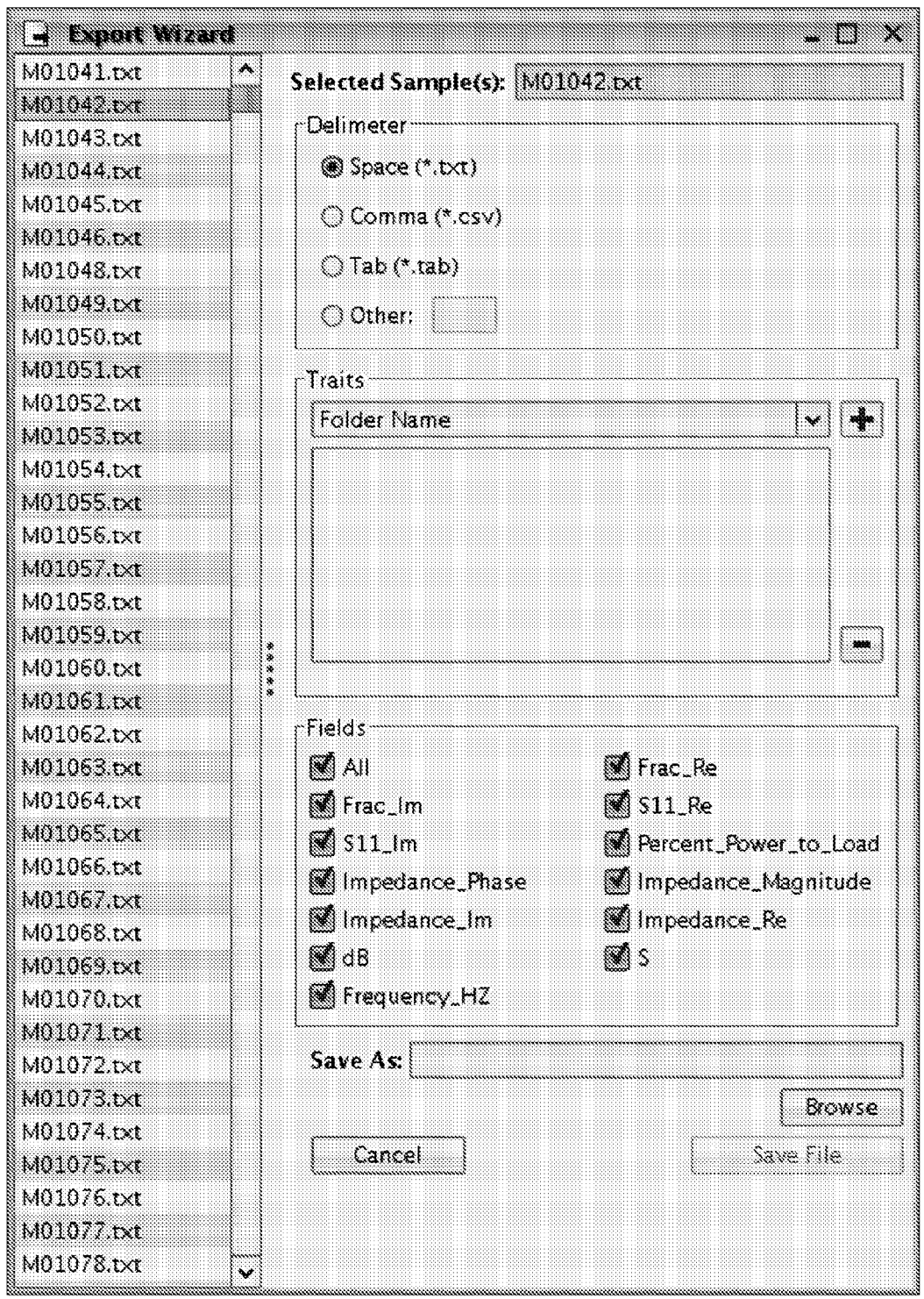
FIG.35 Export Wizard

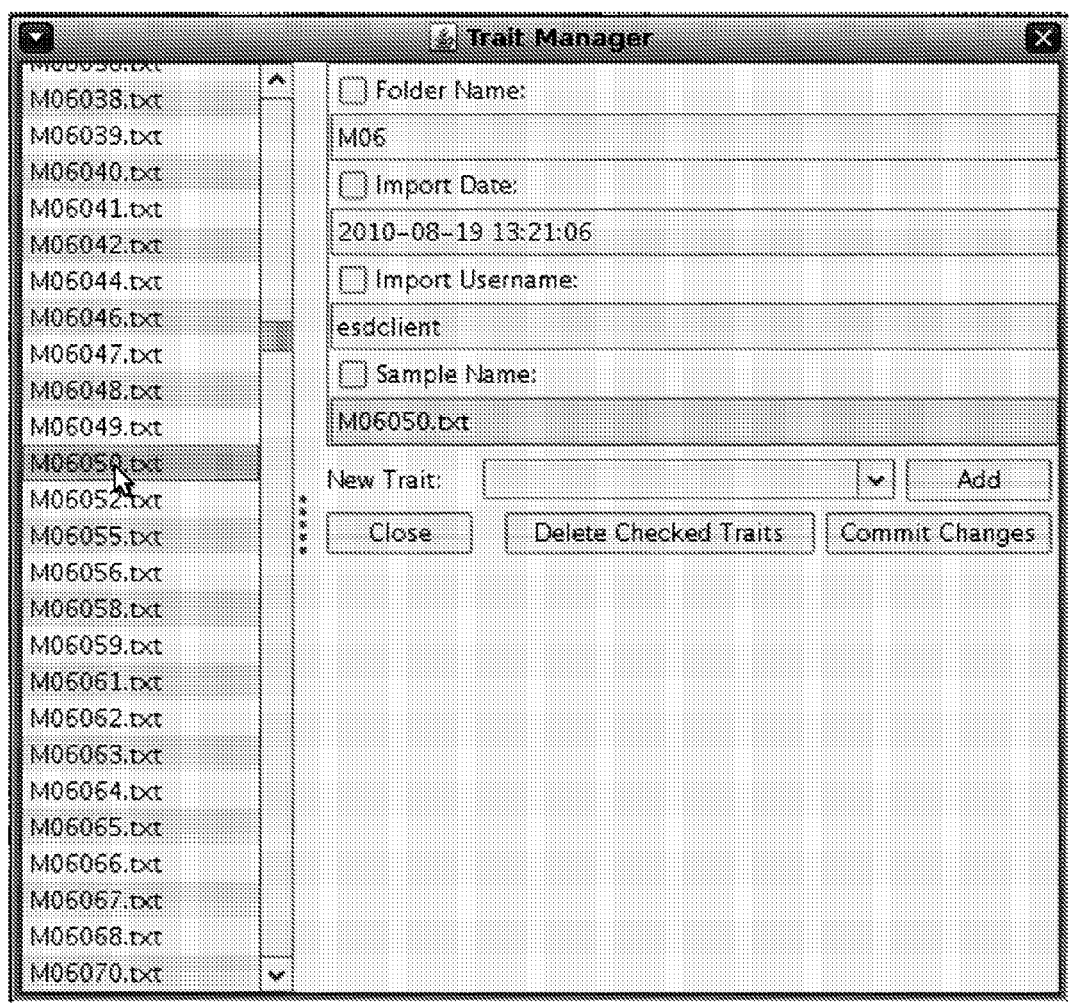
FIG.36 Trait Manager

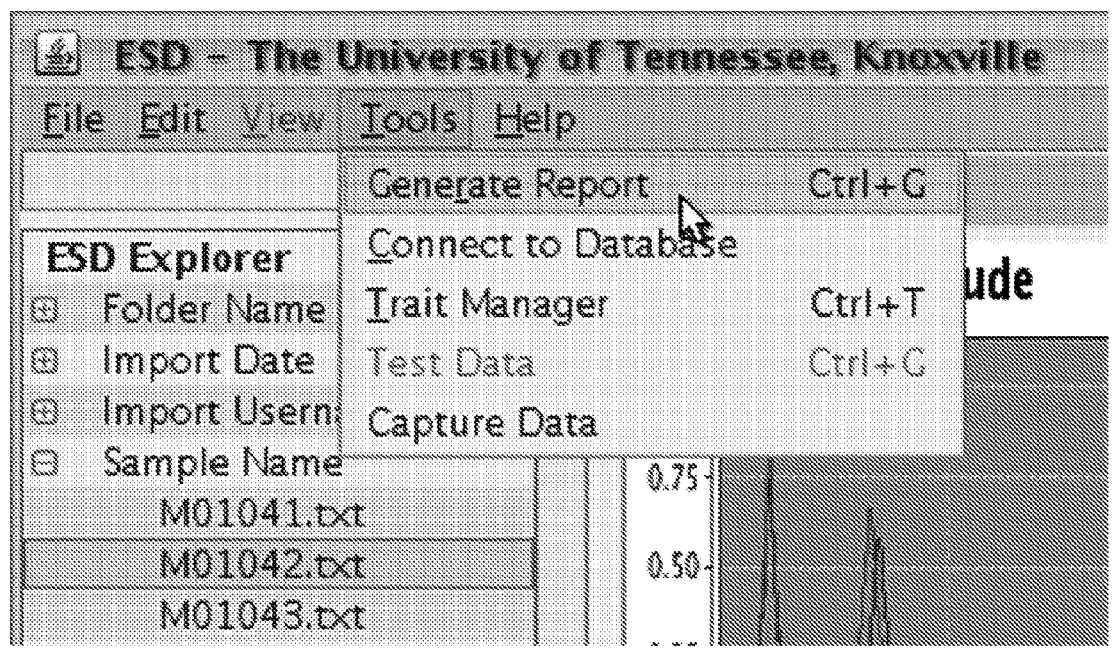
FIG.37 (Report Generator)

FIG.38 Report Formatter

METHOD AND APPARATUS FOR CLASSIFYING KNOWN SPECIMENS AND MEDIA USING SPECTRAL PROPERTIES AND IDENTIFYING UNKNOWN SPECIMENS AND MEDIA

This application is a continuation-in-part of U.S. patent application Ser. No. 12/823,303 filed Jun. 25, 2010 and claims priority to provisional U.S. Application Ser. No. 61/485,206 filed May 12, 2011, the entire disclosures of which are hereby incorporated by reference into the present application.

This invention was made with U.S. Government support under contract W9113-09-C-0188 awarded by U.S. Army Space and Missile Defense Command/U.S. Army Forces Strategic Command. The U.S. Government has certain rights in the invention.

TECHNICAL FIELD

The technical field relates to a method and apparatus for classifying specimens and media using spectral properties and identifying unknown specimens and media having like spectral properties and, in particular, to the application of a spectral property database having one or more data values representative of spectral properties such as magnitude, phase or complex values sampled at discrete values of time, frequency, wavelength, energy or other scalar quantity to form such a database, having tested thirteen different similarity metrics and determined the five best performing similarity metrics for classification and identification, which may be used identify unknown specimens and media and determine further specimen and media properties or traits therefrom.

BACKGROUND AND RELATED ARTS

Database systems and search and retrieval from such databases are known. For example, U.S. Pat. No. 6,778,995 to Gallivan describes a system and method for efficiently generating cluster groupings in a multi-dimensional concept space. A plurality of terms are extracted from documents of a collection of stored, unstructured documents. A concept space is built over the collection and terms correlated between documents such that a vector may be mapped for each correlated term. Referring to FIG. 14 of the '995 patent, a cluster is populated with documents having vector differences falling within a predetermined variance such that a view may be generated of overlapping clusters.

Much research has been conducted for military and related purposes in the field of target signature recognition via sonar and radar or by related spectral data identification. U.S. Pat. Nos. 4,992,797 (Gjessing et al.), 5,012,252 (Faulkner), 5,867,118 (McCoy et al.), 6,337,654 (Richardson et al.), and 6,943,724 (Brace et al.) are examples of target acquisition of mobile objects such as ships, aircraft and missiles. By way of example, U.S. Pat. No. 7,046,192 (Nagel) is directed to a radar process for classifying or identifying helicopters, and U.S. Pat. No. 8,049,659 (Sullivan et al.) is directed to firearm threat detection, classification and location using wideband radar. U.S. Pat. No. 6,580,388 (Stoyanov et al.) is directed to a calculation methodology for complex target signatures of a sample object such as an antenna array which are used to extrapolate a more complex, for example, ship size system. U.S. Pat. No. 5,828,334 (Deegan) expects frequencies between 10 and 50 Hz for cyclotron radiation, 100 to 5000 Hertz for jet turbulence and above ten kHz for, for example, turbine blade frequencies for vehicle, ship, missile and aircraft classification. U.S. Pat. No. 7,920,088 is directed to an apparatus and method for identifying targets through opaque barriers. The apparatus may be worn and identify a target utilizing transceiver circuitry in the 300 MHz to 1100 MHz range.

Target recognition and identification must be immediate so that an enemy target does not acquire target recognition first, for example, in military applications. Targets may intentionally change their signatures to attempt to foil recognition. J. D. Birdwell (one of the named inventors of the present application) and B. C. Moore wrote the chapter "Condensation of Information from Signals for Process Modeling and Control," at pp. 45-63 of *Hybrid Systems II*, published by Springer of Berlin/Heidelberg, 1995 in which the importance of collecting historical data over time is identified and demonstrated as valuable, for example, in process modeling and control. For example, historically collected data for a process may trigger recognition of an irregularity in collected, expected data such that the imminent failure of a machine component may be detected before the component fails. Birdwell and Moore recognize that when historical data are used to characterize behavior it is often not appropriate to model such behavior as a curve because too much information may be lost. As an example, classification can occur by comparison of a spectrum to a region or cluster of classified or known spectra and is not limited to comparison to a centroid or other small set of statistics derived from the known spectra. When applied to target recognition, the target's attempt at disguising its true identity may be determined and, perhaps, more importantly, with the classification of the target, the target's means for disguising its identity determined for future encounters with the classified target. The limitations of the method disclosed by Birdwell and Moore are the difficulties inherent in the representation of regions or clusters obtained from classified or known spectra, and in the comparison of a spectrum to a region. Birdwell and Moore offer an approach to representation of signals and portions of regions using interval arithmetic but do not address representation of the entire region in a manner that enables efficient comparison for large volumes of data. Although spectra are used as an illustrative example herein, the approach described herein is not limited to spectra.

U.S. Pat. No. 7,127,372 to Boysworth describes an improved regression-based qualitative analysis algorithm when a mixture, not in a library of spectra, and being an "unknown" is subjected to regression analysis of "peaks" in a residual error computed between an estimated spectrum and a measured spectrum. The process is repeated using information from a retro-regression.

Research into data clustering and indexing in regard to DNA analysis began in the 1990's at the University of Tennessee. U.S. Pat. Nos. 6,741,983; 7,272,612; 7,454,411; 7,769,803; 7,782,106; 8,060,522 and 8,099,733 are representative of disclosures issued to Birdwell et al. for a method of indexed storage and retrieval of multidimensional information. These methods provide an opportunity to address any limitations of the method disclosed by Birdwell and Moore discussed above. Also, a method and apparatus for allele peak fitting and attribute extraction from DNA sample data is known from U.S. Ser. No. 11/913,098 filed Oct. 30, 2007 and published as US 2009/022845 on Sep. 10, 2009, still pending. Other patents and pending applications of the University of Tennessee will be referenced herein.

Spectral data may comprise time and frequency-based spectral data that may be sonic, for example, ultrasonic, or radio frequency, at any frequency from 0 Hz (or direct current) to teraHertz range. (There is no sound or vibration at 0 Hz.) For example, voice sounds are known to have most information content in the frequency band between 200 and 1600 Hertz. Higher voice or music frequencies provide fidelity and other properties making the voice or music sound recognizable as a particular human (or particular animal or particular musical instrument or collection of musical instruments). Ultrasound transducers (ultrasound used to be known as frequencies above the sound frequencies capable of being heard by the human ear) are now known that vibrate in the 100 MHz range and higher. The radio frequency spectrum is practically unlimited.

Underwater submarine data transmission is typically accomplished at very low frequencies, but skilled sonar operators can utilize underwater acoustic signal measurements that have information content at frequencies from subsonic through the audible spectrum to distinguish ships and fish of various types. Radio operators can utilize return signals in the radio spectrum (up through the microwave range) from aircraft and birds in a similar fashion. Spectral data are utilized in astronomy to detect and identify solar, interstellar and extragalactic processes and objects over frequency (or wavelength) ranges from radio frequencies through X-rays. Both the representation and the analysis of signals such as these, identified herein as "spectra" can be accomplished using either frequency (or wavelength or energy) or time domain methods, and it is understood that the terms "spectra" and "spectrum" as used herein can refer to either type of signal or analysis.

Optical fiber now carries light frequencies modulated with data at very high frequencies. Black body radiation is passive and is radiated by any specimen without the connection of electrical leads or any electrical or electronic stimulation. Spectral frequencies are intended to include all these spectral data and spectral data is not intended to be limited in this disclosure. For example, spectral data may include data for visible and invisible light frequencies, acoustic vibration (including ultrasound) and X-rays or gamma radiation.

Electrical impedance is defined as "A measure of the complex resistive and reactive attributes of a component in an alternating-current circuit" by the Institute of Electrical and Electronics Engineers (IEEE). Impedance measurements can be represented in several different forms. The most popular methods involve representing the phase angle and magnitude, in a manner similar to measurements in polar coordinates, or as a complex number, in Cartesian coordinates. While spectral data may take many forms, spectral data will be represented in the present application, by way of example, as spectral impedance data. The impedance may be represented, by way of example, as a complex number involving real and imaginary numbers or in alternative form. An example of an alternate equivalent form of specifying spectral data is by magnitude and phase angle. In some applications, spectral data may be represented by the magnitude or the phase or a similar partial capture of the entire spectral information content.

Spectral data collected passively as black body radiation may be influenced by received radiation that is man-produced such as transmissions on radio frequency channels. Any unabsorbed radiation is reflected and included in the black body radiation. For example, a biological or other specimen receiving sunlight may exhibit different passive black body and reflected radiation characteristics at night or when influenced by the weather. As suggested by U.S. Pat. Nos. 7,724,134 and 8,044,788, for example, the "noise" influence on passively received black body radiation emission may be avoided by utilizing antennae tuned to frequencies not utilized for any radio frequency transmission such as frequencies reserved for listening for transmissions from the stars (astronomy uses).

By spectrum analyzer as used herein is intended a device for obtaining frequency spectrum data generally which may be optical, acoustic, electromagnetic, radiation and other frequency spectrum data of an unknown specimen or media and includes and is not limited to including a network analyzer. Network analyzers are known that measure the impedance of a system over a range of frequencies and are capable of taking measurements from ten MHz ($10^6$) to over one THz ($10^{12}$) with over 20,000 sample points. Analysis of all 20,000 points may be time consuming and unneeded because initial investigations show that the similarity of two impedance curves can be determined by their general shape, which can be represented with a lot fewer measurements at selected frequencies. Spectrum analyzers may capture frequency spectrum data over a range of frequencies (that does not include zero frequency or DC) and may use methods such as modulation to capture high resolution spectral data over a narrow band of frequencies. Windowing methods, such as the use of a Hamming window, can be used to improve the accuracy of spectral data measured as a function of frequency or wavelength. Spectrum analyzers are known for receiving passive black body radiation or ultrasound transmission via directed antenna or microphone respectively. A spectrum analyzer may also be used that can capture or measure a signal as a function of time. Filtering methods are known in the art that can be used to modify the spectral characteristics of the captured or measured signal. For example, a band pass or low pass filter may be used. Such filters are not limited in their application to electrical signals; gratings, zone plates, band pass, and low pass filters, for example, may be used to filter optical and electromagnetic signals.

For analysis, the spectral impedance data used by way of example herein may be represented as vectors of complex floating point values, for instance, a vector of 20,000 elements representing the real and imaginary parts of the impedance at 20,000 frequencies and measured over time. If correlation exists among the data variables, then one of several known techniques can be used to reduce the dimensionality of a set of spectral data while still retaining most of the information represented in the data. Different dimension reduction techniques will be reviewed and analyzed. Using knowledge of the data and an analysis of the loss of information, one may be able to reduce the spectral data to less than $\frac{1}{1000}$th of the original size, allowing much more efficient calculation of results, avoiding instability of solution results, and rendering more possibilities for application. Two known methods of dimension reduction are now reviewed: principal component analysis and peak binning.

Dimensionality reduction is known in the context of principal component analysis and binning, for example. Principal component analysis (PCA) identifies the principal components of the data that exhibit the most variability. With PCA, the data are represented with respect to a new ordered set of orthogonal bases that capture successively less variability in the data. In many cases, 90% of the variability in the data can be represented in the first few principal components. One method of performing PCA is with singular value decomposition (SVD). With SVD, the data matrix of size m×n with rank s is factored into three matrices that have unique properties.

$$X = U\Sigma V' \qquad (1)$$

The V matrix is of size n×r, and the columns of V are right singular vectors of X. The columns of V represent a set of basis where each column shows the directions onto which the sum of squares of the projection of the rows of X is of decreasing magnitude. The columns of V are orthonormal. The U matrix is of size m×r and the columns of U are orthonormal, and are the left singular vectors of X. The Σ matrix is a diagonal r×r matrix. The values in the Σ matrix are referred to as the singular values (of SVD) and are the positive square roots of the eigenvalues of both XX' and X'X. The singular values are in decreasing order and can be used to determine the real, or effective, rank of the original data matrix by looking at the number of non-zero singular values. To determine the effective rank, the ratio of each singular value to the maximum singular value is calculated and low ratios below a threshold are typically taken to be zero. The number of non-zero singular values above the threshold may represent the 'effective rank'.

If the data to be dimensionally reduced are comprised of samples of a stochastic process, it is well-known in the field of mathematics that the Karhunen-Loève theorem can be employed to represent the stochastic process as a linear combination (a series) of a (typically infinite) set of orthogonal functions, where the orthogonal functions are deterministic and the coefficients in the terms of the linear combination are random variables. The terms of the linear combination or series are ordered such that a finite truncation of the series is a best fit to the characteristics of the stochastic process in the sense that it minimizes a squared error measure of the difference between the truncated series and the original stochastic process. In this manner the stochastic process can be optimally approximated in an n-dimensional space be retaining the first n terms of the series. When applied to samples of a stochastic process this approach is equivalent to principal component analysis and yields both optimally selected (with respect to a specific type of error criterion) orthogonal functions and reduced dimension representations of the samples.

Binning was also studied and is known from Puryear et al., where data were binned and multiple peaks combined falling in one bin. Other methods of data reduction are known; see, for example, the projection search method used to determine classifiers of data, as discussed in United States Patent Application Publication 2010/0332475 dated Dec. 30, 2010, by Birdwell et al.

Now the following known metrics will be individually discussed as known in the art: inner product, Euclidean distance, Mahalanobis distance, Manhattan distance, average, squared cord, canberra, coefficient of divergence, modified Boolean correlation, average weight of shared terms, overlap, cosine, similarity index and Tanimoto's (fourteen different similarity metric possibilities).

The inner product has some interesting geometric features that make it a very good basis for many of the equations used here. The inner product of a vector with itself is equivalent to the length of the vector squared. The inner product between two orthogonal vectors is equal to zero. The inner product between two vectors X and Y having components $X_i$ and $Y_i$ respectively is given by $$\Sigma X_i Y_i. \qquad (2)$$

The inner product between a vector and another vector grows as the angle between the two vectors grows for angles less than or equal to ninety degrees. If two vectors are being compared to a query vector and they both have the same angle of separation from the query vector but are of different lengths, the longer vector will have a larger inner product value.

Euclidean distance is a standard, known metric used in most distance measurements because in $R^2$, the distance can be measured with any standard ruler. An equation for Euclidean distance is $$\sqrt{\Sigma(X_i^2 - Y_i)^2}. \qquad (3)$$

The contour graphs for equivalent Euclidean distance resemble circles around points in the graphs.

The Mahalanobis distance was first introduced by Prasanta Chandra Mahalanobis in 1936 with his publication, "On the generalized distance in statistics." The metric is very similar to the Euclidean distance with the modification that it takes into account the density and dispersion of known members in a group. This metric is different from many of the examined metrics in that it will calculate the distance to the center of a cluster of points based on the dispersion of existing members in the group. Mahalanobis distance scores may also be calculated using the singular value decomposition (SVD).

The Manhattan distance measure is often called the city block, or taxicab, distance because it measures the distance between points in space if the path of travel is only able to follow directions parallel to the coordinate space, as a taxicab driver in Manhattan, N.Y. would have to do when traveling between two points in the city where the streets are only North-South or East-West. The advantages and disadvantages of using the Manhattan distance are similar to those of the Euclidean distance with the exception that vectors of equal similarity to a query point vector form a diamond shape around the query point.

The average distance is a known metric and is defined as $$\frac{1}{M} \sum (X_i - Y_i) \qquad (4)$$

where M is the number of coordinates in X. Y contains the same number of points as X. The equation calculates an average distance.

The squared chord distance has been actively used in palynology for pollen assemblage comparison based on the work by Gavin et al. and Overpeck et al. in comparing distance metrics with respect to pollen assemblages. The equation only allows comparisons of vectors with positive elements and produces a shape similar to Euclidean distance, but stretched in the direction of the X axis.

The canberra distance was first published in 1966 and then refined in 1967 by the same authors, Lance and Williams. In two dimensions, a contour structure yields similar values and all points with a similarity distance may be determined with a similarity distance value.

The coefficient of divergence was introduced by Sneath and Sokal, studied by McGill and contour graphs of equivalent coefficient of divergence distances may be derived.

The modified Boolean correlation was introduced in Sager and is almost the same as the arithmetic mean of two vectors. Its modified form from the arithmetic mean to include another term that is a value of zero or one depending on whether the terms in the vector are positive or negative (if either term is negative, $X_i$ and $Y_i$ equal zero; $X_i$ and $Y_i$ equal one otherwise. After graphing, the contours of similar distances reveal a structure very similar to the average distance measure but shifted with a different slope and y-intercept.

The average weight of shared terms metric was introduced in Reitsma and Sagalyn's report in 1967 and is equivalent to the average value of all of the terms in both vectors, excluding any dimensions with negative values. An analysis of this metric in two dimensions reveals that contours of equal distance d to the vector $(X_1, Y_1)$ have a $-1$ slope and a y-intercept at $4d-Y_1-Y_2$.

The overlap measure of similarity between vectors X and Y is defined by $\Sigma \min (X_i, Y_i)/\min (\Sigma X_i, \Sigma Y_i)$. If all members of vector X are less than, or greater than, the members of vector Y, the two vectors are considered to have maximum similarity. If the members overlap, the vectors will have a similarity of a magnitude between 0.5 and 1.

The cosine similarity distance metric is equivalent to the cosine of the angle between two vectors and is the inner product divided by the norm/length of the inner product. This metric has been used in many areas due to the easy and intuitive interpretation of the similarity. The metric is also bounded on the interval from zero to one with a value of zero indicating the vectors are perpendicular and a value of one indicating the vectors are collinear. Noreault and McGill cite Torgerson's 1958 book as the origin of the metric; however, many linear algebra texts show the proof of this metric. This metric has a benefit of being scale independent.

The similarity index is a metric introduced by Lay, Gross, Zwinselman, and Nibbering in 1983 and later refined by Wan, Vidaysky, and Gross in 2002. The similarity index is an unbounded metric where a value of 0 indicates an exact match and the value increases as the two vectors become less and less similar.

The final known metric evaluated is that of Tanimoto. The Tanimoto coefficient is an extension of the cosine similarity distance that is documented in Tanimoto's internal IBM memos and Rogers. The calculation is equivalent to the Jaccard coefficient when all elements of the vectors are binary values. A Partial Bibliography provides citations for all references for the similarity metrics examined in the Detailed Description of the Preferred Embodiments.

Given the several known metrics for clustering data, for example, into groups of similar spectral data for known specimens and media, the desirability for evaluating spectral data in multiple dimensions and building a database of the known spectral data that may be accumulated, the potential applications for identifying properties of unknown specimens and media by classifying unknown spectral data using preferred known metrics to compare with the classified known spectral data in the database, a method and apparatus for identifying unknown specimens and media and predicting properties becomes desirable in view of the prior art.

SUMMARY OF THE PREFERRED EMBODIMENTS

In accordance with an embodiment of a method and apparatus for classifying specimens and media using spectral properties and identifying unknown specimens and media having like spectral properties, an aspect thereof may be to determine material composition, manufacturer, recognition of, for example, a human, animal or orchestral instrument through voice recognition, recognition of a biological specimen, determining or predicting catastrophic events, diagnosing medical ailments and determining geographic information among other specimen and media properties of sounds, spectral impedance characteristics and black body emission characteristics of such known specimens and media collected about the world over time and different environmental characteristics. Consequently, an apparatus may comprise a spectral data collector which may be used to receive data by microphone, antenna, optics or by connecting electrical leads that may collect spectral data from known specimens gathered in the field and the spectral data may be stored in a database along with specimen properties. A database of spectral data collected for known specimens and media may be constructed. Suitable metrics may be determined for classifying spectral data and properties determined by comparing spectral data characteristics of unknown specimens and media to the spectral data of known specimens and media of the database to predict specimen and media properties. Measurable properties of the objects may be stored in one or a plurality of databases including multi-dimensional databases. While exact matches to reference data may not be expected in response to a query for a similar specimen or media given an unknown target specimen or media under investigation, an automated search strategy may locate nearest neighbor items, or items within a specified neighborhood, with the most similar properties, from a reference collection and utilize any geographic or other information associated with these items to predict properties. An example of a reference collection may be a collection of electrical devices of different composition and may preferably comprise a statistically significant sized collection and each reference group within the collection, for example, resistors of a given size manufactured by a given manufacturer should be statistically significant in size. When the reference collection of stored data is large it is preferable that the stored data be indexed in a manner that facilities the rapid and efficient retrieval of stored data similar to specified data. Methods developed by the inventors that enable this type of indexing and retrieval are disclosed in U.S. Pat. Nos. 6,741,983; 7,272,612; 7,454,411; 7,769,803; 7,882,106; 8,060,522 and 8,099,733. Of course, a first query for a specimen or media may be followed by another query about that specimen or another specimen. Models may then be utilized to predict properties of the unknown specimens or media from the similar spectral data as described in U.S. Patent Application Publication No.'s 2010/0332210 A1, 2010/0332474 A1 and 2010/0332465 A 1 and so obtain estimated parameters from the model that apply to the unknown specimen. The terms "specimen" or "media" are intended to incorporate micro to macro size objects, specimens and media to include human and animal specimens, media, environmental collective sounds and remains thereof having spectral properties that may include, but not be limited to, any of the following: color, time or frequency varying data, acoustic, radio frequency spectral data and the like. For example, color or temperature of a specimen may alert a user of a spectrum analyzer in the field to a dangerous or exceptional condition posed by an unknown specimen, i.e., in target identification by radar or sonar or recognizing the imminent failure of a component in a process control or plant environment.

Correlations may be with geographic features, identity of manufacturer or builder, specimen or media identification or signature characteristics, human or animal or musical instrument identification or characteristics and the like, so an estimate is desired of the physical or ethnic source or origin or the likely characteristics of the source or origin of a target specimen or media.

A spectral database and a modeling and search capability extend and exploit already patented similarity-based indexing and search technologies developed at the University of Tennessee. The following patents and published applications as well as those identified above in the Background section and those referred to hereinafter are incorporated by reference as to their entire contents; U.S. Pat. Nos. 7,162,372; 7,672,789; 7,860,661 and 8,140,271 directed to a method of resolving DNA mixtures; U.S. Pat. Nos. 7,724,134 and 8,044,788 directed to passive microwave black body radiation reception for fire and intrusion and U.S. Pat. No. 8,013,745 directed to medical applications of passive microwave; PCT published patent application WO 2007/0244408 related by subject matter to Published U.S. Application No. 2009/0228245 directed to DNA peak-fitting, yet to be examined; WO 2008.06719 and U.S. Pat. Nos. 7,624,087; 7,640,223; 7,664,719; 7,840.519 and 7,945.526 directed to an expert system; published U.S. Application No.'s 2008/0040046, now U.S. Pat. No. 8,271,201; 2010/0138374 and 2011/0295518, directed to associating an unknown biological specimen to a family, yet to he examined; U.S. Pat. Nos. 6,741,983; 7,272,612; 7,454,411; 7,769,803; 7,882,106; 8,060,522 and 8,099,733 directed to a parallel data processing system and a method of indexed storage and retrieval of multidimensional information and organizing data records into clusters or groups of objects. For example, these published applications and patents may describe by way of example, the clustering of fire combustion products and their composition such as those resulting from a volcano or other natural event or a man-made fire, human beings having a DNA genetic profile categorized into clusters or groups, machines (vehicles, planes, missiles and the like) having a specific manufacturer, plant and animal life indigenous to a particular region of the world, earth and water bodies subjected to adverse weather conditions, buildings of a city versus those more associated with a town or village and the like to predict object properties or value of a trait. A database populated with measured properties of sample objects, specimens and media not limited to, but, by way of example, electrical or isotopic measurements, and of trace materials found on or in objects or in environmental samples, such as assemblages of micro-bodies including, for example, charcoal or charred particle along with other micro-bodies, together with, for example, geographic data related to the source of the sample objects or environmental samples, as well as their electrical and acoustic properties can be indexed and searched using these technologies to enable the rapid retrieval of information most relevant to an object, specimen or media as broadly defined. The indexing methodology relies upon data reduction methods such as principal component analysis, together with data clustering algorithms, and selected preferable metrics to rapidly isolate potential matches to predict a property or value of a trait of the object, thus producing a selection of reference data that best match the measured properties or traits for the object, specimen or media.

Objects, specimens and data that have been previously collected are analyzed and characterized using, for example, electrical, electronic (radio frequency spectral data), acoustic (audible as well as ultrasound), black body radiation, chemical, mechanical, optical (visible and invisible spectra), gamma radiation and isotopic measurements of components, and other information about an exemplary object, specimen or media. According to U.S. Pat. Nos. 7,724,134 and 8,044,788, to Icove et al. have measured passive electromagnetic radiation from a fire event of different types, a human being, an airplane and determined speed of a vehicle where quiet radio frequencies are suggested for directional, noise-free reception. Such objects, which may also include vegetation, provide distinctive data that may correlate to a signature for a target object, specimen or media either alone or in concert with data from another database such as a micro-body assemblage database. No active transmission is required from the source to the object or need the passive directional antenna emit any active radiation at any frequency.

On the other hand, the sun provides a constant radiation source for reception by a black body during daylight hours. Black bodies are known to radiate different levels of radio frequency across the visible and invisible radio spectrum at different frequencies depending, for example, on temperature, pressure and time and frequency varying characteristics. In particular, for example, the event of a fire and its residual charred remains emit passive and active reflected radiation that can be measured and compared with known spectra data and the properties of the emitting objects predicted, for example, using data of a mass spectrometer. For example, volcanic ash may be differentiated from smoke particle products of a wood fire and those of a chemical fire. Similarly, the event of a fire has been studied as will be discussed further herein and the abundance of microscopic charcoal particles in micro-body assemblages of fire remains or other residue such as condensed metals or oils correlates with type of fire and both regional and local fire occurrence. Directional microphones are also known for the collection of sound waves at sub-audible, audible and ultrasound frequencies. Electrical, electromagnetic, black body radiation and acoustic data provide respective spectral signatures for recognition of diverse objects. Acoustic transducers such as those used for medical ultrasound, geophysical characterization, and military sonar systems can also be used to emit an acoustic or pressure waveform, and either the same or a different transducer can receive acoustic or pressure waveforms either reflected from or transmitted through a material, enabling a measurement of an impedance spectrum associated with the transmission or reflection.

Electromagnetic waves are created when charged particles such as electrons change their speed or direction. These electromagnetic waves consist of an electric field and a magnetic field perpendicular to the electric field. The oscillations of these fields are characterized by properties such as the frequency or wavelength, the phase or time delay, the polarization (such as in microwave or light reception) and the intensity as a function of time of the electromagnetic wave, as is well-known in the art. The frequency is the number of waves (or cycles) per second. The energy of these waves may also be characterized in terms of the energy of photons, mass-less particles of energy traveling at the speed of light that may be emitted at certain discrete energy levels, or by counting photons received, possibly as a function of photon energy. The following mathematical relationship demonstrates a relationship among the wavelength of an electromagnetic wave, its frequency, and its energy:

$$\lambda = \frac{c}{f} = \frac{hc}{E}$$

where
$\lambda$=wavelength (meters)
c=speed of light ($3 \times 10^8$ meters per second)
f=frequency (Hertz)
h=Planck's constant ($6.63 \times 10^{-27}$ ergs per second)
E=energy of the electromagnetic wave (ergs)

Wavelength and frequency are the inverse of one another as related by the speed of light, and may be used interchangeably herein in the description of embodiments and the claims as equivalents of one another. Similar properties hold for other types of signals such as acoustic waveforms. Note that the energy of an electromagnetic wave is proportional to the frequency and is inversely proportional to the wavelength. Therefore, the higher the energy of the electromagnetic wave, the higher the frequency, and the shorter the wavelength.

The spectrum of electromagnetic waves is generally divided into regions or spectral components, classified as to their wavelength or, inversely, as to their frequency. These bands of wavelengths (frequencies) range from short to long wavelengths (high to low frequency) and generally consist of gamma rays, x-rays, ultraviolet, visible light, infrared, microwave, and radio waves. The term "microwave" generally is used to refer to waves having frequencies between 300 Megahertz (MHz) (wavelength=1 m) and 300 Gigahertz GHz (wavelength=1 mm). Microwave radiation is highly directional, and the higher the frequency, the more directional the emitted radiation. For the purposes of the present application and claims, an emission above 300 GHz up to 1000 GHz will also be considered within the microwave band.

Radiation via electromagnetic waves can be emitted by thermal and non-thermal means, depending upon the effect of the temperature of the object emitting the energy. Non-thermal emission of radiation in general does not depend on the emitting object's temperature. The majority of the research into non-thermal emission concerns the acceleration of charged particles, most commonly electrons, within magnetic fields, a process referred to in the astrophysics field as synchrotron emission. For example, astrophysicists and radio astronomers look for synchrotron emissions from distant stars, supernovas, and molecular clouds.

On the other hand, thermal emission of radiation from electromagnetic waves depends upon the temperature of the object emitting the radiation. Raising the temperature of an object causes atoms and molecules to move and collide at increasing speeds, thus increasing their accelerations. The acceleration of charged particles emits electromagnetic radiation which forms peaks within the wavelength spectrum. There may be a direct correlation in changes in temperature impacting the accelerations of the composite particles of an object with the frequency of the radiation and peaks within the spectrum. Once an object reaches its equilibrium temperature, it re-radiates energy at characteristic spectrum peaks.

Similarly, the acoustic spectrum from sub-audible to ultrasound energy at high frequency, for example, 100 megaHertz, may be detected by similar directional microphones and their data recorded from objects in a database. Electrical characteristics such as impedance and characteristics of an object such as insulation or conduction can be observed and recorded in a database. A combination database of radio frequency, acoustic and/or other spectra (for example, optical or mass spectra) emission data as discussed herein may be referred to herein as an electro-acoustic spectral database or ESD, where electro-acoustic comprises at least electrical, radio frequency, electromagnetic, optic, impedance or acoustic data and is not to be considered so limited.

Common forms of radiation include black body radiation, free-free emission, and spectral line emission. A black body is a theoretical object that completely absorbs all of the radiation falling upon it and does not reflect any of the radiation. Thus, any radiation coming from a black body is from its inherent radiation and is not the result of any radiation incident upon it. Black body radiation is a basic form of thermal emission of electromagnetic radiation from an object whose temperature is above absolute zero (0 Kelvin). Practical examples of black body radiators include a human body, a Bunsen burner, a candle flame, the sun, vegetation of different types, water bodies, rock formations, man-made structures, machines and other stars in the galaxy.

Passive high-gain directional microwave antennas and receivers have been used to measure the temperature of a remote object in the technical field commonly known as microwave radiometry. Typical users of microwave radiometry are radio astronomers scanning extraterrestrial objects and the earth. A microwave radiometer known from the field of the astronomy sciences pointed at the sky can produce a measurable voltage output which is proportional to the temperature of the target. On the other hand, passive directional radio frequency and acoustic microphones, antennas and receivers pointed toward the earth from an elevated position such as a forest fire tower, a building, an aircraft or a satellite may collect spectral data of all types from objects at which the directional antennas and microphones are pointed and recognized by human observers.

As described above, it is known that fire, including non-flaming fires such as smoldering embers and volcanic rock, emits a wide spectrum of electromagnetic and acoustic radiation. Such radiation includes not only infrared (heat) radiation, but also includes microwave radiation in the range of 300 MHz to 1000 GHz and at corresponding wavelengths of from 1 meter to less than 1 mm, due to the energy radiated by such fires as black body emission and spectral line emission caused by the high energy (temperature) levels of a fire. Such microwave (and acoustic) radiation can be detected without the need for any corresponding emission of microwave radiation by an antenna. Instead, in accordance with aspects and features described herein, the emitted spectral energy of a fire and resultant combustion residuals in the microwave regions of the electromagnetic spectrum and acoustic spectrum can be detected using passive microwave and acoustic detection by one or more passive directional antennae/microphones.

In addition, living bodies such as persons or animals also emit microwave and acoustic radiation due to their inherent thermal energy via black body emission. This radiation and acoustic radiation also can be detected by the same directional antennas and microphones used to detect the microwave radiation and acoustic output from a fire. An electrical/acoustic spectral database (ESD) of persons, animals, objects, plants, structures, vehicles, machines and the like can be produced comprising signature spectral (electrical, electromagnetic and acoustic) and black body emission characteristics.

Each measured property can assist in locating or identifying, for example, the source or predict other properties or values of traits of the object, for example, if geographically tagged reference data with similar characteristics are available. Trace materials such as charred, for example, charcoal particles in micro-body assemblages (mixtures with other materials and particles) can be used to identify, if not the geographic location or origin, then characteristics of that location such as an expected distribution of plant species, soil types, temperature and humidity conditions, and the nearby presence of geographic features such as water bodies, ancient lake beds, volcanic rock, other rock formations, man-made structures and machines and outcrops of sedimentary rocks. The relative abundance of charcoal in samples and the morphologies of charcoal particles in micro-body assemblages can provide clues about the prevalence of agricultural, household, or other burning, and potentially of fossil fuel combustion by automobiles or industries. As discussed herein, a micro-body assemblage database may be referred to as a MAD database. While a single property of a given object may not provide sufficient discriminatory power, the fusion of information associated with multiple measured properties of multiple objects and micro-body assemblages is more likely to lead to an accurate geographic or other object property or trait prediction or characterization as to value. The above-referenced prior work at the University of Tennessee utilized data obtained from human DNA for clustering. Other prior work at the University of Tennessee utilized content-based image retrieval (CBIR) (Z. Shen, *Database Similarity Search in Metric Spaces: Limitations and* Opportunities, MS Thesis, Electrical Engineering, University of Tennessee, August, 2004) and preferential image segmentation of electronic circuit components for clustering (Y. Pan, *Image Segmentation using PDE, Variational, Morphological and Probabilistic Methods*, PhD Dissertation, Electrical Engineering, University of Tennessee, December, 2007). A resultant image database may be referred to herein as a content-based image retrieval database (CBIR). Also, the University of Tennessee has reported in non-patent literature on automated classification of diatoms and the use of principle component analysis methods for identification of environmental signatures of micro-body assemblages which include pollen.

Data coding methods for a plurality of multi-dimensional databases that are compatible with the present similarity-based indexing and search methodology support an analysis and exploitation of the correlations among micro-body assemblage data and location/feature and other property or trait value prediction data. Databases and related modeling software may utilize the proposed methodology including, for example, a plurality of databases comprising electrical/electronic/acoustic data (ESD), manufacturer data, micro-body material assemblage data (MAD) from the literature, and CBIR databases maintained for objects of interest as will be discussed herein.

Modeling software and related database technology may lead to an inference of the geographic location, manufacturer, estimated parameters or characteristics of points of origin and time/season related data using measurements of object/specimen properties and associated trace materials and comparison to reference and historical data. One embodiment comprises a software system that supports collection and modeling activities using a variety of modalities, including electrical, spectral (electromagnetic, mass spectra, optic and acoustic) and isotopic measurements of samples, and analysis of micro-bodies having entrained charcoal particles and other micro-bodies including, for example, diatoms and foraminifera or other micro-bodies, as well as images to identify points of origin and, possibly, time-varying data, for example, transit routes of objects from a point of origin (for example, associating oil droplets in a body of water or particulate matter in air with the site of an oil spill or leakage or a source of air pollution). In these applications, objects collected from field operations can be analyzed and characterized using, for example, electrical, chemical, acoustic, mechanical and isotopic measurements of components, and information about trace contaminants. Each measured property can help locate or identify the source of the object or predict other object properties or trait values if reference data with known or measured characteristics are available. Trace materials, such as micro-body assemblages including charcoal particles and other micro-bodies including pollen, diatoms, and foraminifera, can be used to identify, if not a point of origin or transit, then characteristics of that location such as an expected distribution of plant species, soil types, temperature and humidity conditions, and the nearby presence of water bodies, ancient lake beds, and outcrops of sedimentary rocks. As explained above, the relative abundance of charcoal in micro-body assemblage samples and the morphologies of charcoal particles can provide clues about the prevalence of agricultural, household, or other burning, and potentially of fossil fuel combustion by automobiles or industries. While a single property may not provide sufficient discriminatory power, the fusion of information associated with multiple measured properties is more likely to lead to an accurate object characterization and prediction of other object properties or trait values that may further include date and time data.

Similarity-based search technologies are incorporated into database and modeling software embodiments that support model-based inference of properties of objects from a database of information gathered from previously analyzed objects and samples. An anticipated structure of this software is provided in the subsection title "Detailed Discussion of Preferred Embodiments." The software may operate as an overlay to a Commercial off-the-Shelf (COTS) database product that supports SQL queries across a standard network interface. The MySQL database software from Oracle may be utilized for this purpose; (refer to http://www.mysql.org/ for further information).

Electrical, electromagnetic and acoustic measurements, specifically time- and frequency-series data, exist in the published literature for certain objects such as previous fire events and residual objects. Multivariate statistical analysis, based upon principal component analysis (PCA) methods, can be used to extract the data most relevant to localization from the raw measurement data. Analysis of spectra using PCA for identification of chemical compounds and inference of origin has been very successfully employed in the field of analytical and food chemistry. The extracted content can be utilized to organize a database of information about objects in a manner that supports nearest neighbor search strategies based upon measures of similarities between objects. The methods are highly efficient because of the in-memory database index and dynamic indexing methodology discussed below. The enabling information technologies for this approach are described, for example, in U.S. Pat. Nos. 6,741,983, 7,272,612; 7,454,411; 7,769,803; 7,882,106; 8,060,522 and 8,099,733, referenced above. An overview of one of the technologies is provided below in the subsection titled "Multivariate Statistical Analysis and Data Clustering". Another method indexes information using partitions determined by entropy and adjacency measurements or functions. These patented methods have been used to construct several different types of databases that implement similarity-based search strategies, including databases of human DNA profiles used for forensic identification and have also been applied, as will be described below for content-based image retrieval (CBIR) databases.

Trace particle assemblages in sediment and soil samples are used by forensic scientists to infer the geographic and environmental characteristics or properties of samples from crime investigations. For example, micro-body assemblages in a soil sample on a shovel, for example, containing charcoal, pollen and the like can provide information on existent vegetation and vegetation fire residuals that may help pinpoint a grave site. This forensic work is discussed, for example, in D. A. Korejwo, J. B. Webb, D. A. Willard, and T. P. Sheehan, "Pollen analysis: An underutilized discipline in the U.S. forensic science community," presented at the Trace Evidence Symposium sponsored by the National Institute of Justice and held Aug. 13-16, 2007 in Clearwater Beach Fla. Micro-body assemblages including especially charcoal particles or pollen and, for example, foraminifera, and other microfossils can similarly help to establish the origin or travel route of a suspect or object involved in a crime. Such micro-body assemblages are also studied to understand past climate and environmental change, and in the case of pollen, in research on human allergens, crop pollination, and honey production. The use of microfossils in these various applications has produced literature on microfossil types and related micro-body assemblages that can be used to help develop properties of objects of interest. Of particular importance are studies of modern pollen and diatom distributions carried out to help calibrate records of past environmental change obtained by studying stratigraphic sequences of microfossil assemblages preserved in modern and ancient lake and marine basins; see, for example, L. M. Kennedy, S. P. Horn, and K. H. Orvis, "Modern pollen spectra from the highlands of the Cordillera Central, Dominican Republic," *Review of Palaeobotany and Palynology* 137 (2005) 51-68; K. A. Haberyan, S. P. Horn, and B. F. Cumming, "Diatom assemblages from Costa Rican lakes: An initial ecological assessment," *Journal of Paleolimnology* 17 (1997) 263-274, and C. Shen, K.-B. Liu, L. Tang, and J. T. Overpeck, "Numerical analysis of modern and fossil pollen data from the Tibetan Plateau," *Annals of the Association of American Geographers* 98 (2008) 755-772. These so-called "modern calibration studies" have the goal of relating modern micro-body assemblage data to patterns of climate, vegetation, and other environmental variables—in which we use the relationships between modern micro-body assemblages and environmental and geographical factors to predict properties or trait values of objects of interest. The micro-body assemblage data can be treated as vectors and can be readily processed using the similarity-based information retrieval and modeling technologies discussed herein.

An evolving technology for image processing and object recognition, preferential image segmentation, can be used to isolate features of interest from image data, such as pollen and diatoms, for use in queries to an image database. This technology is described in Y. Pan, J. D. Birdwell and S. M. Djouadi, "Preferential image segmentation using trees of shapes," *IEEE Trans. Image Processing*, 18 (2009), 854-866, and may be an initial processing step for images of pollen and diatoms, prior to multivariate statistical analysis and storage or search in a database. Other known methods of image enhancement, registration, segmentation and feature extraction are available in the published literature and can also be used.

Measured properties of specimens, media, objects and entrained materials can be utilized, in conjunction with a database that supports search and retrieval based upon similarities among objects, to provide information about points of origin and time varying data about the object and to predict further properties or traits or values or measures thereof. A body of information exists in the literature on the geographic distributions of some micro-bodies including microfossils, particularly pollen grains and diatoms, and on the environmental characteristics and properties of sample collection sites. Identification of micro-bodies including charcoal particles and microfossils may be automated using a combination of Content-Based Image Retrieval (CBIR) and a reference database of typed images, with a transition to candidate automated identification system(s).

CBIR is a relatively new technology that has undergone rapid evolution over the past decade. An early application is discussed by A. Oakly; see A. Oakly, "A Database Management System for Vision Applications," *Proceedings of the Conference on British Machine Vision*, vol. 2, 629-639 (1994), using Manchester Visual Query Language to distinguish two microfossils using a projected circular Hough transform in a microfossil image. The effectiveness of CBIR is dependent upon the range of image content that must be searched. For example, human facial recognition systems tend to exhibit reasonably good performance with adequate lighting and standardized profiles and image geometries (for example, the full facial views with flat lighting that are typical of drivers licenses and ID cards). In contrast, a facial recognition system that uses actively controlled cameras in an outdoor environment to acquire data from uncontrolled subjects tends to have a poorer performance.

As will be explained herein, CBIR in one embodiment is based on prior work on preferential, or model-based, image segmentation, and can be used to focus upon those portions of an image (for example, apertures and sculpturing on pollen grains) most likely to lead to accurate identification, and the use of similarity-based search strategies to determine reference objects with similar features. A successful system may identify and focus upon micro-bodies including charcoal particles and microfossils including pollen grains (or diatoms), identify each grain, and determine the frequencies of occurrence of each type. These data can then be used in a search for similar micro-body assemblages within a micro-body assemblage database (which as described above may comprise a plurality of databases, one for each micro-body), to provide data relevant to a source or other properties of an object of interest such as a smoke particle, man-made fire remnant or volcanic ash. Development of a large-scale trace analysis capability based upon entrained grains in objects, for example, including charcoal, requires acquisition and coding of additional reference data from the published literature. An automated micro-body assemblage identification system as described herein can substantially reduce the manpower requirements for reference data acquisition and allow better coverage of geographic regions of interest.

Electrical, electromagnetic and acoustic properties of object components are expected to be indicative of object properties and may provide an object, specimen and/or media signature(s). A database is known for emission of black body radiation from known objects, and this database may be utilized as one example of a property of an object. Acoustic or noise emission is another example of a property exhibiting a spectrum which may be related to further properties such as pressure, temperature, object type, such as a type of vehicle, and vary over time. These measurements comprise, but are not limited to, spectral data and have been shown to correlate to an object such as a human being, a structure or a fire event or its residuals as discussed above. Multivariate statistical analysis, based upon principal component analysis (PCA) or partial least-squares (PLS) methods, can be used to extract the data most relevant to localization from the raw measurement data.

The extracted content can be utilized to organize a database of information about properties of objects and to predict further properties and/or traits in a manner that supports nearest neighbor search strategies based upon measures of similarities between objects. Information about similar reference objects from the database can then be utilized to estimate or predict properties/traits/values of an object and the object itself. New objects can be treated as new information and incorporated, with appropriate review, into the forensic database, to be used to link to and identify future objects with similar properties. This allows the reference data collection to grow as analyses are performed and maintain currency. The database search and retrieval methods are highly efficient because of the in-memory database index and dynamic indexing methodology as discussed below. The database may include metadata, such as information about date and time, and source data such as manufacturer and/or vendor, or location of an object when this information is available. A database search and retrieval operation provides access to the metadata of objects similar to an unknown target object, which provides inferences about the point of origin for each new object analyzed and searched. By similarity, as used in the application, is intended, by way of example, the probability or likelihood that two objects are related by at least one property.

Multivariate statistical analysis presumes that one or more portions of the measured characteristics or properties of an object can be expressed as a vector, or ordered sequence, of numbers (of which a large number may be required). Values indexed by time (time series) or frequency (spectra) are two examples of such data. A measured concentration or intensity as a function of position, time or another independent variable, for example, as is used in chromatography, mass spectrometry or electrophoresis, is another example. While such an ordering may not be appropriate for all measurements of a sample (for example, images, time- or frequency-series, and genetic sequence data are not always encoded in a single vector), it is usually possible—and preferable—to represent one type of measurement as a vector, where several measurement vectors (of different types) may be associated with each object. Methods such as principal component analysis and clustering algorithms (for example, k-means) can be applied to each type of vector, and the methods described by the above-referenced patents incorporated by reference can be used to create databases (indexed collections of measurement data) for each vector type.

A single measurement vector, for example, an electrical spectrum, may not by itself be especially informative of an object's identity, physical and electro-acoustic properties, or location or time varying activity. However, the measurement can narrow down the set of possible origins or other properties, typically by excluding those reference objects that have substantially different spectra, and other measurement types can be used to refine the inferred source or property. As an example, stable isotope ratios, determined using a mass spectrometer, can be used to associate objects with a particular location, and are utilized in forensic science; see, for example, S. Benson, C. Lennard, P. Maynard, and C. Roux, "Forensic applications of isotope ratio mass spectrometry—a review," *Forensic Science International* 157 (2006) 1-22. Entrained pollen and diatoms can also be used for inference of geographic location (or expected characteristics of the location); see, for example, L. A. Milne, V. M. Bryant Jr., and D. C. Mildenhall, "Forensic palynology," in Forensic Botany: Principles and Applications to Criminal Casework. H. M. Coyle (ed.), 217-252. CRC Press, Boca Raton, Fla., 2005 and M. Leira and S. Sabater, "Diatom assemblages distribution in catalan rivers, NE Spain, in relation to chemical and physiographical factors," Water Research 39 (2005) 73-82.

Most chemical elements occur in the environment as a mixture of isotopes. Stable isotope ratios of Hydrogen, Carbon, Nitrogen, Oxygen, and Sulphur are commonly analyzed in forensic science; see, for example, S. Benson et al., cited above. Signatures of unstable isotopes in spectra can also be utilized, by for example with gamma ray, X-ray, or neutron spectrometry, or another method of detecting and measuring spectra that can be represented as data as a function of energy. Such data can be represented as a vector of ratios relative to a standard or other selected frequency, wavelength, particle, or energy, herein referred to as isotope ratios, whether stable or not. Isotope ratios can be reported relative to the light isotope as delta values relative to a standard, which are the deviation, in percent, from the standard. A vector of agreed-upon isotope ratios can be utilized to construct an index of stored reference objects and naturally fits within the framework of an embodiment of database technologies as described herein, for example, by creating an index for each isotope ratio. Thresholds can be utilized to exclude reference objects from search results if their recorded results are significantly different from the tested sample's values—or accept (meaning one cannot exclude the reference object based upon its isotope ratio), or leave undetermined if no isotope ratio is available. The results can be combined by returning only those reference objects that cannot be excluded using at least one isotope ratio, and that are not excluded using any isotope ratio for further analysis.

The use of stable isotope ratios, in addition to the spectral data, points to combining search results across multiple indices. This provides input to the design of an information storage platform: Objects should be indexed using multiple and disparate characteristics, such as electrical, chemical spectra and stable isotope ratios, and search results should utilize all of the available indexed data which may be all of ESD, MAD and CBIR among other data. A set of isotope ratios should be considered to comprise an example of a spectrum herein for storage in an electrical spectra database (ESD). According to an aspect of an embodiment, first, multivariate statistical analysis and clustering are utilized to extract information that is most relevant to the object from raw data sources, which may assist in determining location or time varying activity with respect to an object. Second, search and retrieval operations are based upon the similarities between objects, and not an exact match to a value in a stored record's field, or inclusion of that value in a specified range. Third, models can be applied to the metadata, or properties, associated with reference objects to predict properties/traits of interest for a target/unknown sample or specimen.

The models may be single variate or multivariate and may be utilized to interpolate the value of value set of a property of an object of interest for values for the same property of similar objects retrieved from the databases. In this case, the property may be, provided by way of example only, a location or source of manufacture or distribution, a type of material consumed in a fire or used to accelerate or extinguish a fire, the classification of a micro-body or smaller microscopic particle, the type or class of a vehicle, the type or state of a weapon or other device carried within luggage, or the state or status of equipment or a process in an industrial setting such as an electric utility or chemical plant. The models may also be statistical, or Bayesian, such as a Bayesian network or belief network that relates a set of objects retrieved from the database with an object of interest; note, however, that such statistical or Bayesian models can be generalized from traditional Bayesian network or belief network approaches to allow graphs that contain loops. See, for example, U.S. Patent Application Publication numbers 2008/0040046, 2011/0295518 A1, and 2010/0332465 A1. This is but one set of exemplary models that are graphs or directed graphs, as are well known in the field of computer science which can also be used. In this case, the predicted property or trait may be, for example, the likelihood, probability, or belief that the target object (unknown versus reference) and the retrieved objects satisfy a postulated relationship, or a set of likelihoods, probabilities, or beliefs determined across alternative hypotheses. If only two hypotheses are postulated, this set of likelihoods may be expressed as a likelihood ratio. Examples include the identities, command structure, or purposes of individuals, devices, software components, or other entities such as businesses that communicate via a network, genetic relationships among individuals and, optionally, phenotypes such as the susceptibility to or ability to cause or prevent disease, whether among plants, animals, or single-celled organisms, and the detection of individuals or other entities engaged in an illicit enterprise. One embodiment further may include image information, which is necessary for identification of pollen, diatoms, and other trace microfossils that may be found on objects including, for example, vehicles and individuals.

The models may incorporate optimization. One example is the utilization of optimization such as least squares or maximum likelihood optimization methods that are well-known in the art to determine a model that best fits the values of one or more properties of objects that result from a database search. This optimized model can then be used to predict at least one property or trait or value thereof of a target object or specimen of unknown classification as to reference group of a reference collection. A more complex example is the use of a database of time series data or data indexed by frequency, such as spectra, obtained from measurements made on a physical process such as a chemical reactor or gas turbine. In order to determine or localize a worn or failed component in the process one may record measured data in a database that supports similarity-based or nearest neighbor search at various times during the operation of the process. These recorded data form a historical record of the operation of the process, and recorded measurement data from a current operating period can be utilized as a target in a search of the historical data. Results returned from a search have similar characteristics to data from the current operating period and can be used to model or predict the status, such as wear or failure mode, of a component in the process, or to model or predict the future behavior of the measured process. For example, similar time series data from the historical record can be utilized to develop an impulse response model of the process in order to predict future process state as a function of time and/or future measurement values. In this case, the impulse response model can be obtained by solving a quadratic programming optimization or convex optimization problem. Other methods such as dynamic matrix control, quadratic dynamic matrix control, model predictive control, and optimization of linear matrix inequalities can be utilized. See, for example, S. P. Boyd et al., "A new CAD method and associated architectures for linear controllers," *IEEE Transactions on Automatic Control*, 33 (1988) 268-283, C. E. Garcia and A. M. Morshedi, "Quadratic programming solution of dynamic matrix control (QDMC), *Chemical Engineering Communications*, 46 (1986) 73-87, S. Boyd et al., *Linear Matrix Inequalities in System and Control Theory*, Society for Industrial Mathematics (1997) ISBN 978-0898714852, and M. Morari and J. H. Lee, "Model predictive control: past, present and future," *Computers and Chemical Engineering* 23 (1999) 667-682. Approximations to the optimal solution can also be utilized. See, for example, S. Wei et al., "Applications of numerical optimal control to nonlinear hybrid systems," *Nonlinear Analysis: Hybrid Systems* 1 (2007) 264-279, and B. Moerdyk et al. (including inventor J. Douglas Birdwell), "Hybrid optimal control for load balancing in a cluster of computer nodes," *Proc. of the 2006 IEEE Int. Conf. on Control Applications* (2006) 1713-1718. Switching strategies may be embedded in a constrained continuous space representing the fractions of loads to be transferred between each pair of computational elements; see, for example, Bengea et al., "Optimal Control of Switching Systems," *Automatica* 41, 11-27 (2005) and Bengea et al., "Optimal and Suboptimal Control of Switching Systems, *Proceedings of the 42$^{nd}$ IEEE Conference on Decision and Control*, 5295-5300 (2003). A compartmental model can be utilized, where parameter identification is performed using well-known methods in the art to fit model parameters to measurement data; see M. H. Plawecki et al., "Improved transformation of morphometric measurements for a priori parameter estimation in a physiologically-based pharmacokinetic model of ethanol," *Biomed Signal Process Control* 2 (2007) 97-110. The database would be queried to determine the measurement data from the historical record that are most similar to current conditions, determined by measurement, such historical measurement data utilized for parameter identification. In these cases, the predicted or inferred characteristics or traits of a target object or specimen are utilized to subsequently control a physical process.

The design of a grain database may employ Content-Based Image Retrieval (CBIR) using measures of similarity between segments of images. These segments can be grains, or features on the surface of grains (sculpture and apertures). One advantage of retrieval based upon similarity measures is the potential to correctly identify degraded grains, or grains from images that are partially obscured by other grains or artifacts. Prior work includes the extension of CBIR to preferential image segmentation and identification using content models based upon trees of shapes; see, for example, Z. Shen, *Database Similarity Search . . .* , cited above, and Y. Pan, *Image Segmentation . . .* , cited above. Metadata associated with stored images of grains can include the location and date of collection, as well as other descriptive data. Similar database and identification and characterization approaches can be utilized for pollen, diatoms, and foraminifera. Studies of microscopic charcoal particles as indicators of fire regimes have focused on total particle abundance per volume or weight of sediment, or in comparison to pollen abundance based on visual quantification of particles on slides prepared for pollen analysis. Also, the feasibility of automatic quantification has been demonstrated. See, for example, K. Anchukaitis and S. P. Horn, "A 2000-year reconstruction of forest disturbance from southern Pacific Costa Rica. Palaeogeography, Palaeoclimatology, Palaeoecology 221 (2005), 35-54 and L. M. Kennedy, S. P. Horn, and K. H. Orvis, "A 4000-yr record of fire and forest history from Valle de Bao, Cordillera Central, Dominican Republic," Palaeogeography, Palaeoecology, Palaeoclimatology 231 (1996) 279-290. Newer approaches have focused on particular charcoal morphologies that can indicate the type of material burned, which may provided more detailed environmental clues. Both approaches to charcoal quantification may be accommodated in an embodiment of the present database.

The application of the present embodiment is not limited to fire detection, forensics, fire residual determination, medical condition diagnosis, musical composition recognition, media author/composer recognition and the like. Other applications, as examples and not intended to be limiting, include financial, data mining, criminal activity pattern detection, vehicle recognition and disease modeling or disease discovery.

For example, with respect to a financial application, time series can be stock or other equity prices, and the correlations between time series can be used as a measure of similarity (for example, $R^2$) in statistics. One would look for exploitable patterns—equities that move as a group, or that may have correlation delayed in time with respect to another. PCA can be used to cluster similar time series, corresponding to equities that behave similarly. The model can be a method of portfolio analysis—in other words, an optimal allocation strategy to determine the best allocation of investments. See also data mining, below.

With respect to data mining, the method can be used to mine information in a database—looking for clusters of similar behaviors. This can be purchasing patterns of consumers, or of businesses (e.g., raw materials). A model can be applied to some or all of the members of a cluster (similar objects) to determine their relationship. The model can be a Bayesian or belief network, or a pedigree, which is a graph of hypothetical relationships between objects. Relationships can be flows of capital or goods/services between members of a cluster (or a subset of a cluster). Multiple hypothesis testing or maximum likelihood estimation can be used to determine which relationships (models) are more (or which is most) likely. Similarity-based search can determine objects in a database that are most similar to a target, or objects most similar to each other. By exploiting the high speed of the database, one can perform a search of the database against itself to determine a list of the most similar clusters or subsets of objects and apply models to these to test hypotheses. The results of this procedure can be used to add information to the database, which could be "metadata", or data about the data (clusters), mining the database for knowledge.

With respect to detection of patterns in criminal activity, behaviors (objects in the database) may be suspicious transactions that are observed or reported. Hypotheses may be the possible organizational structures of a criminal network or conspiracy. This could also be interactions among computers or communications devices such as nodes in a communications network, where the goal is detection of organized behaviors. Transactions could also be medical records or medical data such as medical claims for reimbursement from insurance or Medicare, where the goal is detection of patterns of activity indicative of fraud.

With respect to disease modeling or drug discovery, attributes can be measureable quantities about objects, such as individuals, and properties that are inferred by the models and can be an expression of characteristics of the objects, such as disease or drug resistance. This relates to the classic application of Elston and Stewart (R. C. Elston and J. Stewart, *A General Model for the Genetic Analysis of Pedigree Data*, Human Heredity 21 (1971), 523-542) and models derived from their approach with genotypes and phenotypes.

BRIEF DESCRIPTION OF THE DRAWINGS

Embodiments of a method and apparatus for predicting object properties or traits, allocating specimens to reference groups of a reference collection and the like by, for example, spectral data collection and storage in an electrical spectral database will be discussed in the context of the following drawings wherein:

FIG. 5 shows partition of a 2-level indexing tree.

FIG. 6 shows a triangle inequality.

FIG. 7 shows a search method using reference points.

FIG. 22 (comprising FIGS. 22A, 22B and 22C linked by circular indicators 1-5 as one continuous flowchart) is a flowchart useful for, for example, comparing three or more metrics including dimension reduction for classifying reference spectral data and for identifying unknown spectral data to the classified groups of reference spectral data.

FIG. 24 shows the resultant exemplary magnitude in ohms (impedance magnitude) and phase angle (degrees) for exemplary frequencies for a first training or reference group 01 and centroid determination.

FIG. 25 shows the results of a process of calculating a threshold for group 01 using a histogram of group and non-group member similarity to the group centroid (threshold, for example, of value of approximately 0.9 similarity).

FIG. 26 shows results for correct and incorrect classification of specimens under scenario 1 wherein the metrics Canberra, Manhattan, similarity index, cosine and Euclidean are the top performers.

FIG. 27 shows results for correct and incorrect classification of specimens under scenario 2 wherein the metrics Canberra, Manhattan, cosine, Euclidean and similarity index are the top performers.

FIG. 28 shows results for correct and incorrect classification of specimens under scenario 3 wherein the metrics Canberra, Manhattan, cosine, Euclidean and similarity index are the top performers.

FIG. 29 shows an exemplary sample, specimen or media (Samples) electrical spectral database (ESD), wherein specimen and media may be classified according to spectral data (Signal Data), metric choice (Sample Similarity), manufacturer ID and source provided ID (Manufacturers) and resultant traits such as sample ID and trait value (Traits) determined from successful classification by the metric or inherency to reference or unknown sample.

FIG. 30 is a first graphical user interface screen for an exemplary ESL) as per FIG. 29 showing sample name, metric, rank and other data determined for an unknown from a known or reference collection comprising at least one reference group.

FIG. 31 is a graphical user interface for viewing a sample.

FIG. 32 is a graphical user interface showing picking a metric.

FIG. 33 is a graphical user interface showing paging up and down.

FIG. 34 is a graphical user interface for page navigation.

FIG. 35 is a graphical user interface for exporting spectral data (Export Wizard).

FIG. 36 is a graphical user interface for determining traits in the field of a specimen, media or object (Trait Manager).

FIG. 37 is a graphical user interface for generating reports regarding, for example, a specific sample specimen, media or object.

FIG. 38 is a graphical user interface for generating a report for a selected sample or group by checking desired results, metrics choice and the like.

DETAILED DESCRIPTION OF PREFERRED EMBODIMENTS

Figure 1:
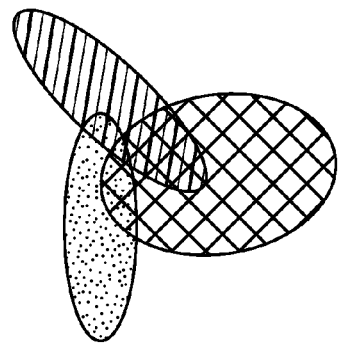
FIG. 1 is a Venn diagram showing selected reference data from three similarity searches and their juncture or overlapping region.

Embodiments of a method and apparatus for classifying known specimens or media using spectral properties and identifying unknown specimens and media and traits will be described with reference to FIGS. 1-38. One embodiment promotes the use of a federation of database indices, for example, those corresponding to electrical spectra, isotopic ratios, pollen, charcoal, diatoms, and foraminifera, documents, images of all types and the like, all of which can be searched using similarity-based methods for reference samples with characteristics similar to those measured for an object. Each database index may be implemented by a search engine, utilizing a common commercial off-the-shelf database or a file system as a persistent storage repository. A search management process may be utilized to coordinate requests from clients for information across all database indices, and for interpretation of the search results to present a coordinated response to each user. This is illustrated in showing a Venn diagram (FIG. 1) of the selected reference data from three similarity searches. The combination and utilization of information from searches involving multiple attributes of the newly acquired target object, specimen or media of interest can refine the estimate of properties related to the object's geographic origin, author, or other traits as illustrated by the central darker colored intersection of the three depicted similarity searches. Similarity measures, referred to herein as similarity metrics, can be used to cluster by similarity and then apply model(s) to clusters to test hypothetical relationships—with or without a target object or object of interest. The object of interest may be a member of the database. For example, one may perform searches for similar objects contained in the database for all members of the database. See, for example, the third method of U.S. Published Patent Application No.'s US 2008-0040046 of Feb. 11, 2008; 2010-0138374 of Jun. 3, 2010, and 2011/0295518 of Dec. 1, 2011 for a method to detect and identify relationships among family members in a mass disaster setting and to suggest family members for typing. Of course, the embodiment of FIG. 1 is merely illustrative and the figure is not limited to three but may involve, for example, hundreds to millions of similarity searches. A database can be dynamic, with new information being added to the database by the collection and evaluation of specimens, which data can change the membership of clusters or groups and the validity of hypotheses. Dynamic indexing, as discussed below, is used to test nodes of a database tree and cluster data of multiple dimensions into smaller and smaller groups.

Reference data that are tagged with properties such as the circumstances of manufacture or distribution and points of origin can be utilized to infer point of origin information for a newly acquired target object or specimen. Deterministic or static models may be utilized to infer these properties and predict other properties or traits and their values. Example models include methods known in the art of curve fitting and interpolation, least-squares models, and principal component analysis (PCA). Maximum likelihood estimation methods (e.g., likelihood ratios) may also be utilized to provide a quantitative statistical assessment of the relative support for competing hypotheses. Likelihood ratio analysis may require investment in the development of a reference data set because such methods are Bayesian—they rely upon a priori statistical information about the probability that samples with specific characteristics will be found at the stated locations (or with these characteristics). Other approaches such as artificial neural networks, belief networks and fuzzy logic may be used to advantage. Dynamic machine learning methods such as reinforcement learning can be used to update behaviors of the models based upon newly acquired knowledge.

Existing technologies that enable the development of database and modeling capabilities to support source identification from electrical, ultrasound, black body radiation and other spectral analyses are utilized in existing systems for the indexing and storage of data related, for example, to specimen, media and human or animal identification or classification. The technologies are utilized in one embodiment to implement a more general type of database (the Core Database) that supports utilization of correlations between observed attributes and properties of reference objects, specimens and media to model and predict the site properties and contexts of newly acquired objects, specimens and media of interest.

One embodiment of a database is an *Electrical/Acoustic Spectra Database* (ESD) that supports the comparison of objects of interest to a reference collection based upon measured spectral characteristics and inference of properties and contexts of one or more target objects from data associated with similar reference objects. As described above, such a database may comprise black body and spectral emission at acoustic, electromagnetic, radiation and optic radio frequencies (where "acoustic" may comprise audible, sub-audible and ultrasound spectral emission of objects. Data may be collected from reference objects, specimens and media at all frequencies and over time and at varying temperature and atmospheric pressure with or without any requirement for collection of electrical leads. In an exemplary embodiment discussed herein, similar or like, known, reference objects are classified by spectral properties into groups and unknown objects, specimens and media are identified to the groups or are continued to be classed as unknown depending on their ability to achieve a threshold degree of similarity depending on the metric chosen.

The databases will support storage of data objects containing identifying features (spectra for the ESD, and impedance data used by way of example), source information (such as when/where/from what a specimen or media was collected), and information of site properties and context that can be used to infer other traits such as geographic location and/or time-based activity. Multiple databases may be implemented using the Core Database technology to form a plurality of hierarchical and relational databases to improve the accuracy of the inferred properties of target objects, specimens and media and their probability of occurrence.

For example, domestic farming activities may benefit from an ESD database as described above. Since the technique is also sensitive to body temperatures within the field of view of the receiving antennae, the tracking and corralling of livestock such as cattle over ranges, entering corrals, and even wandering outside boundaries could be beneficial, particularly for those in the milking industry. This technology could also determine thermal signatures of livestock, humans, or predators so that such animals can be monitored and undesired intruders or injured or ill animals identified. Thermal or other spectral signatures of plants and vegetation may signal a problem of oncoming drought or plant disease.

Microwave speed, fire and intrusion detection capabilities can also be used to detect the movement of vehicles along roads and tunnels and shipboard and airplane movements along channels. Signature analysis could identify the traffic flow and thermal signatures differentiating between cars, trucks, motorcycles, planes, trains, boats and other vehicles or vessels. This technique could also identify stalled vehicles or those catching fire, particularly in high density underground tunnels.

The ESD and related databases may have a client-server architecture, as described in the subsection titled "Design Overview", so both client and server software may be utilized. An example of information on site properties and context is the geographic location, date, and time of collection of a specimen, media or object for spectral classification and gathering of other traits. Trait information may comprise a specimen or media identifier such as a sample number assignment and a text descriptor value, for example, electrical device. However, the trait information may be descriptive, especially when reference materials are extracted from the literature; examples include local and regional vegetation, and the proximity to paleolakes. This trait information for a reference collection or reference group within a reference collection may exist in the primary literature, but it also may have been obtained from other sources. Data coding can be designed to provide information in a form that can be utilized to infer the characteristics of the source of a newly acquired sample specimen or media. It is anticipated that a significant portion of the client and server software will be common to both (or several) database applications. The initial databases and related software provide a base platform for other database applications in the future. The database server and associated data processing methods may be implemented, for example, using the C++ or a similar programming language, and a client device may be implemented using Java, C# or other programming language suitable for implementation of a user interface or client program.

Tagging in the ESD database may uniquely identify the objects, specimens and media and selected properties or traits. Multivariate statistical analysis (MVS) and clustering can play a key role in identifying nearest neighbors and clustering. Matlab may be utilized to provide a rapid prototyping capability to assess design and data analysis alternatives. Clustering opportunities may determine an efficient indexing and search method to be used for the database. Electrical and acoustic spectral data are, at a fundamental level, vectors that can be processed and aggregated using methods based upon principal component analysis (PCA) and clustering algorithms. Various metrics and dimension reduction are investigated via impedance spectral data and a top five list of metrics determined.

The indexing method may be entropy/adjacency, and is not limited to MVS or PCA. These methods may be used in combination. Entropy measures the ability of a node in a database index to segregate data in a reference data collection or reference group (subset of the database) into two or more portions of roughly the same size or complexity. Dynamic indexing as discussed below provides efficient clustering of data into smaller and smaller clusters or data groups. Adjacency measures the ability of a node in a database index to impose structure on these portions that preserve similarity—meaning that similar objects are in portions that are similar (a hierarchical data model where if you want to search for an object near (or contained in) portion A, and if the neighborhood of results of interest is sufficiently large, you also want to search for objects in portion B (or multiple portions) where the data in portion B is more similar to the data in portion A than other data in the database. There is a trade-off between entropy and adjacency—our prior work found that a substantial gain in adjacency can be obtained at the expense of a small decrease in entropy (or increase, depending upon the sign that is used—either information gained from applying the query or series of queries, or entropy of the resulting portions).

Examples of indexing methods include: (a) indexing of sequences, including text (words) or characters, using a measure of edit distance, which, when properly defined is a metric and therefore the metric space indexing methods described in Z. Shen's thesis, cited above), (b) indexing of sequences of numbers using a measure of the correlation between the sequences, such as $R^2$ or Mahalanobis distance, or inner product of vectors, (c) A similarity between labeled fragments (such as STR DNA) can be defined as described in our database patent family and (d) indexing can be based upon similar hierarchical decompositions of objects, such as the tree of shapes and shape descriptions of segments in images, as used by Y. Pan in his PhD dissertation and the IEEE Trans. Image Processing paper, cited above, and (e) 3-d structures such as organic compounds and nanoscale structures can be indexed based upon their structural similarities, using, for example, a spanning tree of an annotated graph representing the structure, with term rewriting rules to determine similarities in structure (creating, in some applications, an equivalence relation on the set of possible spanning trees and a measure of similarity between equivalence classes). This can also be used to define the similarities in the structural descriptions of microscopic particles such as charcoal, pollen, and forams. (f) Finally, indexing can be based upon metric space methods by embedding objects in a metric space (or associating objects with elements of a metric space) and using an inverse of the metric, such as an additive or multiplicative inverse, evaluated upon a pair of objects, as a measure of the objects' similarity.

Design Overview

This section provides an overview of the design of a database that implements efficient similarity-based, or nearest-neighbor search. This means that a request to search the content of the database will return identifiers for objects that are within a specified distance to a reference, or target, object but may not precisely match the target's characteristics. One way to define the term "distance" uses a metric that is defined on the stored objects, and that can quantify the dissimilarity between two stored objects. A metric satisfies the triangle inequality, and this fact can be exploited in the design of a database index. However, a measure of distance does not have to be a metric. For example, see U.S. Pat. Nos. 6,741,983; 7,272,612; 7,454,411; 7,769,803; 7,882,106; 8,060,522 and 8,099,733 for more general indexing structures that rely upon concepts of "distance" that are not all metrics.

Several metrics may be defined and utilized to satisfy a request to search the database, in which case the returned identifiers refer to objects, specimens and media that are within a specified distance to the target object with respect to each metric. There are performance advantages that can be achieved when the stored objects can be represented as values in a vector space and/or when a metric can be used as a measure of distance, or to define the similarity of objects, but this is not necessary and is not feasible in all applications.

Figure 2:
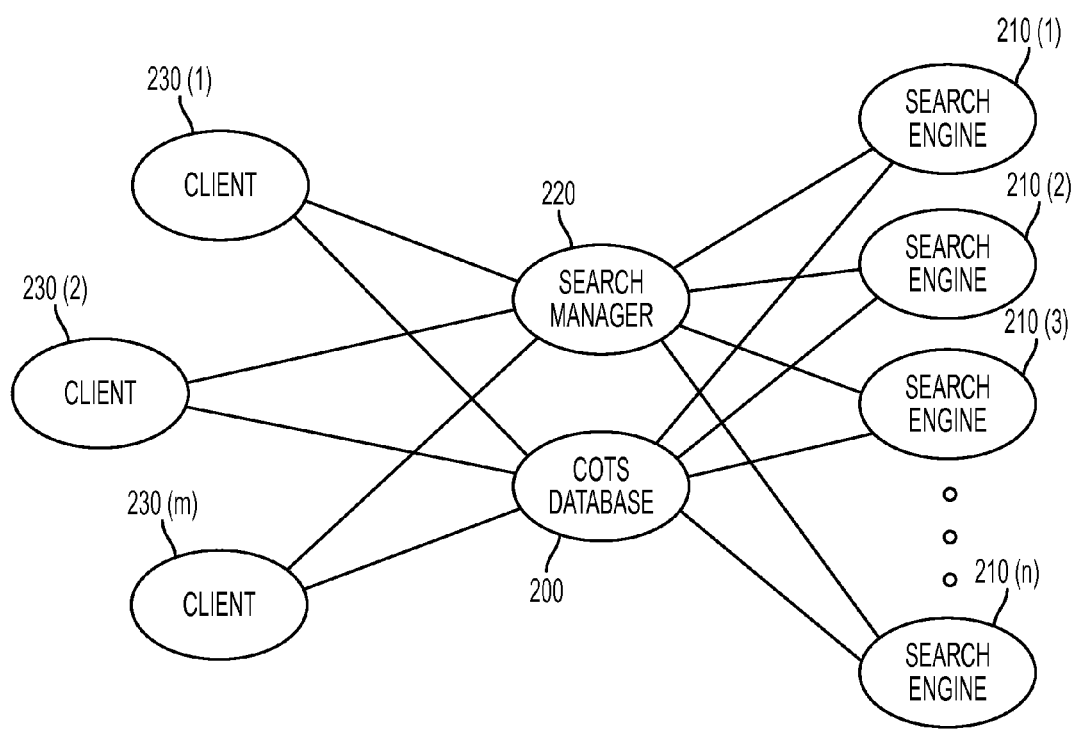
FIG. 2 is a graphical overview of the architectural components of a client-server database supporting similarity-based indexing, search and retrieval according to one embodiment using multiple search engines.

FIG. 2 provides a graphical overview of the primary architectural components of a client-server database supporting similarity-based indexing, search and retrieval using multiple search engines. The database (or preferably a collection of databases) utilizes a client-server architecture that provides simultaneous services to multiple clients. Architectures have been implemented that leverage the advantages of parallel computation, using both clusters of computer nodes and single nodes with multiple processors and cores. A commercial off-the-shelf (COTS) database 200 or a computer or network file system (referred to herein as a "COTS Database") can be utilized for persistent storage, while the high-performance in-memory indexing and search technologies are implemented in Search Engines 210(1) to 210(n) that operate as cooperating threads or tasks within the overall architecture. A Search Manager 220 provides coordination between the Clients 230(1) to 230(m), a COTS Database 200, and Search Engines 210(1) to 210(n), as well as the initial connection protocol for the Clients 230(1) to 230(m). The application can be parallelized by allocating separate computational resources to each component or subsets of the components, such as a Search Engine 210(1) to 210(n), by allocating multiple computational resources to any component, as occurs in a Search Engine 210 that utilizes multiple threads, or using a combination of these methods. Communications among components in a parallel implementation may be effected using a communications medium such as a computer network or using shared memory.

A simple example illustrates the design concept. Suppose a database contains fourteen objects, and that each object is described by a vector of attributes that are real-valued. Pre-processing (FIG. 21) of data can be by data extraction or filtering, such as low or high pass filtering, or Kalman filtering, extended Kalman filtering, particle filtering, or other methods of filtering as are known in the art (both using a model of relationships among members) or parameter or system identification. These attributes can be analyzed using multivariate statistical analysis (MVS), for example, using principal component analysis (PCA) as described in a subsequent section, to determine a smaller dimensional (two in this example) subspace of the attribute space in which the objects can be clustered into groups (three in this example) via dimension reduction (for example, per FIG. 22). In this simple example, assume that a measure of similarity between objects, using the projections of the attribute vectors onto the principal component basis vectors for the subspace, is the inverse of Euclidean distance between points; (fourteen different metrics are analyzed herein).

Views

One aspect of one embodiment of the database architecture is the View; which provides the basis for the implementation of a Search Engine. Referring to FIG. 2, there may be a plurality of Search Engines 210(1) to 210(n). The COTS Database 200 of FIG. 2 can contain an arbitrary collection of stored objects, which can be arranged in a relational structure that, although a factor in the performance of the database, does not have a direct relationship with Views or Search Engines 210. For each View, a specification determines the set of objects in the COTS Database 200 that can be accessed using that View, called the Viewable Set. This means that in general not all stored objects may be accessible from a single View. This is reasonable, since some objects can have, for example, images that are indexed using information derived using a View, while other objects do not.

A View includes a specification for an Attribute Set, which is the set of attributes that can be extracted from any object in the Viewable Set. An attribute value can be any data structure; examples include vectors, sets, and trees of data objects. For example, a "tree of shapes" description and organization of the segments that correspond to a portion of an image can be an attribute value. At its most trivial, an attribute value is a number or a symbol. The Search Engine 210 that utilizes a View indexes its attribute values, and the attribute values are stored in the Search Engine's address space. Attribute values are derived from stored objects and can be utilized for rapid comparison of the objects, but note that while two identical objects will have identical attribute value sets, identical attribute value sets do not imply that their corresponding objects are identical.

A View defines an Extractor, which is an algorithm that can be applied to a stored object within the Viewable Set to produce one or more attributes, each of which is a value in the Attribute Set. The Search Engine associated with a View typically applies the Extractor to all stored objects that are in the Viewable Set (as they are stored), and therefore contains within its address space at least one attribute value for each stored object.

A View defines at least one Partition on the Attribute Set. Each Partition defines a Function from the Attribute Set to a finite set of categories, or labels, and optionally to a metric space. A metric space is a set of values that has an associated distance function $d(x,y)$ that assigns a non-negative number, the distance, to every pair of values x and y in the metric space. The distance function must satisfy three properties: (i) $d(x,y)=0$ if and only if $x=y$ for all x and y, (ii) $d(x,y)=d(y,x)$ for all x and y, and (iii) $d(x,y)+d(y,z)>=d(x,z)$ for all x, y, and z. If the metric space is defined, the Partition assigns a category or label to each element of the metric space. Typically, this assignment is accomplished in a manner that allows an efficient implementation of an algorithm to compute the category associated with any value in the metric space. The Search Engine 210 utilizes Partitions to implement a "divide and conquer" search and retrieval strategy, isolating possible matches to a specified request to search to subsets of categories and implementing a tree-structured index to leaf nodes that contain attribute values and identifiers of stored objects. The advantage of this approach over the capabilities offered by traditional database technologies is that it supports indexing methods that allow similarity-based search and retrieval and depend upon both multivariate and multi-valued (set-valued) quantities; two examples are described in U.S. Pat. Nos. 6,741,983; 7,272,612; 7,454,411; 7,769,803; 8,066,522 and 8,099,733, referenced above.

The Function typically implements one or more data reduction steps, such as are described in the section titled "Multivariate Statistical Analysis and Data Clustering". The intent of the data reduction steps is to determine a minimal set of attribute values that enable efficient partitioning of the stored objects into disjoint collections of roughly equal size, and, where feasible, to cluster like objects by assigning similar attribute values. Therefore, the Function can effect a transformation of the information associated with the stored object into a useful form that enables at least one of clustering, partition and indexing. As described later, this is typically accomplished through a combination of proper selection of data encoding methods and statistical analysis, either using previously acquired data or using a dynamic process as new data are acquired and stored.

Properties

Properties are similar to Views but are not utilized to construct indices or Search Engines 210. A Property has specifications of a Viewable Set of objects and an Attribute Set of attribute values that those objects may possess. Unlike Views, attribute values associated with objects are provided by an external source rather than computed by an Extractor. For example, an attribute value can be a manufacturer or a geographic coordinate where the object was found. A typical application would attempt to infer property values for newly acquired objects using a search for similar objects stored in the database 200 and a model of how property values vary or correlate with other attributes of the object.

Search Engines

Search Engines 210 implement high-performance indices for the database 200 of stored objects that allow objects similar to a specified target to be located and retrieved. Each Search Engine 210 corresponds to at least one View into the stored data. (An example of a search engine that utilizes two views is provided in U.S. Pat. No. 6,741,983, where a partition can utilize information from two DNA loci.) Two possible Search Engines 210 implement indices of electrical, electromagnetic, optic or acoustic spectra data, and microbody, for example, charcoal particle or microfossil, assemblage data. A Core Database 200 functionality is capable of supporting more advanced Search Engines 210. For example, a first Search Engine 210 may be defined that indices surface sculpturing on pollen grains, allowing reference pollen data to be retrieved that describe grains with similar texture to a target sample. Other Search Engines 210 may be defined to index the data based upon overall shape, size, and physical attributes such as apertures. Still other Search Engines 210 may be defined to index the data on spectral characteristics among acoustic, electrical, optic or electromagnetic data received, for example, via a passive directional antenna.

Referring again to FIG. 2, a Client 230 can specify a search context that requires similarity in size, shape, apertures, and texture, which would be interpreted by the Search Manager 220 to require searches using multiple indices (Search Engines) 210 and subsequent analysis and combination of the results. There may be a plurality of Clients 230. For example, a reference to a stored object could be returned only if it were similar to the target object in at least three of the four attributes. Another Search Engine 210 could implement an index into spectral data obtained from physical components, retrieving information about stored objects of that type that have similar spectra. Information describing both types of objects (and others) can be stored in the underlying COTS Database 200, whose primary functions are to implement persistent storage and provide the usual capabilities of a relational database.

Each Search Engine's index may be tree-structured. Operations may begin at the tree's root, and paths of descent from each node of the tree are excluded if no possible matches to the current search specification and target can exist on those branches. Leaf nodes of the tree contain attribute information and references to objects within the COTS Database 200. The attribute data can be used to exclude many referenced objects as possible matches, leaving a small number of objects that require additional analysis—and possibly retrieval from the COTS Database 200—to determine the final set of matches. In some cases it is possible to maintain a complete copy of each object within the address space of the search engine, if this is required for high performance applications. The Search Engines 210 can support multi-threaded operation, allowing the simultaneous processing of requests from multiple clients, or from a single client that has submitted several requests. In one embodiment, write operations, which store new data in the COTS Database 200 or modify the index structure, block other queries to maintain the integrity of the index structures. These operations require coordination across Search Engines 210, or within the Search Manager 220, because a write initiated in one index may require modification of data within another index that can access the same object(s). An alternate embodiment allows non-blocking writes with subsequent coordination among processes that access overlapping information sets to resolve conflicts or inconsistencies. Referring to FIG. 2, the Search Manager 220 is shown connected to both Clients 230 and Search Engines 210.

Models

The utility of the similarity database lies in its ability to predict characteristics of newly acquired samples using a cumulative database of previously gathered and analyzed materials. It is unlikely that an exact match will be found to any particular target, but it is possible to model Properties of the new sample using the Properties of similar stored samples. This may be accomplished using interpolation and either deterministic or statistical models, which may be either single- or multi-variable models, or more complex models may be utilized, as described earlier. The similarity search becomes the first step in this process by restricting consideration of stored objects to those that are most similar to a target object.

A Model includes a specification of Properties, which identifies the Viewable Set of stored objects to which the Model can be applied and the Attribute Set that can be utilized by the Model. The model also specifies an Algorithm to be used to compute values of a subset of the Attribute Set for a target object, given a set of stored objects and the target object. The Model may incorporate an optimization method or an approximate optimization method to adapt or fit the Model to a subset of stored objects in the Viewable Set. Note that the attribute values can include computed estimates of errors, in addition to the estimates of values such as geographic location, manufacturer, or geographic characteristics such as expected nearby land features. Note also that geographic location and characteristics could be utilized in an interface to a Geographic Information System (GIS) such as ARCinfo.

An important feature of a Model is its ability to adapt to new information. As additional objects are acquired, analyzed, and stored in the database, their associate data are available to the Model's Algorithm. A search for stored objects and inferred information relevant to a new object is expected to provide more precise answers as additional data are acquired and stored in the database system. In all cases, the Model should utilize current stored data from objects that are most similar to a target object's characteristics to develop inferences.

Filtering can be used to assess the quality of a model's fit to data (degree with which it accurately describes the relationships among the objects). For example, one can examine the residuals or innovations processes in filters to determine how accurately the filters model or match the behavior of the group of objects. These filtering methods are well-known in the field of electrical engineering (subfield of systems and controls), and are also utilized in statistics and business applications.

Similarity measures can be used to cluster by similarity and then apply model(s) to clusters to test hypothetical relationships—with or without a target object. The target may be a member of the database 200. For example, one may perform searches for similar objects contained in the database for all members of the database 200.

SUMMARY

A purpose of the present design is to provide a predictive modeling capability that is based upon collected reference data, spectral data in particular. The reference collection is preferably dynamic: As spectral data for new objects, specimens and media are stored in the system, the quality of inferences improve. The design is not bound to a single modeling paradigm: Models may be as simple as a linear interpolation or a lookup in a database table, but they may be much more sophisticated, using multivariate data and optimization, and restricted only by what can be coded in a standard programming language to utilize the structured data associated with stored objects. Similarity based search enables the Models to utilize the data that are most similar, using multiple factors, to a target object, and, since all stored data are available to the Search Engine 210, the most recent data are utilized, allowing the predictive modeling capability to remain up to date at all times. The patented and patent pending technologies that have been developed at the University of Tennessee allow high-performance similarity-based search strategies to be effectively implemented even for very large data collections, with demonstrated scalability into the hundreds of millions of stored data objects and demonstrated performance of hundreds to ten thousand completed searches per second utilizing readily available off-the-shelf hardware.

Multivariate Statistical Analysis and Data Clustering

Now a method that uses multivariate statistical methods to determine clusters is described that can be utilized to partition portions of a database into groups with similar properties and of roughly equal size; see, for example, U.S. Pat. No. 6,741,983. As a result, this method generates partition information that can be incorporated within or associated with an arbitrary node in a tree-structured database index.

The raw data associated with objects to be stored (or retrieved) in the database 200 are represented as vectors of numbers. These numbers may be binary and represent the presence (binary "1") or absence (binary "0") of a specific trait of a specimen. This encoding scheme is often used for measurements that assign categories, such as "rough", or "elliptical", or that represent the presence or absence of features in raw data, such as signal peaks. Measurement can also yield floating-point, or real, values, in which case the raw values, either scaled or un-scaled, can be utilized. Principal Component Analysis (PCA) of the data is utilized to decrease the dimensionality of the raw data by identifying directions of maximum variation in the original data and transforming the data to a new and lower dimension coordinate system. For use in a database, coordinates are desired that result in discernable and clusterable patterns in the reduced data space. Distinct clusters, usually less than 10, can be established using a clustering method, such as k-means; see, for example, J. T. Tou and R. C. Gonzalez, *Pattern Recognition Principles*, Addison-Wesley, Reading, Mass. 1992 or k-modes or k-prototypes; see, also, Z. Huang, "Extensions to the k-means Algorithm for Clustering Large Data Sets with Categorical Values," *Data Mining and Knowledge Discovery* 2, 283-304 (1998). The membership of each cluster is then identified and recorded. This partitioning occurs at each level of the tree-structured database index, enabling a "divide-and-conquer" approach to data retrieval. When searching for data matching a target's characteristic, the target can be classified into one of these clusters at each level of the tree. A subsequent search can be restricted to members within this cluster. This reduces the search problem by approximately one order of magnitude at each level of the index tree, as the search descends the tree.

Principal component analysis (PCA) is a method for analyzing a matrix of high dimension, revealing correlated information and representing it with a much lower dimensional matrix without sacrificing significant information contained in the original data matrix (dimension reduction). PCA involves a rotation from the original frame of reference to a new frame of reference, whose axes are given by the principal components from the PCA. The first principal component represents the direction along which the variance exhibited by the original data points is maximized and is made up of a linear combination of the original variables. The second principal component, orthogonal to the first, represents the direction along which the remaining variance is maximized. Additional principal components are defined in a similar fashion.

To implement PCA, the Singular Value Decomposition (SVD) method can be used to decompose the data matrix, X, into the product of three matrices, in which the columns of the matrix, V, are referred to as the "principal components" of the SVD of the data matrix, X; see, for example, G. Strang, *Linear Algebra and its Applications* 4$^{th}$ ed., Brooks Cole, Florence, Ky., 2005. Thus, $$X = U\Sigma V^T$$

where U and V are orthogonal matrices, and $\Sigma$ is a diagonal matrix with non-negative elements arranged in descending order. The columns of V, being the principal component vectors, represent the coordinates or basis of the axes of the new frame of reference. The ratio of the square of each singular value to the total sum of squares of all the singular values represents the percentage to the total variation contributed by each principal component. A Scree plot can be developed to show the cumulative ratio of this measure.

Since the original data are assumed to be heavily correlated, and the singular values are arranged in descending order, one can make a decision as to how many principal components to keep in building the PCA model to represent the original data. The discarded data along the remaining principal components are regarded as less important and are ignored.

Each principal component is of unit length and orthogonal to all other principal components. The principal components are the columns of the right singular matrix, V, of the singular value decomposition (SVD) of the data matrix, X, above. Each principal component is expressed as a linear combination of the original variables, with the entries of the principal component expressing that particular linear combination. The absolute values of all entries are less than or at most equal to 1. Therefore, those entries with relatively large values indicate that the corresponding original variables exert greater influence along this principal component's direction. The variables with correspondingly heavy weights are also the ones being correlated in the original data set.

If the columns of the data matrix, X, are not first mean centered, such that the mean of each treated column is zero, then the first principal component reflects the average values of the variables represented in the new principal component frame of reference. It is then the next few principal components that serve to differentiate between specimens, media or objects. Therefore, mean centering is an optional step that provides no additional capability and may not be performed here.

After the principal components are found, each data vector can be projected onto each principal component. The projected vector is referred to as the scores vector for each sample. The length of the scores vector indicates how closely aligned each sample of that data is to that principal component. The bigger the projection, the better the principal component represents the data vector. Thus, data vectors with comparable projections onto a principal component can be regarded as "similar" to each other, with respect to that principal component. Those data vectors with high projected values onto the principal component indicate that these data vectors are highly aligned with the principal component, therefore representing more of the original variables which are heavily weighted in that principal component. Similarly, projections of data vectors onto each of the succeeding principal components can be carried out to get the scores and their projections onto those principal components.

Because of the different degree of variation exhibited by the data vectors along the different principal components, normalization is necessary, such that normalized distances from the origin to each projected point can be meaningfully compared. Many different metrics may be employed. One highly thought of metric in the analysis of DNA is Mahalanobis distance. The Mahalanobis distance measure is employed, in which each projection is divided by the corresponding singular value. The Mahalanobis distance scores are calculated as follows:

$$\text{Mahalanobis Scores} = XV\Sigma^{-1} = U$$

where X represents the original data matrix, and U, Σ and V are from the SVD of X. Postmultiplying X by V performs the projection of the rows of X onto the principal components, with the projected vectors represented with respect to the principal component axes. Postmultiplying XV by $\Sigma^{-1}$ scales each column of XV by the inverses of the corresponding singular values contained in Σ. A two dimensional plot can be used to show the scores onto principal components i and j. In plotting the scores plot in, say PC2 and PC3, it is the row entries from the second and the third columns of the Mahalanobis scores matrix (the U matrix) that are plotted in a 2-d plot. Henceforth, the Mahalanobis or other metric scores shall simply be referred to as the scores.

An aspect is why certain principal component axes, taken for particular portions of the raw data, exhibit good clustering properties, while others may not. The answers lie in both the statistical properties of the data and the encoding method.

The Boolean expressions that describe each cluster form a test that can be applied to any data record. These tests can be utilized to form a decision tree that sequentially applies tests to assign the record to a cluster, and therefore to a descent path through the database index, using the methods of inductive inference that were pioneered by J. Ross Quinlan; see, for example, "Induction of decision trees," *Machine Learning* 1:81-106, 1986. In this case, each node of the database tree that utilizes clusters derived from the multivariate statistical analysis method would contain a decision tree specifying the sequence of tests to be applied to specimens or media at that node, and the database tree can be rewritten by expanding these nodes and incorporating the decision tree's nodes into the database tree.

Figure 3:
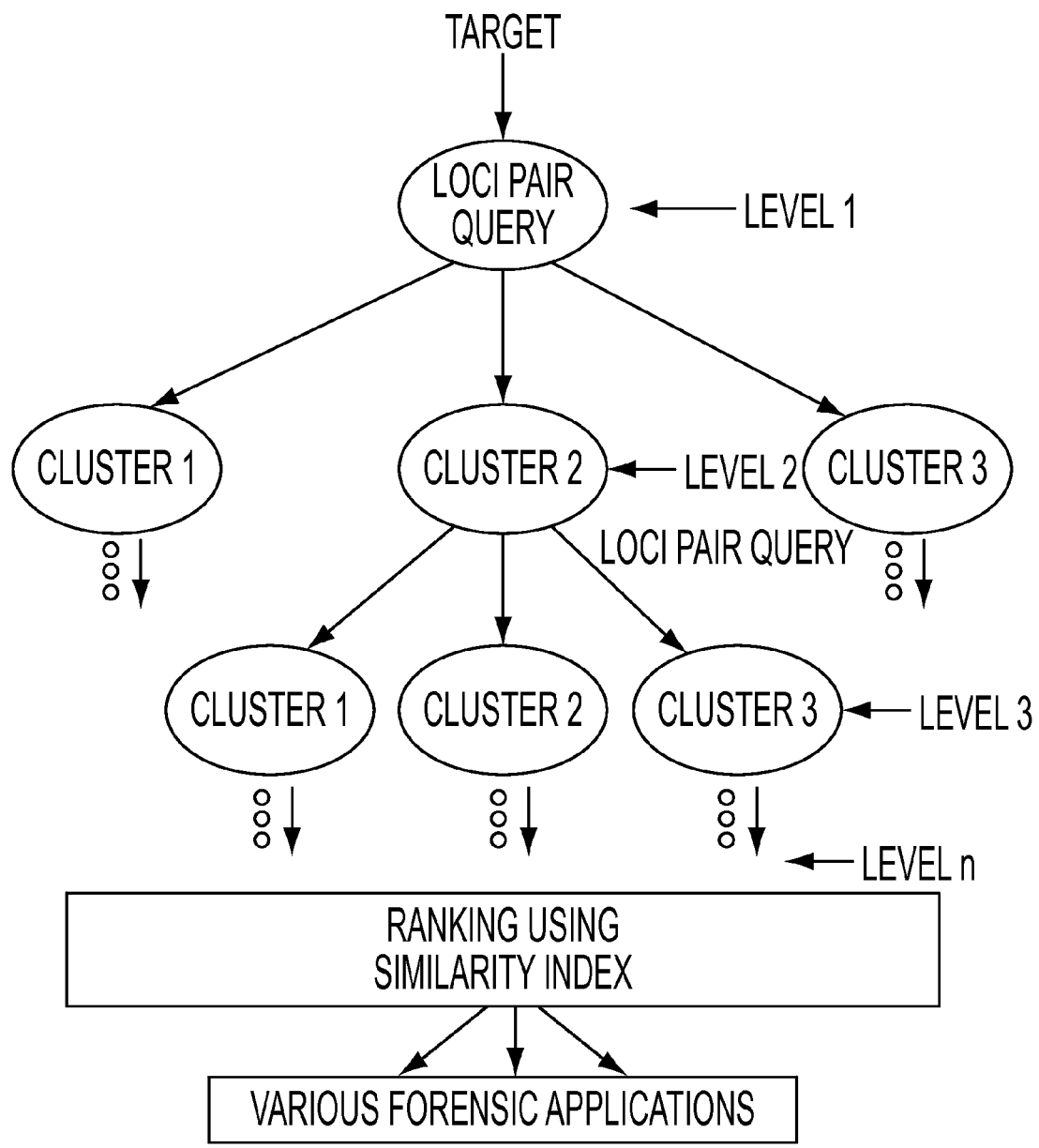
FIG. 3 provides a graphical depiction of a database index constructed from the results of multivariate statistical analysis and a ranking strategy.

A graphical depiction of the database index that results is shown in FIG. 3. FIG. 3 is a graphical depiction of a database index constructed from the results of multivariate statistical analysis, combined with a ranking strategy based upon a measure of similarity between objects, to address the needs of various forensic applications. This method has been utilized for both DNA profile and image indices (as discussed later). PCA is utilized to reduce the volume of the raw data, and to focus attention upon a small number of data attributes (principal components) that cause the data to form clusters, resulting in a decomposition of the database. Target or unknown provides a loci pair query and results in clustering and sub-clustering to achieve raking using a similarity index metric for various forensic application.

This method has been utilized for both DNA profile and image indices (as discussed later). PCA is utilized to reduce the volume of the raw data, and to focus attention upon a small number of data attributes (principal components) that cause the data to form clusters, resulting in a decomposition of the database. It is possible, however, to utilize too much information, in which case clustering will not be achieved. For example, from our previous work, the use of PCA methods to analyze allele information for 16 loci simultaneously does not exhibit clustering. Thus, a key discovery of this work is that it is important to limit the application of PCA methods to a portion of the available information to achieve good clustering results. A subsequent data fusion step can be employed to combine information found by searches of multiple indices, in a manner similar to the methods utilized in commercial databases to combine the results of searches of two or more tables. In the DNA database used to illustrate the method, the information at each level of the database index tree was limited to allele data for two loci.

The factors that determine good clustering and the reason for the clustering have been presented and briefly discussed. Successive partitioning using different Views (2-loci combinations in this example) at each round very rapidly reduces the number of objects present within each cluster. Partitioning by PCA clustering can be inserted into suitably chosen non-terminal nodes of the database index tree, to search for matching data objects against a target object. After passing through this node, the number of candidate objects that remain to be searched is reduced by approximately one order of magnitude. (Seven to nine clusters usually resulted from PCA clustering of the DNA profile data, in which the clusters are about equal in size.)

A very high level of performance is typically achieved using a database constructed in this manner. First, the database's tree-structured index can be maintained in memory, as well as vectors of attributes for the stored objects. Second, the operations that must be performed at each node of the index are a small number of vector inner products (to obtain the scores for a search target for each principal component used by the node), followed by evaluation of a set of Boolean expressions involving a small number of comparisons. Depending upon the complexity of the application, search times for exact matches of microseconds to 10s of milliseconds are feasible for a database that resides completely within the computer's memory, with longer times required for inexact (similarity-based nearest neighbor) search. The methodology exhibits good scalability, with the largest runs to date involving over 100 million stored objects. Search times typically scale logarithmically with database size. The search time varies with the target and the portion of the database that must be searched (which is determined by the data associated with the target).

Figure 4:
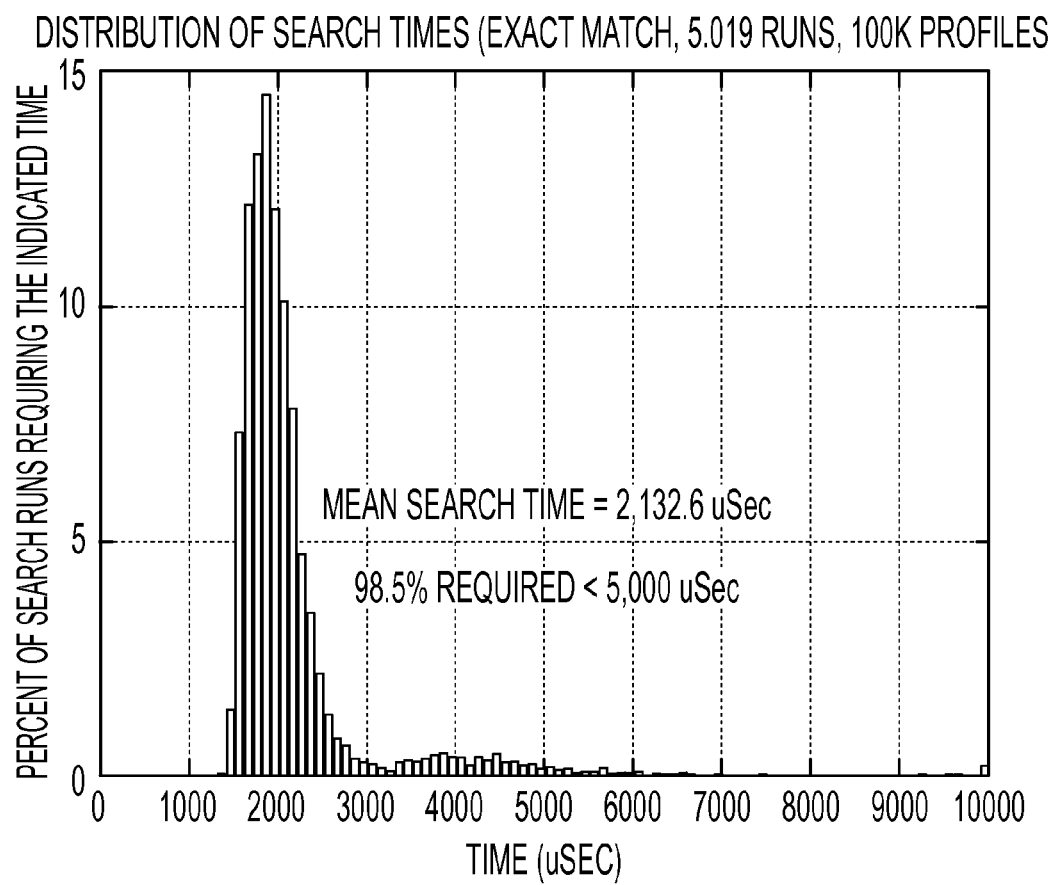
FIG. 4 provides a histogram of times required to search a 100,000 DNA profile database for an exact match to a profile.

FIG. 4 shows a histogram, using run data from 1999, of search times for an exact search to a specified DNA profile (5019 runs) of a 100,000 DNA profile database, which an average search time of approximately 2.1 microseconds. The methodology can also be parallelized, as described, for example, in U.S. Pat. No. 7,454,411, using either a symmetric multiprocessing platform or a computer cluster.

Similarity search based on metric spaces was first introduced in Burkhard, (W. A. Burkhard and R. M. Keller, "Some approaches to best-match file searching," *Comm. ACM*, 16 (4) 1973, 230-236). The triangle inequality was first used for similarity search by Koontz, (W. L. G. Koontz, P. M. Narendra, and K. Fukunaga, "A branch and bound clustering algorithm," *IEEE Trans. Comp.*, C 24, 1975, 908-915). Algorithms based upon this approach can be divided into two categories according to the way in which they partition the metric space. Some partition the space using reference points, while others achieve that based on Voronoi partitions, (F. Aurenhammer, "Voronoi diagrams: a survey of a fundamental geometric data structure," *ACM Comp. Surveys* (CSUR), 23 (3) 1991, 345-405). This portion of prior research has focused on approaches based on reference points. In these approaches, several points in the metric space are chosen, and the distances between these points and all the remaining points are calculated. The metric space is then partitioned according to these distances. For example, Yianilos implemented vp-tree using this idea; see, for example, P. Yianilos, "Data structures and algorithms for nearest neighbor search in general metric spaces," *Proc. of the 4th Annual ACM-SIAM Symp. On Discrete Algorithms*, Austin, Tex., 311-321, 1993. In the literature, the number of metric computations is typically cited as the criterion of performance. However, this is not a good indicator of performance when preprocessing steps are utilized and the metric is applied to a feature vector. Search accuracy is also a very important aspect of performance, and must often be judged subjectively using human evaluation. The critical issue is whether searches return results that are useful to the end users, and the choices of metric space and preprocessing steps both influence subjective search accuracy. New performance criteria that consider both search efficiency and utility have been utilized in our prior research to guide the development of spectral databases; see, for example, Z. Shen, *Database Similarity* . . . , M.S. Thesis, cited above.

FIG. 5 illustrates an example of the partition of a 2-level indexing tree. In (a), the space at tree level 1 is partitioned into three annular regions $R_{11}$, $R_{12}$, and $R_{13}$ (with a fourth region implicitly extending from the largest boundary shown in the figure to infinity, which is generally empty). At tree level 2 in (b), the space is partitioned into two annular regions $R_{21}$ and $R_{22}$. The final partition of the 2-level indexing tree is produced by the intersections of these five annular regions. There are eight subsets in the final partition (not including the implicit regions that extend to infinity).

Image similarity search methods that use indices based upon reference points may use the triangle inequality to rule out partitions, and therefore paths of descent in the index tree, that can not contain a solution. The search request propagates through the tree-structured index, and a candidate set is generated. A result set, which is a subset of the candidate set, is obtained by exhaustively searching the candidate set. The candidate set of query (q,r) is found using the triangle inequality.

In FIG. 6, three points, a reference point $p_j$, the query target q, and an object $u_i$ are located in the metric space, demonstrating the triangle inequality in similarity search. The triangle inequality relates the values of the metrics, or distances, as represented in the figure by lines, by the inequalities:

$$d(q,u_i) \leq d(u_i,p_j) + d(q,p_j)$$

and $$d(q,p_j) \leq d(u_i,p_j) + d(q,u_i) \Rightarrow d(q,p_j) - d(u_i,p_j) \leq d(q,u_i),$$

or $$d(q,p_j) - d(u_i,p_j) \leq d(q,u_i) \leq d(q,p_j) + d(u_i,p_j).$$

If $u_i$ belongs to the result set, it should satisfy the search criterion $$d(q,u_i) \leq r,$$

or $$d(q,p_j) - r \leq d(u_i,p_j) \leq d(q,p_j) + r.$$

Therefore, a necessary condition SC that must hold in order for the search criterion to be satisfied by $u_i$ is, $$SC = \bigcap_{i=1}^{k} \{u_i \in U \mid d(u_i, p_j) \in [d(q, p_j) - r, d(q, p_j) + r]\}$$

The candidate set Cand is the union of all the stored objects lying within partitions that intersect the search criterion SC, $$Cand = \bigcup_{i=1}^{t} \{P_i \mid P_i \cap SC \neq \emptyset\}$$

where t is the total number of partitions. Once the search request has been restricted to the candidate set, the candidate set is scanned exhaustively to get the result set, $$\text{Res} = \{u_i \in U | u_i \in \text{Cand} \wedge d(u_i,q) \leq r\}$$

FIG. 7 illustrates an example of processing a search query (q,r) on a two level index tree based upon reference points. In (a), three subsets intersect with the search criterion, and in (b) two subsets intersect with the search criterion. The shaded area in (c), which is the intersection of the two shaded areas in (a) and (b), represents the candidate set.

One component of the search time is typically proportional to the size of the candidate set, due to linear search. A second component is due to traversal of the tree, and is typically logarithmic in the size of the database, and a third component is due to computation of the metric distance from the query to each reference point. This is summarized by the equation $$T = N_{ref} \times T_{metric} + N_{cand} \times T_{metric} + T_{tree} = (N_{ref} + N_{cand}) \times T_{metric} + T_{tree}$$

where $N_{ref}$ is the number of reference points, $N_{cand}$ is the number of objects in the candidate set, and $T_{tree}$ is the tree traversal time. Let $N_{metric} = N_{ref} + N_{cand}$, which is the total number of metric evaluations. Since metric computations are usually more time consuming than the time required to traverse the index tree, $T_{tree}$ can be neglected. In most situations, $N_{cand} > N_{ref}$ by a wide margin, so the size of candidate set is the dominant component and the search time is primarily determined by $N_{cand}$.

The design of a CBIR database is typically an iterative process, with trade-off studies performed on a sample of representative images to determine the optimal preprocessing strategy and embedding in a metric space. This process needs to be guided by quantitative evaluations of the performance of candidate designs. Usually, the number of metric computations determined by the candidate set size is used as the criterion to evaluate search performance. However, this criterion only works for comparing different search methods that produce the same result set. In other words, the comparison of $N_{metric}$ is feasible when the search results are the same. Different image preprocessing methods, index structures and retrieval strategies will yield different result sets. Therefore, a new criterion that considers both the candidate set size and result set size is required. The ratio between $N_{res}$, the number of results of a search, and $N_{cand}$ has been chosen to meet this requirement. A high quality search strategy should yield a large value for the ratio $N_{res}/N_{cand}$. In other words, $N_{res}$ should be close to $N_{cand}$, which means few unnecessary metric computations are performed during the search. The value of $N_{res}/N_{cand}$ also measures the efficiency of a search strategy. In order to compare the performance across different data sets, normalized search ranges are used. A normalized search range is the ratio between the search range and the average distance between all the stored objects, or r/μ, where the average distance μ is $$\mu = \frac{\sum_{i=1}^{N_{total}} \sum_{j=i+1}^{N_{total}} d(u_i, u_j)}{N_{total} \times (N_{total} - 1)/2}$$

where $N_{total}$ is the total number of objects stored in the database. A figure that illustrates the values of $N_{res}/N_{cand}$ against different $r_{normalized}$ is used to evaluate the performance of different metrics and data extraction methods. In such a figure, the area under the curve of $N_{res}/N_{cand}$ indicates the performance, and a larger area means a better performance with respect to search efficiency.

Figure 8:
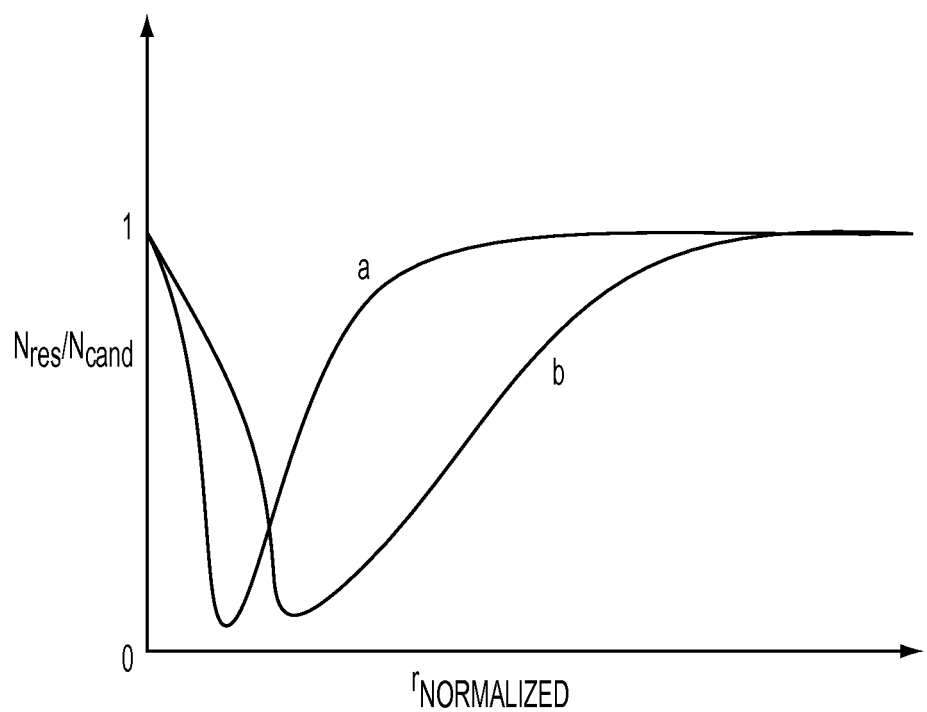
FIG. 8 shows a performance comparison of two data extraction methods.

FIG. 8 is an example figure comparing performance of two different data extraction methods a and b. The area under curve a is larger than that under curve b. Thus, the search performance of using data extraction method a is better than that using b. In order to make this criterion more suitable for practical applications, an improved performance evaluation method is provided. Assume the search ranges are distributed exponentially, i.e., $$p(r_{normalized}) = \gamma e^{\gamma r_{normalized}}$$

for a positive constant γ. The search performance for search ranges smaller than $r_{max}$ can be evaluated by a weighted integration, $$\phi(r_{max}) = \int_0^{r_{max}} \frac{N_{res}(\hat{r})}{N_{cand}(\hat{r})} \gamma e^{-\gamma \hat{r}} d\hat{r}$$

The performance characteristic measured by $\phi(r_{max})$ is expected search efficiency over exponentially distributed search ranges less than $r_{max}$. The value of $r_{max}$ is assumed to be sufficiently large that the contribution by the tail of the distribution can be neglected.

The numeric value of $\phi(r_{max})$ provides a method of comparing search efficiency across candidate database designs. Another critical measure of performance, which tends to be highly subjective, is the utility of search results. In other words, does the search method return results that are useful to users?

Measured properties of spectral/acoustic data, micro-body assemblages and images of objects can be utilized, in conjunction with respective additional dimensional databases that support search and retrieval based upon similarities among objects, specimens and media to provide information about geographic location and other properties of a sampled target object. ESD is one example of a database that can build upon existing technologies that have been developed to implement high-performance similarity search engines.

Dynamic Indexing

Dynamic indexing will now be discussed with reference to FIGS. 9-13. Commercial database products provide an excellent way to organize storage for vast quantities of data. In particular, large volumes of multivariate data are readily stored in a commercial off the shelf (COTS) database. Certain types of multivariate data are especially useful when analyzing relationships between data samples, determining the identity of a device, for example, a target object, providing a sample specimen or media, and developing information for forensic analysis.

A common database operation involving multivariate data is a search for samples in the database that are similar to a given sample, and the ability to efficiently perform the search operation is important. For example, similarity between an unknown sample collected in the field and a reference sample having data stored in a database can reveal information such as traits about, and associations between the unknown samples and the reference samples. A trait of the reference sample may be associated in memory with the unknown sample or, vice versa, a different trait of the unknown sample may be associated with the reference sample. However, data search and retrieval methods supplied with a COTS database are usually tailored for business record management and often perform poorly when used for multivariate data search operations.

Methods for the design and implementation of dynamic indexing strategies that enable efficient search and retrieval of multivariate data extend those discussed in U.S. Pat. Nos. 6,741,983; 7,272,612; 7,454,411, 7,769,803; 7,782,106; 8,060,522 and 8,099,733. Dynamic indexing methods are particularly valuable when used with programs and procedures that explore and analyze relationships between samples in a data set.

Dynamic Indexing—Search Tree Structures

A goal of dynamic indexing is efficiency in searching and retrieving samples from a database. Samples of interest might be ones having certain characteristics or features, or could be samples that are closely related to, or similar to, a search example. But, regardless of how 'interesting' is defined or specified, search and retrieval efficiencies take priority.

Key to implementing an efficient retrieval strategy is providing an indexing structure that rapidly prunes or splits the set of database samples, producing a small set of data samples potentially matching the search criteria and excluding samples that cannot match. Reducing the size of the set to be searched is important; a smaller set of search candidates means fewer samples are passed to a final search method that typically operates on a per sample (linear search) basis.

Figure 9:
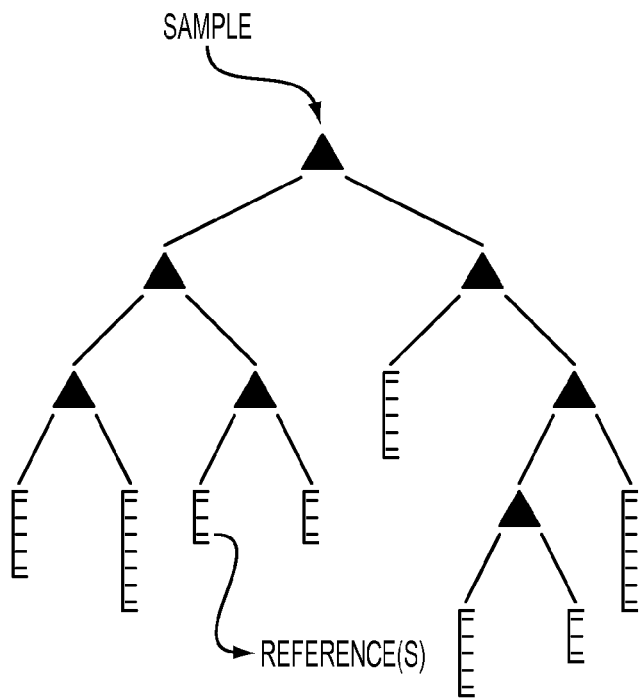
FIG. 9 shows a tree search structure used in dynamic indexing.

A good choice for an indexing structure is a tree configuration, for example, the tree shown as tree search structure FIG. 9, which reduces search times from O(n) to O(log n), where n is the number of samples in the search space. The outcome of tests on samples at query nodes (nodes ▲ in FIG. 9) in the tree structure determine one or more search paths through the tree to terminal nodes that either contain or reference short lists of samples (Reference(s) or knowns). A linear search method operates upon the short sample lists, returning a final set of samples matching the search criteria.

Using a tree structure is a significant part of the dynamic index design, but two additional design aspects are also important: methods for representing the samples and developing the tests that are associated with the query nodes.

Dimensionality Reduction—Reduced-Order Attribute Vectors

Figure 10:
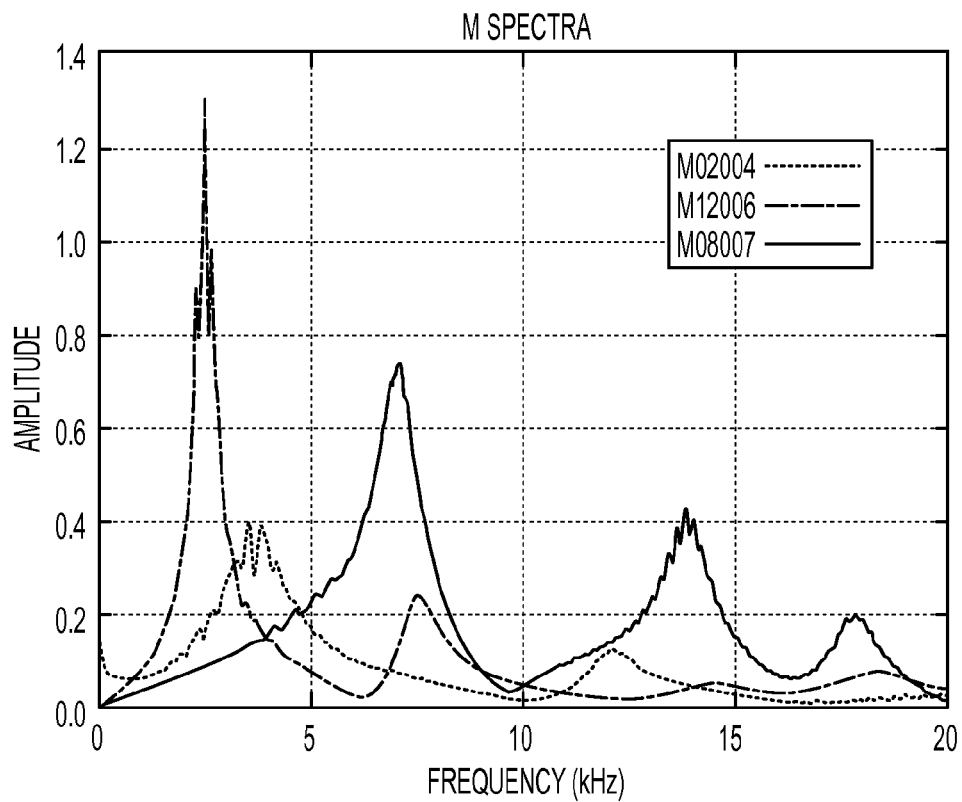
FIG. 10 shows examples of M spectral data of a spectral database of between 0 and 20 kHz frequency.

A set of spectral data of an ESD database is an example of the type of data with which dynamic indexing may be designed to operate. The data are measurements over a range of frequencies or wavelengths producing a complex-valued spectrum for a sample (such as, per FIG. 10, 20 Hz to 20 kHz; only the magnitudes of several spectra as a function of frequency are shown). The audio spectrum is depicted by way of example and should not be considered limiting of a spectral database. Dynamic indexing as discussed herein may be applied to any of the data discussed throughout the specification including but not limited to spectral data, assemblage data, time or frequency series data, historical data, geographical data, DNA profile data, manufacturer data and other data. As discussed above, ESD data may comprise radio frequency, acoustic, optic and any other spectral data, visible or invisible. The magnitudes of the complex-valued data may typically be the more important quantities, and the magnitude spectra for three 'M' data samples (three different curves that have spectral peaks) are shown in FIG. 10. Each sample may be measured at 1,601 frequencies linearly spaced over the depicted audio range of 20 Hz to 20 kHz, i.e. an example of a frequency series of data. The data value at a single frequency is a single sample attribute, and the attribute vector for a data sample is an element of a high dimensional vector space (having 1,601 dimensions).

The dimensionality of spectral data can be reduced by projecting the M spectra data samples onto a lower dimensional subspace yielding significant improvements in computation efficiency. An ideal projection may also reveal structure (at least two clusters of data samples) inherent in the data set while reducing dimensionality.

Variance of sample set attribute values is often exploited to discover structure in the data set. Larger variance tends to indicate data set structure that is more spread out. In a complementary manner, entropy can be used to indicate data set grouping or clustering. Using a combined objective function, variance×entropy (VE), tends to yield clusters of data samples that are well separated in the subspace, if such clusters do indeed exist in the data set. A method has been developed to find a subspace providing structure in the data set that uses a projection search method optimizing a variance×entropy objective function.

In the projection search method, the VE objective function is evaluated over values of the data set samples projected onto a vector, α. Vector α, with $\|\alpha\|=1$, is a projection direction in the existing high dimensional vector space of the data samples. When implementing the VE function for projection search, a quantity related to entropy, information gain, I, is used instead of entropy, with I given by, $I(p(x))=E_{max}-E(p(x))$, where $E_{max}$ is the maximum entropy (see below), and $E(p(x))=\int p(x)\log p(x)dx$ is the entropy of the distribution of the values, p(x), produced when projecting the data sample vectors onto α. Maximizing information gain produces projections with tight clusters of data, and maximizing variance tends to spread out the data clusters in the projection direction.

In the projection search implementation, the distribution, p(x), is approximated by an N-bin histogram of the values of the samples projected onto α. $E_{max}$ is a maximum entropy value and is calculated as the entropy of an N-bin histogram of an equal size data set but with uniformly distributed values. A projection producing at least two clusters for the data set yields lower entropy for the set and provides information gain. Other known approaches for quantifying information gain may be used as well.

The projection search method finds a lower dimensional subspace of the existing data space that exhibits structure, i.e. grouping the data samples into well separated clusters. The space of projections being searched typically contains a large number of local maxima for the VE objective function, which poses a problem for gradient search methods. Gradient methods often get 'stuck' at local maxima and do not proceed to find other, possibly better, solutions.

An alternative to using a gradient method is to use a random search method such as simulated annealing for finding optimal projections. Simulated annealing (SA) operates by randomly generating candidate projections from the space of projections, searching for projections that have higher VE function values. During SA operation, the search region is slowly reduced, focusing the search upon regions of higher VE function values and better (more optimal) projections. Other optimization methods can be used besides SA, such as methods that utilize genetic algorithms.

One strategy employed for finding optimal projections using simulated annealing is to decompose the problem into a search for one projection direction (axis) at a time. Once a first projection is found, the search for a second projection can begin. Candidate projections for a second direction are also randomly selected, but are constructed to be orthogonal to the first projection. Once a second projection is found, the SA method is again applied to find a third projection. Successive projections (axes) are found, each one maximizing the VE objective function in a direction orthogonal to all previous projections, until the R axes of the subspace are produced. The result of the SA search is an orthogonal basis set for an R-dimensional reduced-order attribute subspace exhibiting significant structure contained in the set of data samples. Other strategies or enhancements can be used; for example, one could perform a search for an optimal choice of two directions simultaneously.

Figure 11:
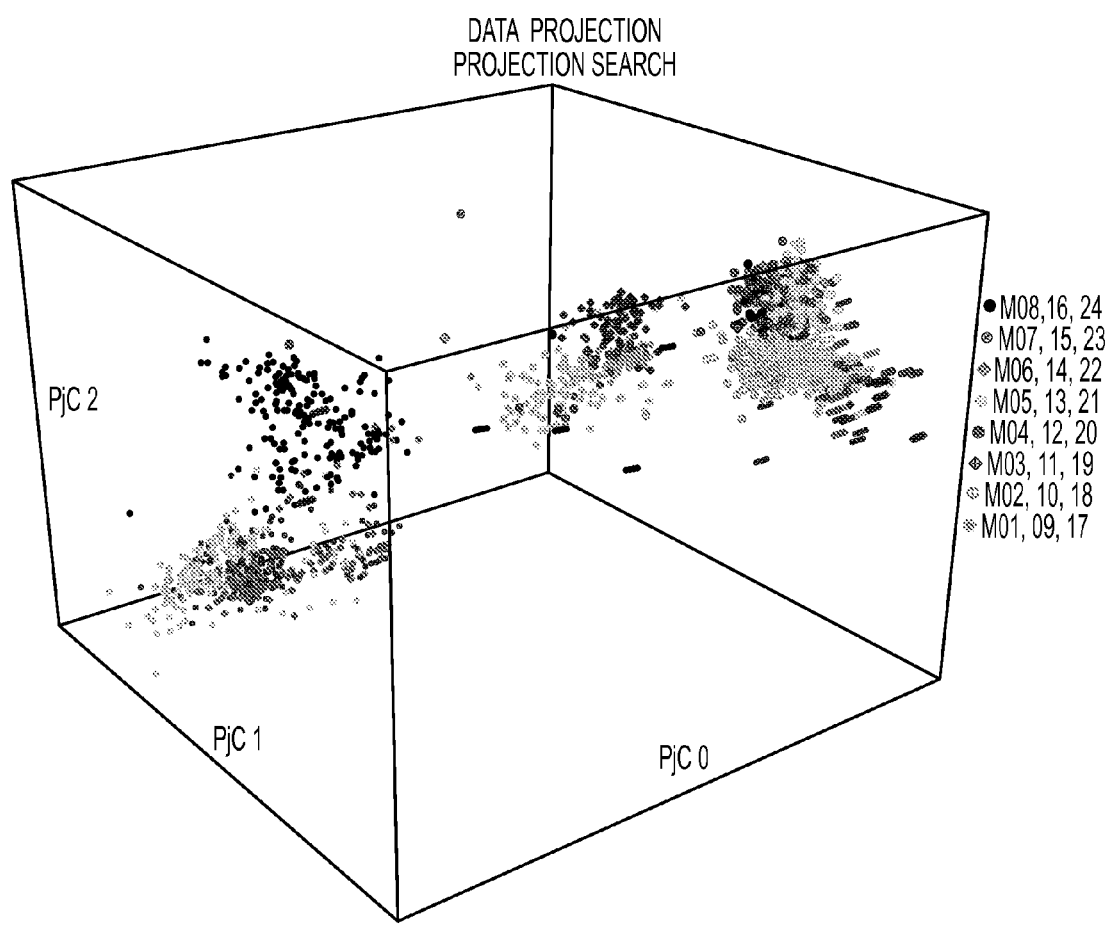
FIG. 11 shows the M spectral data samples of FIG. 10 displayed as reduced-order attribute vectors.

As an example, projection search can be applied to a set of M spectra data as discussed above, with the results shown as clusters in FIG. 11. Each sample in the data set, with label M01, M02, . . . , or M24, is plotted as a point in the scatter diagram of FIG. 11, with a sample's label indicated, for example, by the color and shape of the displayed data point. Projection search in this example reduced the order of the attribute vector space of 1,601 frequency dimensions of the original data to a subspace with 3 dimensions shown as a cube. FIG. 11 demonstrates visually that the M spectra data sample set, with 2,047 samples, is nicely split into two well separated groups in three dimensional space.

The results displayed in FIG. 11 show the sample labels (using color and shape), but a priori label information is not used, nor is it necessary, in dynamic indexing. Dynamic indexing is an unsupervised learning method.

Dynamic Index Creation—Recursive Construction

The tree structure shown in FIG. 9 contains a top level node, the root node (Sample). When constructing the tree, the entire data set is operated upon at the root node, and a test for splitting the sample set is formed. The sample set is split using the test, and the process is repeated. Hence, the method for constructing the tree is to take a set of samples, produce a test on the set, split the set using the test, and recursively apply the same process to each of the two subsets. The process stops when a set (a list of samples) of sufficiently small size is produced. The desired size is one where the set can be efficiently operated upon by a linear search method.

A node test may split the samples passed to the node into two or more groups, where on average (at least) the samples of each group are closer or more similar to each other than to members of the other groups. The earlier projection search step spreads out the samples in a reduced-order space. The first step in constructing the node test is to determine the clusters in the sample set. There are a number of possible clustering methods, and the one used in this example is the K-means clustering method. Other methods of clustering can be used as discussed above.

Figure 12:
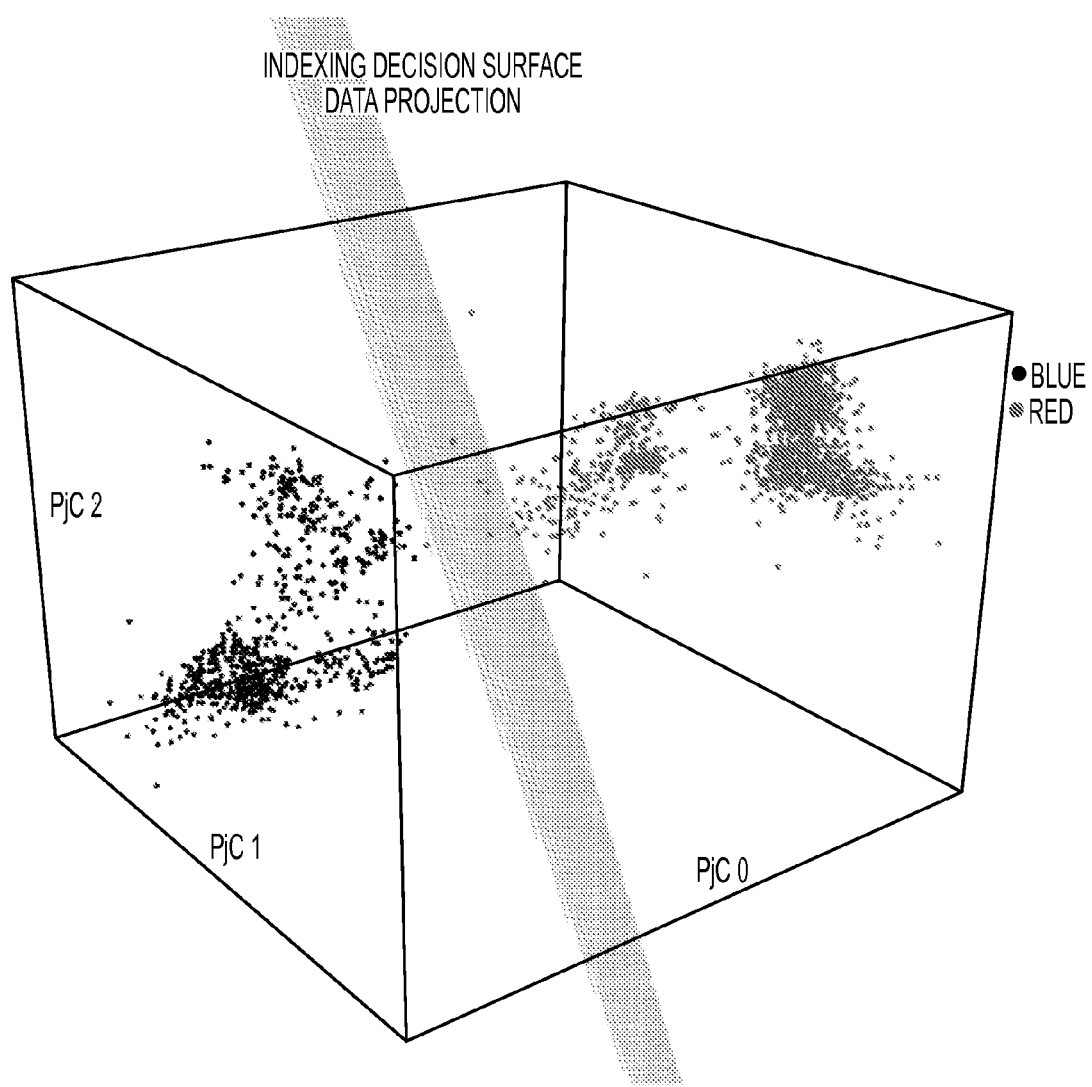
FIG. 12 shows an indexing surface (hyperplane) used at a node of an M spectra data indexing tree.

When used in creating a dynamic index, the K-means method takes two parameters as input: 1) a sample data set represented by reduced-order attribute vectors generated by projection search, and 2) K, the number of clusters the algorithm should create. The result of K-means will be K clusters, consisting of cluster centers and a cluster assignment for each sample in the data set. A clustering result, by way of example, of the M spectra data set for K=2 produced by the K-means method, along with a separating hyperplane, is shown in FIG. 12; however, in other examples, K may be greater than two. The two clusters are labeled as blue (dark) and red (gay) points. The separating hyperplane (light gray linear appearing planar area separating the cube) is not a product of the K-means method, but is generated by a support vector machine (SVM) method.

Support vector machine (SVM) is one method for finding an optimal decision surface that partitions two sets of labeled samples. Other methods may be used. The decision surface (hyperplane) provides the test for a query node.

SVM is a supervised learning technique and requires labeled samples. But as discussed previously, the goal of this work is to develop a generalized indexing method that can be applied to a set of samples that may not have label information. An approach is to use the cluster assignment provided by the previous clustering step to provide a temporary sample label, gray (labeled red)→−1, or black (labeled blue)→+1, for use by the SVM method. Other methods, typically found in the field of pattern classification, can be used to classify vectors in the R-dimensional reduced-order attribute subspace, where R can be any positive integer.

The decision surface calculated for the M spectra data example (a separating hyperplane) is shown in FIG. 12 as introduced above. The test at the query node will be of the form, $q(\vec{x}, \vec{\beta}, \beta_0) = \vec{x}^T \vec{\beta} + \beta_0 < 0$, where x is a data sample in reduced-order attribute vector form, and $\vec{x}^T \vec{\beta} + \beta_0$ is the equation for the separating hyperplane calculated by the support vector machine.

SVM works for linearly separable and nonseparable clustering of the data set. SVM calculates a decision surface based upon sample distribution and criteria supplied to the method. For linearly separable data, all samples of one label are on one side of the decision surface, and all samples of the opposite label are on the opposite side of the decision surface. In the nonseparable case, one or both clusters extend across the hyperplane. The data in FIG. 12 are nonseparable. This is acceptable for dynamic indexing because the goal of clustering and SVM is to produce a test, $q(\vec{x}, \vec{\beta}, \beta_0)$, that can be applied to the samples and used to split the sample set or direct a search.

Figure 13:
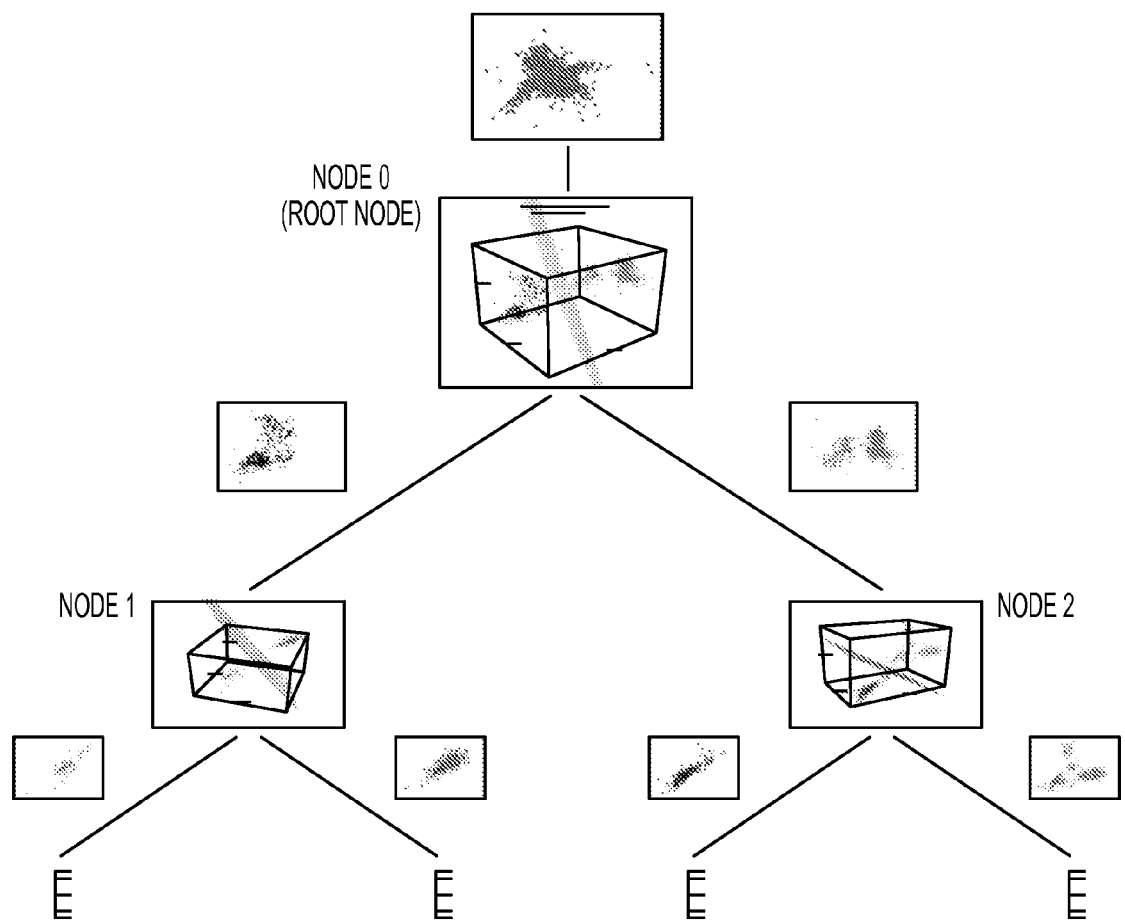
FIG. 13 shows a dynamic index recursive construction.

Recursive construction of a dynamic index is depicted in FIG. 13 where FIG. 12 is shown as a Node 0 (root node). The M spectra data set (upper grey cluster) is passed to an index construction method. The data are operated upon, a test associated with Node 0 is calculated, and the data set is split, with the blue labeled (black) and red labeled (gray) clusters (separated by the hyperplane) descending the left and right branches, respectively. Next, a test associated with Node 1 is calculated, splitting the black cluster and creating, for example, other colored, for example, cyan and green, data clusters that descend to the next level. Similarly, a test associated with Node 2 is calculated, the red labeled cluster may be split, and, for example, magenta and yellow colored clusters are produced. In FIG. 13, index construction is shown as completed and sample lists are produced and are shown output of Nodes 1 and 2 respectively. In most cases, additional levels of tests and nodes would be required to produce samples lists of sufficiently small size for a linear search method.

Dynamic Index—Search and Retrieval

Once constructed, a dynamic index can be used to search and retrieve samples in a database. Initiating a search using a dynamic index is as depicted in FIG. 9. A search sample is presented at the root node, and the root node test is applied to the sample. The result of the test directs the search down the branches to the next lower node. If the next lower node is a query node, the process repeats, applying the test associated with that node to the search sample. If the next lower node is a terminal node, the search sample and the list of samples associated with the node are passed to a linear search program for final calculation of the search results.

Distance Metrics and Measures of Similarity

The example discussed in FIGS. 9-13 uses a Euclidian distance metric for determining the similarity between data samples. Other distance metrics providing different models of similarity may yield better information for associating samples and, as will be described further herein, for a spectral impedance database directed to devices, Euclidean was one of a top five set of metrics (Canberra, Manhattan, cosine and similarity index being the others rounding out the top five.) For example, a cosine distance metric operating on the M spectra data sample data may reveal a different set of sample associations.

The decision surface for a query node is calculated by the SVM method as a solution to an optimization program. For a very large data set, the optimization operation may become limited by memory requirements upon the computer hardware. The size of the data set is not a factor when the decision surface is used in a search/retrieval operation, but calculating it for a large data set may be a problem. A solution is to use a subset sampled from the full data set population when creating the decision surface. Methods of sampling are well-known and documented in the literature.

The decision surfaces generated for the index query nodes in the example are hyperplanes in the reduced-order attribute subspace. The SVM method allows the use of certain nonlinear (non-affine) functions that map the reduced-order attribute input subspace to a feature space. The resulting decision surface is a hyperplane in the feature space, but can be a manifold in the input subspace. Therefore, the disclosed method can utilize SVM over a feature space to determine a switching surface that is a manifold and is not restricted to affine decision functions.

Similarity Search

The dimensionality reduction achieved using a reduced-order attribute vector representation for the sample data is an embedding of the data samples in a lower dimensional subspace. To ensure all samples meeting similarity criteria for a specific distance metric are retrieved when using dimensionality reduction and a dynamic index, the embedding should be contractive. Any attribute vector can be uniquely decomposed into the sum of its projection onto the lower dimensional subspace and a vector in the orthogonal complement of this subspace. The triangle inequality ensures that two attribute vectors that are separated by at least x units of distance in the lower dimensional subspace are also separated by at least the same distance in the original vector space.

If a search is conducted for all stored attribute vectors within a distance d (with respect to the metric defined on the original vector space) of a target vector defined by the search criteria (having a similarity measure of d), then the projection of the target vector onto the lower dimensional subspace and the value d can be used to determine which portion or portions of the data collection, as defined by the decision surface (whether affine or a more general manifold) need(s) to be searched for stored vectors that satisfy the search criteria. In this manner, one or more paths through the index tree are traversed, leading to one or more leaves of the tree (terminal nodes) at which stored vectors are searched for vectors that satisfy the search criteria. An alternative way to implement a decision process for each node of an index tree is provided, for example, in FIG. 2 of U.S. Pat. No. 6,741,983.

Methods discussed above are implemented in a prototype system to support forensic analyses of field-acquired objects and for the discovery and correlation of information across modalities that can lead to more effective prosecution of the sources of these objects and associated organizations. Example modalities include spectral signatures of specimens, media and devices. Data sources used in forensic analyses include evidence from historical and ongoing investigations, and reference data having known environmental properties and geographic origins. A data storage and management process has been developed and used to coordinate automated analysis processes that mine this information and discover data associations that can help identify evidence and lead to the timely identification and prosecution of threats. The evidence of interest (traits) includes, for example, the locations, physical descriptions, environmental relationships, events and technology-specific measurements of an object's internal components and any detected trace material. A trait of an unknown sample collected in the field may be associated with a reference sample of a group of reference samples having data stored in a reference database and, vice versa, a trait of a reference sample may be associated with the unknown sample. The evidentiary data are combined in the prototype system into an integrated data management environment that is used to construct associative data models represented by evidence trees (i.e. the components, trace evidence, and properties associated with an object). Reference data include technology-specific forensic or intrinsic measurements of representative items of known origin or source and are also stored in the integrated data management system. First and second examples will now be discussed for the prototype system.

EXAMPLE 1

A Vehicle

Figure 14:
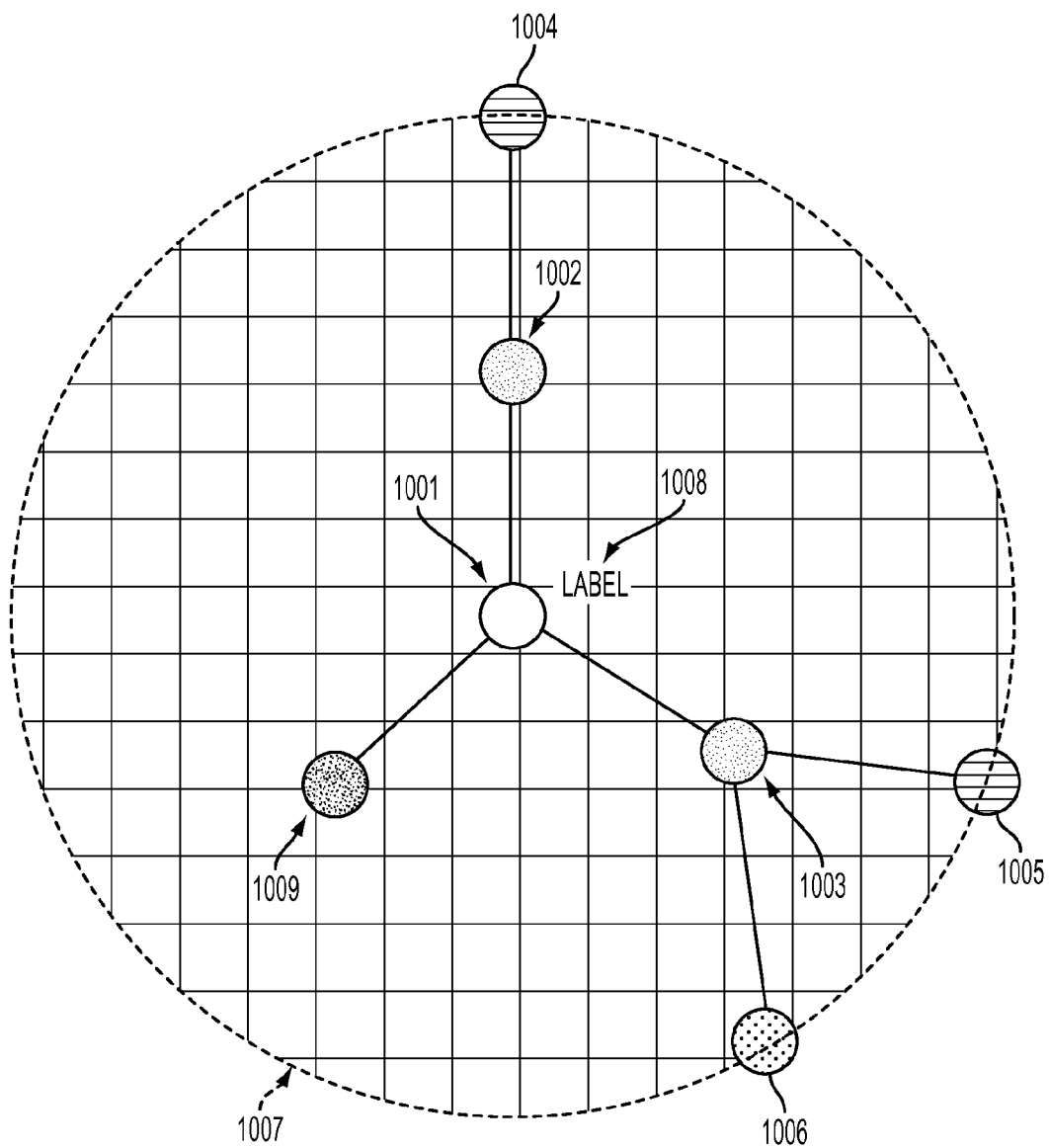
FIG. 14 shows a circular graph of objects and associated information, for example, for a vehicle such as a car.

An object and other objects or information associated with the object can be represented or illustrated as a graph as shown by way of example in FIG. 14 where label 1008 may represent an object 1001. The object 1001 is represented as the central or an otherwise distinguished symbol. Other objects 1002, 1003, and 1009 are shown associated with object 1001 by lines or other graphic styles representing association, such as containment. (A motor is contained within a car). Any object may optionally be labeled by a name or other information as shown by the label 1008. By way of example, object 1001 can correspond to a car, and objects 1002, 1003, and 1009 can be the car's engine, transmission, and emissions control system, respectively. Objects such as 1002, 1003, and 1009 can have other objects associated with them, supporting a decomposition of objects to an arbitrary degree. By way of example the car's engine 1002 could have a fuel flow meter 1004.

An object and other objects or information associated with the object can be represented or illustrated as a graph as shown by way of example in FIG. 14. The object 1001 is represented as the central or an otherwise distinguished symbol. Other objects 1002, 1003, and 1009 are shown associated with object 1001 by lines or other graphic styles representing association, such as containment. Any object may optionally be labeled by a name or other information as shown by the label 1008. By way of example, object 1001 can correspond to a car, and objects 1002, 1003, and 1009 can be the car's engine, transmission, and emissions control system, respectively. Objects such as 1002, 1003, and 1009 can have other objects associated with them, supporting a decomposition of objects to an arbitrary degree. By way of example the car's engine 1002 could have a fuel flow meter 1004.

Instead of a physical object or component, a symbol can be used to represent information associated with or obtained from another object. For example, symbol 1009 could instead be operational data such as engine speed as a function of time or a histogram of the fraction of time the car's speed was in each of a set of intervals over a period of time, service data such as a record of maintenance performed on the car over a period of time, or a geographic record of the car's location as a function of time. These are just examples of time series or frequency series data that may be associated with a central object 1001 such as a car. In this case, a line or other graphic style representing association can be used to represent or illustrate this association. Example lines between symbols 1001, 1002, 1003, 1004, 1005, 1006, and 1009 in FIG. 14 are used to represent this association. Although the related objects and information in FIG. 14 form a tree-structured graph with root at object 1001, information may be associated with more than one object, in which case the graph formed by the representations of objects and their associations would not be a tree. By way of example, a current measured between a battery and an alternator in a car would be associated with both the battery and the alternator. By way of example, the level of current flow as time series data and other engine data may predict a battery or alternator component failure event, or, described differently, a vehicle process failure.

Both objects and information can be typed, and the types may optionally be indicated in the representation or illustration by, for example, shading as shown for objects 1002, 1003, and 1009, textures as shown for objects 1004, 1005, and 1006, or a color or class name. The representation may also be in a computer's memory or other storage device in a machine-readable form. In each case, the indication should be consistent and unique for each type. For example, the texture or pattern filling the representation of objects 1004, 1005, and 1006 indicates that objects 1004 and 1005 have the same type and that object 1006 has a type that is different from that of objects 1004 and 1005. A similar statement can be made for objects 1002, 1003, and 1009. Objects and information items may be differentiated by their representations. For example, objects 1002, 1003, and 1009 can be differentiated from information items represented by objects 1004, 1005, and 1006 by the use of solid instead of patterned fills. The shapes of the objects' representations can also be used to differentiate either object or information type, or between objects and information items.

Information that is maintained in a computer system by, for example, a database or file system will preferentially be represented as an object of a designated class in a manner that is compatible with object-oriented programming languages such as C++, C#, and Java. Other terms that are specific to each object-oriented programming language, such as are found in various Lisp implementations of object-oriented programming, can be equivalent. The information may be stored in a database system such as MySQL, Oracle, or Postgresql, using a mapping that specifies how objects of a specific class can be stored in the, for example, table structure of the database system and may be subsequently retrieved from the database system to create and populate an object of the class. This process is sometimes called "serialization" and "de-serialization". The database system may also be replaced by a file system maintained by a computer's operating system or a network-attached or network-accessible storage device.

The objects that are related by the above associations may be represented or illustrated in a manner that groups these objects into a set of all objects related to a specified object 1001. By way of example, object 1001 can correspond to a car, and objects 1002, 1003, and 1009 can be the car's engine, transmission, and emissions control system, respectively, while objects 1004 and 1005 can be temperature measurements, or information, obtained from the engine and transmission, respectively, and object 1006 can be a recording of the gear engaged by the transmission, for example, Park, Drive, Reverse, and Neutral, as a function of time. All of these objects are related to the car, represented by object 1001, and this grouping may be illustrated by, for example, a shaded region bounded by a closed dotted curve 1007. Other methods may be utilized to represent or illustrate this grouping; by way of example a data structure such as a linked list or an encoding within a label of each object of the name of the primary object and optionally a path between the primary object and the object though an association graph may be used to represent this grouping within the memory or data storage element of a computer or computer system.

Figure 15:
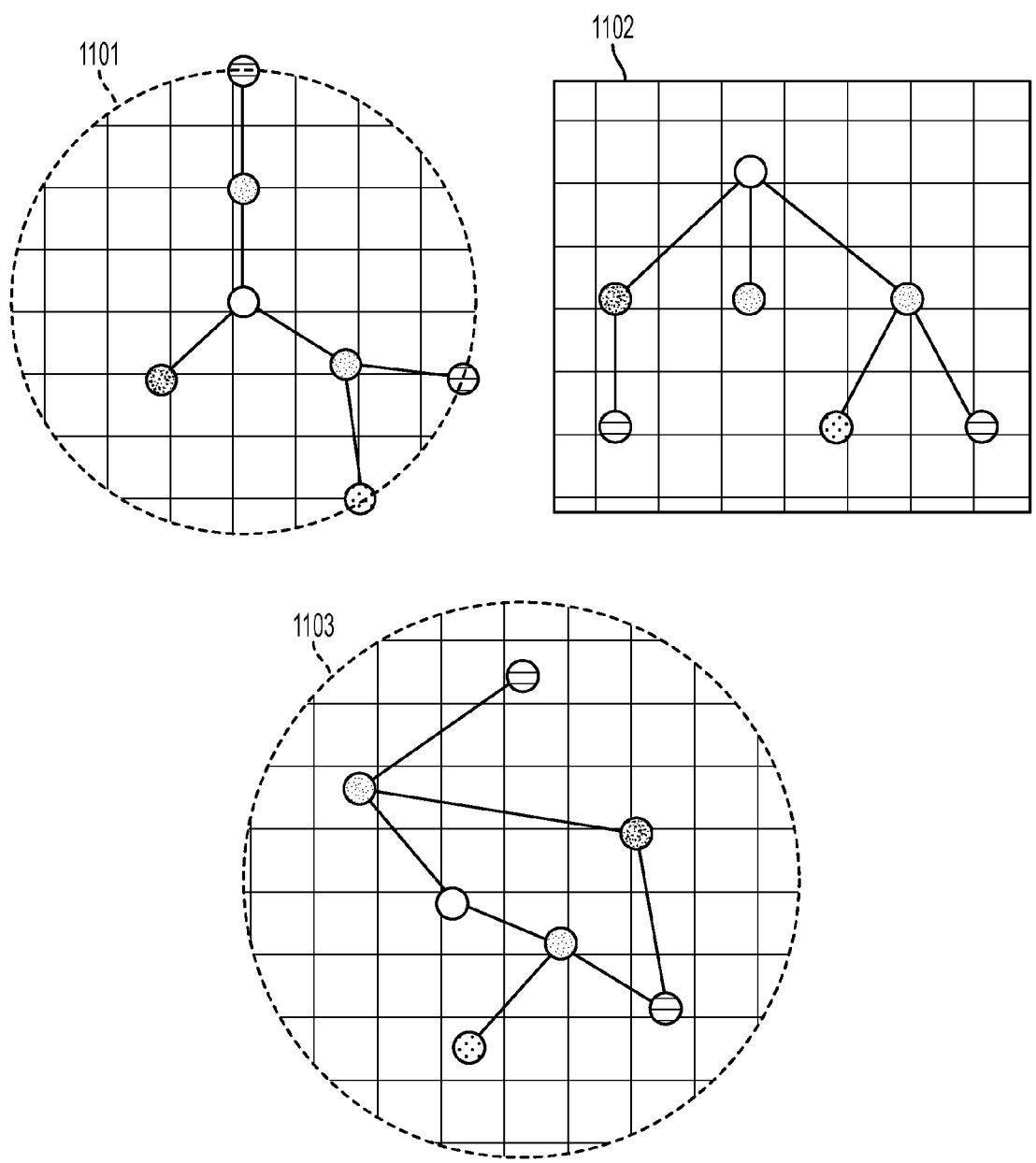
FIG. 15 shows information of the circular graph of FIG. 14 as element 1101, the information in the form of a tree-structured graph 1102 and as depicted within a circle in element 1103.

One is not limited to the representation or illustration shown by example in FIG. 14. Further examples are provided in FIG. 15. Illustration 1101 of FIG. 15 corresponds to the representation or illustration shown in FIG. 14. Illustration 1102, on the other hand, shows the same or equivalent information as a more traditional tree structured graph with the car as the root node. Illustration 1103 of FIG. 15 shows a set of objects and information items that are associated by a graph that is not a tree. Optionally, this graph may be a directed graph. In each case an enclosing curve and/or patterned or shaded background is utilized to represent or illustrate the extent of this set of associated objects and information items; this is optional. In all cases, the representation may be resident in a computer's memory or data storage device, including a network-attached storage device that is accessible to a computer, in which case the representation is comprised of one or more data structures that contain data identifying, referencing, or pointing to information representing the objects or information items. Such a computer- or memory-resident representation is known in the field of computer science and may be described herein as processor search manager apparatus in the form of a client or a server.

A representation or illustration such as is shown in FIG. 14 can be automatically generated by a computer program and either displayed using a computer display such as a LCD or CRT screen or projector, or printed using a printer such as a laser or ink-jet printer. Methods for the automatic generation of graphs using computer programs are known in the fields of computer science and computer graphics. For example the DOT language can be used in combination with the Graphviz software, documented and available for download at http://www.graphviz.org/, to automatically generate two-dimensional representations or illustrations of graphs of several types and varying degrees of complexity. The representation or illustration does not need to be restricted to two dimensions. A computer program can also automatically generate three dimensional representations or illustrations of graphs.

Figure 16:
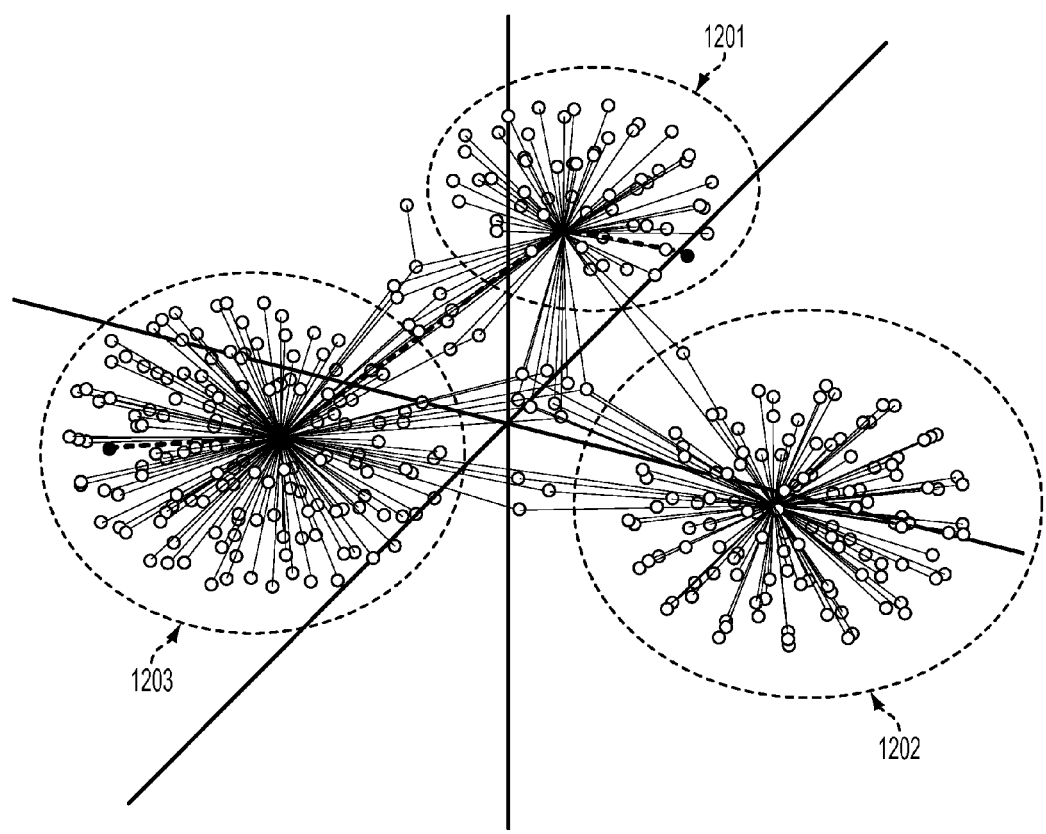
FIG. 16 shows three different circular clusters 1201, 1202 and 1203 with interlinking data elements shown between the circular clusters.

By way of illustration, the representation or illustration shown in FIG. 16 was generated by a version of the Link Discovery Tool, which is described in the paper "Link Discovery Tool", R. D. Horn and J. D. Birdwell, *Proc. ONDCP/CTAC 1997 International Symposium*, Chicago, Ill., Aug. 18-22, 1997, and shows clusters of automatically grouped objects represented in three dimensions as identified by the bounding dashed ellipses 1201, 1202, and 1203. A highlighted path links data in graph 1201 with data in graph 1203. This path shows the shortest chain of associations, which in graph theory is the shortest path, between the two selected objects in clusters 1201 and 1203. Algorithms are known in the computer science field for computing one or more shortest path(s) between two nodes of a graph connected by edges. For example, Dijkstra's algorithm can be utilized by way of example, as described in Dijkstra, E. W. (1959), "A note on two problems in connexion with graphs," *Numerische Mathematik* 1, 269-271, and Cormen, Thomas H.; Leiserson, Charles E.; Rivest, Ronald L.; Stein, Clifford (2001), "Section 24.3: Dijkstra's algorithm;" Introduction to Algorithms (Second Edition), MIT Press and McGraw-Hill, 595-601, ISBN 0-262-03293-7, which publications are incorporated by reference herein as to their entire contents in the event the material is deemed essential to an understanding of the invention.

EXAMPLE 2

A Target Object

Figure 17:
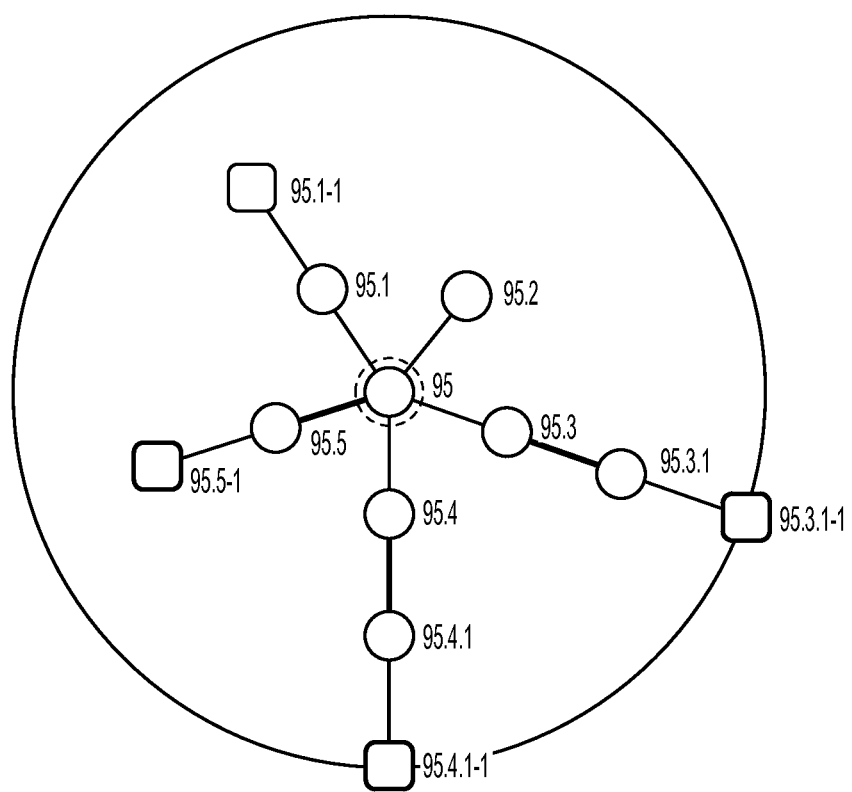
FIG. 17 shows a second example of an evidence tree of an on-screen graph representation of an embodiment of a system for predicting object properties and traits including a circular image having a target object (specimen) at the center of the circle and links to evidence data.

FIG. 17 displays an exemplary evidence tree using an on-screen graph representation generated by the prototype software for central object 95, a second example. The graph represents the decomposition of an object (with an assigned ID of 95) into its constituent parts and several associated trace evidence specimens—all shown as connected gray circles. Forensic measurements are represented as rounded rectangles—blue for spectral signatures, and orange for trace particle data. The perimeter of the circular, gray shaded area that underlies the object tree is the evidentiary data boundary—any data within or intersecting the large circle may be factually associated with the object represented by the centered small circle 95.

An objective of the prototype method is to utilize all evidence associated with an object and compare it to similar evidence of other objects or reference data to obtain forensic leads and assist with the identification of object source or event information. Comparisons are made between all stored pairs of evidentiary data objects that have associated forensic measurements of the same forensic technology and have not been previously evaluated. For the test data set illustrated here, all trace particle and spectral data measurements are compared, for example, via associated geographic origin and environmental property. This process is repeated to compare evidentiary items to any available reference items for each technology. Similarity searches are preferably not performed by the underlying COTS database; rather, data are loaded into memory where high-speed, technology-specific search algorithms are employed by processor search manager apparatus. The system implements novel methods to index multi-dimensional and structured data in a manner that supports efficient search and retrieval of objects from a database that are most similar to a specified target object. These methods are generalizations of the technologies described in, for example, in U.S. Pat. Nos. 6,741,983, 7,272,612, and 7,454,411 among others referenced above. The prototype system relies upon these multi-dimensional indexing methods to rapidly determine stored data objects that are most similar to target objects of the same type, assesses the similarities between these data objects, and asserts these discovered relationships in the database. Automated inference methods can then discover relationships among object components and reference data (spectral and trace assemblage particle in this example) and assert observations about and evidentiary support for the likely source of the objects. The result of each pairwise similarity comparison is a scalar value between zero (no similarity) and one (perfectly identical). Each comparison that yields a value above a configured threshold is stored for subsequent graph-based analysis.

Figure 18:
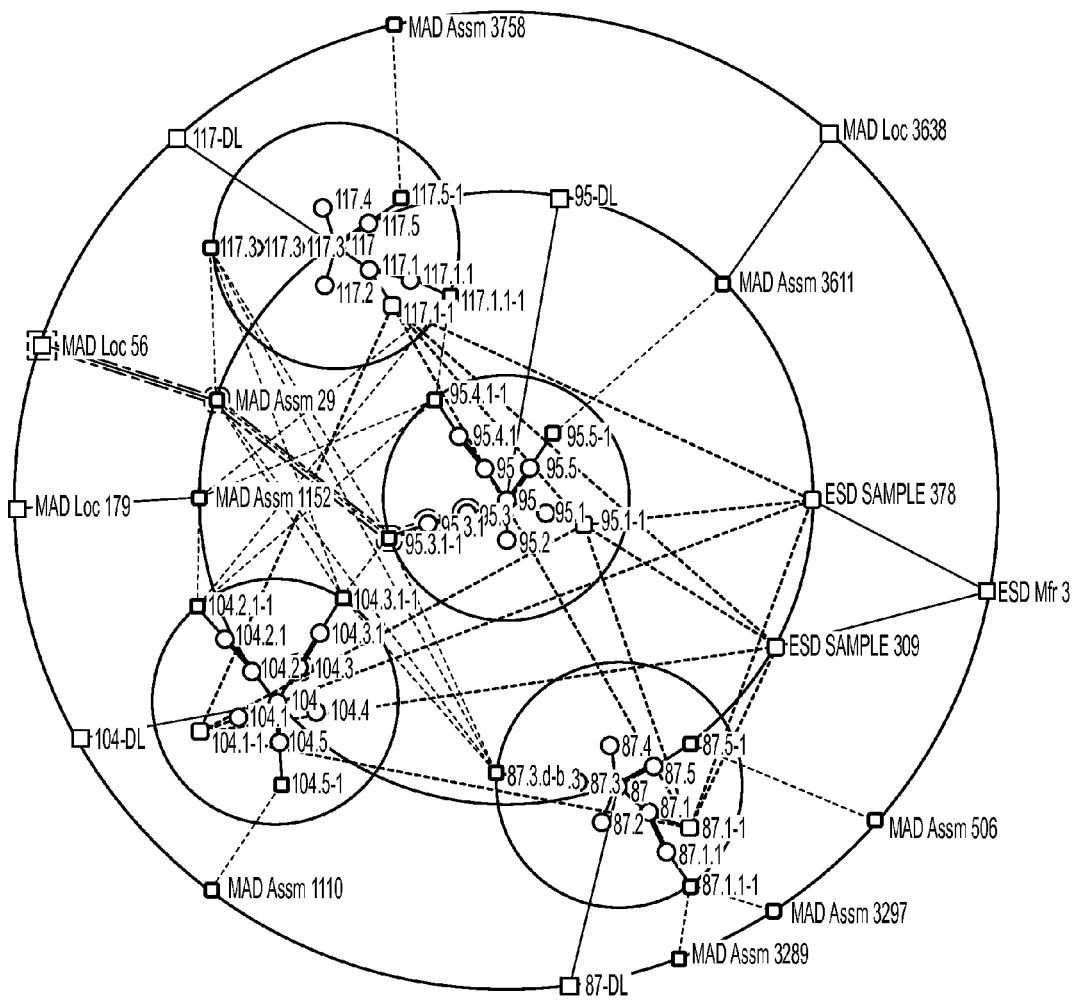
FIG. 18 shows an example of the evidence tree of FIG. 17 for a target object linked to evidence trees for a plurality of objects and associated data of a MAD and an ESD database.

FIG. 18 was produced by the present system and shows target object 95 located, for example, at the center of a circular graph at the center of FIG. 18. Exemplary evidence and reference data that have been found to be directly associated to evidence belonging to target object 95 surround the target object 95 in FIG. 18. This evidence and data include components from objects 87, 104, and 117 (shown as separate circular graphs on, for example, a first solid line concentric circle) as well as reference trace particle data objects 29, 1152, and 3611 and reference spectral data 309 and 378 on the same circle. The location property value where target object 95 was observed is indicated by, for example, the square labeled 95-DL on the first concentric circle at approximately one o'clock. The first concentric circle connects the centers of object circle graphs 87, 104, 117 also located on the first concentric circle. A solid line links square 95-DL, location data, to target object 95.

Physical locations and sources are generally referred to as "environmental contexts" within the present software system where, as discussed above, environment and location may be considered soil type, vegetation, climate and other environmental and location context. The dashed lines of FIG. 18 represent similarity linkages that satisfy thresholds used in the similarity search. For example, the dashed lines may be linkages between spectra (for example, the dashed line from ESD sample data 378 to box 87.1-1). The dashed lines may represent trace particle, assemblage linkages (the dashed line between MAD Assm 506 and box 87.5-1). Each evidence tree has an associated circular data boundary indicating its extent. This graph is a small section of a larger graph produced by performing similarity based comparisons on all evidentiary items and reference data stored in the system and creating similarity linkages. Each pathway (or conclusion) has an associated aggregate similarity value (the product of all similarity-linkage values), a speculation level, and a model-based rank. The speculation level of a conclusion roughly translates into the number of non-factual linkages that are traversed by the pathway, and the rank is an ordinal value that balances the similarity with the speculation level, and indicates the relative importance of the pathway/conclusion.

One of these pathways is highlighted in FIG. 18 by a combination of dashed and solid lines. The highlighted path follows from the target object evidence tree beginning target 95 and follows a path from data 95.3 and follows the path 95.3.1, 95.3.1-1 (depicted as an outermost element of the evidence tree of the center circular graph) to MAD Assm 29 (depicted, for example, on the first concentric circle) to a MAD Loc 56, for example, comprising data for a geographic region where such assemblages are known and shown, for example, on the outermost concentric circle. In this manner, an assemblage associated with target object 95 is linked to an assemblage geographic region or environmental property trait.

These methods, when combined with an effective indexing and search strategy, provide a novel approach for the detection and utilization of correlations among objects and may be depicted as an output of a modified link discovery tool introduced above. The correlations are based upon different measurement modalities and allow discovery of associations with either previously processed evidence or reference materials in order to provide findings and their supporting reasoning to support field operations. The methods can support any forensic analysis technique where comparative assessments can be made.

Figure 19:
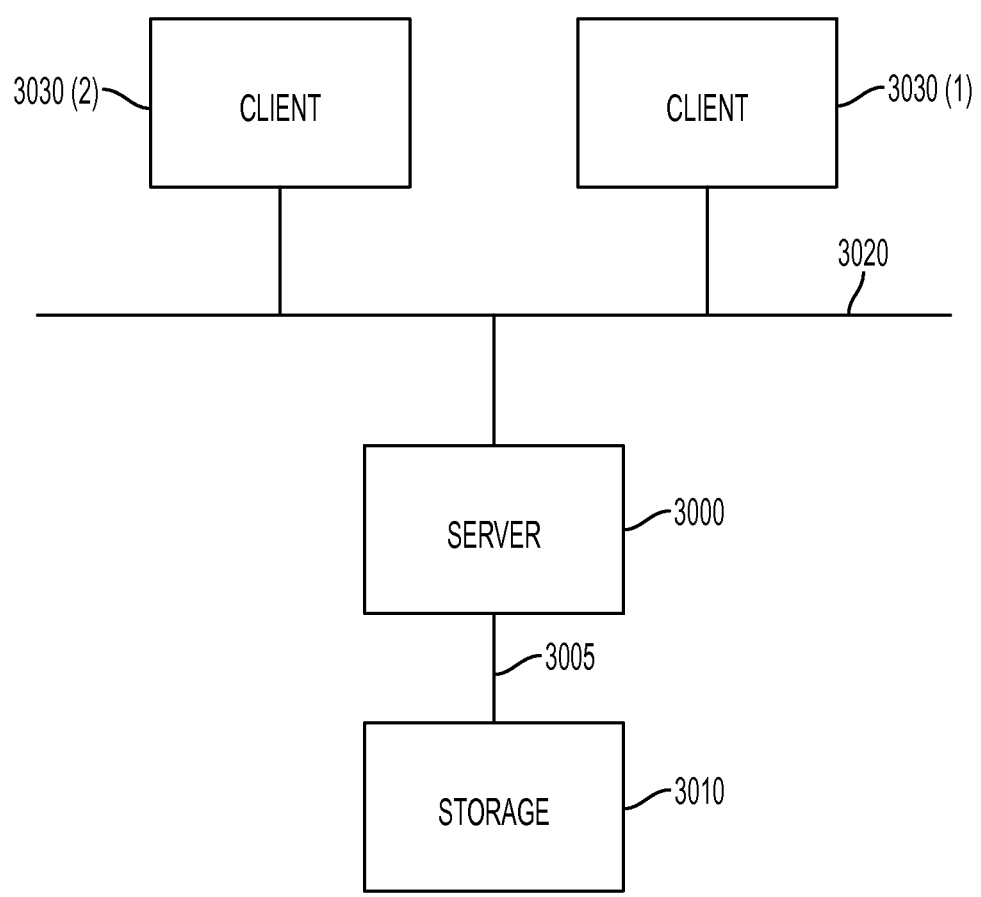
FIG. 19 shows a block diagram of a data modeler platform.

Referring now to FIG. 19, there is shown a data modeler platform in accordance with one embodiment. In accordance with FIG. 19, client 3030 (two clients of a possible plurality of clients shown), server 3000 and storage 3010 can be combined as a single unit (e.g., a computer or laptop), or separate units (multiple computers that communicate using, for example, a network). Client 3030(1) may be one of a plurality of clients connected by communications system 3020 to each other and server 3000. Each unit is able to communicate with either a user (using, for example, a keyboard, mouse, and display, not shown) or a computer or device (using, for example, a wired network 3020 such as Ethernet or a wireless communications infrastructure such as IEEE 802.11 or a packet data network 3020 such as 3G cellular or PCS), which can optionally provide an interface to a user.

The server 3000 may be implemented using several networked servers with different functions allocated to each server. For example, a server 3000 might be utilized for each database index. A separate server, or multiple servers, not shown, might also be utilized to process transactions and communications with clients 3030(1) and 3030(2). One or more servers 3000 might be utilized to control specialized data or image acquisition equipment such as microscopes, cameras, and scanners. Alternatively, some or all of these servers might be implemented as virtual servers in one or more physical servers using software such as Xen (http://www.xen.org/), VMware ESXi (http://www.vmware.com/), or Oracle VM server for X86 Virtualization and Management (http://www.oracle.com/virtualization).

As another alternative, the server 3000 could utilize a computer with multiple processors and/or multiple cores having either a symmetric multi-processing (SMP) or non-uniform memory access (NUMA) architecture. Storage 3010 can be contained within the server, or separate, as would be the case, for example, when a network-attached storage (NAS) device or storage appliance was used. Redundant storage systems may be utilized; example technologies include RAID (Redundant Array of Independent Discs) and ZFS (available, for example, from Sun Microsystems or Oracle), and may include redundant hardware, power, and network pathways. The server 3000 may, by way of example, be a Sun Fire X2200 M2 x64 Server containing two quad-core AMD model 2376 processors, 32 GB of memory, two 146 GB SAS hard disk drives, and a DVD-ROM. The bus system 3005 may include a Sun StorageTek™ 8-port external SAS PCI-Express Host Bus Adapter that is housed with the server 3000 as an interface to an external storage array 3010. The external storage array 3010 may be a Sun Storage J4200 array with 6 TB of storage. The work station systems include, for example, six Sun Ultra 24 Workstations with 22" LCD monitors, which can be used as clients 3030 to the server 2200. Racking for the system may include an equipment rack with a power distribution unit and an uninterruptible power supply. A network switch for network 3020 is not shown but may be implied from their common utility in, for example, a local area network, a wide area local network or any telecommunications network known in the art. A typical network switch for the system of FIG. 19 may be the Netgear JGS524 Prosafe 24-Port Gigabit Ethernet Switch, with compatible (CAT-5e or CAT-6) cabling. If one were to use network attached storage (NAS) such as iSCSI or a network storage device such as the Sun 7200 Unified Storage System, a second network switch might be utilized to separate data traffic between the storage system 3010 and the server 3000 from data traffic between the server 3000 and other computers or clients 3030.

By way of example, system components will now be discussed with reference to FIG. 20 when compared to FIG. 19.

Figure 20:
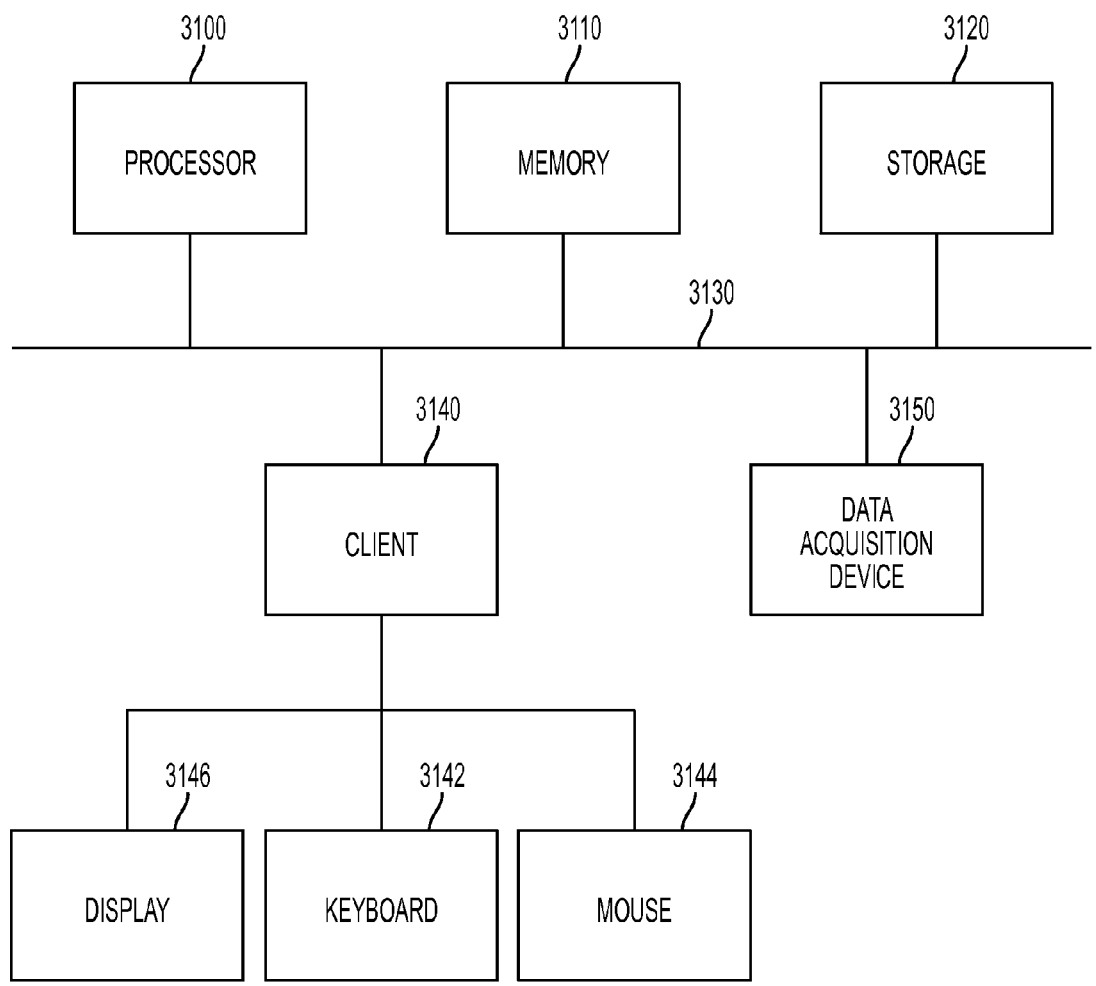
FIG. 20 shows a block diagram of exemplary system components.

Referring to FIG. 20, the system supporting formation of databases, analysis of metrics for specimens and media for selecting a suitable metric and prediction of properties or traits or their values of objects or specimens may have at least one processor 3100, but may have more than one processor, and the processor 3100 may implement more than one processor core. The processor 3100 associated with metric analysis, database formation such as ESD database formation and prediction of traits or properties (unknown sample to reference sample or reference sample to unknown sample) is capable of performing preprocessing, dimension reduction, classification, selecting or performing metrics and determining traits or properties, for example, per FIGS. 21 and 22. The processor has access to memory 3110, which may be used, for example, to store index structures that enable rapid access to stored reference objects that have similarities to the attributes of a target object (unknown) specified in a query or for classification to a group as well as storage of traits and data for reference objects of known groups and their known traits. Storage 3120 is utilized to provide persistent memory and to serve as a repository for information that does not need to be accessed as efficiently (rapidly) as the in-memory objects. For example, images may reside in storage 3120 while descriptions of the shapes of segments of these images or other attributes of the images may reside in memory 3110. One or more clients 3140 can submit queries to the server's software, which are interpreted by the processor 3100 in order to perform searches using the index structures that are resident in memory 3110 and, possibly, the data contained in the storage 3120. Results are returned by the processor 3100 to the clients 3140 via network, internal bus, or communications channel 3130. Users can interact with the system through the client(s) 3140 using input devices such as a keyboard 3142 and mouse 3144 or data acquisition device 3150 (such as a spectrum analyzer (not shown) for collection of impedance data for a known (reference) or unknown (test) electrical device and output devices such as a display 3146. All of the components may be implemented in a single computer system such as a laptop, desktop, or server, in an instrument such as a spectrum analyzer with enhanced software and processing, or they may be implemented in separate computers that interact using a communications medium such as a wired or wireless network 3130.

A data acquisition device 3150 may be connected to either a client 3140 or a server 3000, 3010, 3020 using an interface such as a serial interface, Ethernet, a data acquisition and control card, a universal serial bus (USB) or internal or instrument bus or communication channel, or a FireWire bus or network 3020, 3130. Example data acquisition devices include directional and multidirectional passive microwave receivers, radio frequency scanners, spectrum analyzers, microscopes (optical, electron, or confocal), cameras (still image or video), antennas, infrared sensors or cameras, acoustic sensors, microphones, laser rangefinders or scanners, and spectroscopic instrumentation or related field portable devices such as a device for detecting energetic particles or gamma radiation. The interface 3130 to the data acquisition device 3150 may be bi-directional, meaning that the server or client can control the operation of the data acquisition device 3150 to, for example, locate and examine portions of a specimen that is subject to analysis. The data acquisition device 3150 may utilize a wireless, wired, acoustic, or optical communications link to control a remote device and/or acquire information from a remote device.

A display 3146 may provide a graphical user interface for data entry, data import/export, trait entry and the like in combination with a data input device such as a keyboard 3142 or mouse 3144. In one embodiment, the system may comprise a portable device for analysis and collection and classification of a specimen or media found in the field to a reference group of a reference collection where, for example, geographic traits of an unknown specimen may be stored along with time and environmental (weather) conditions at the time of specimen or media collection. As described above spectral data may be collected over time and different spectral data at the same frequency may result based on weather and time of day of collection. So it is useful to store such data at the time of specimen or media analysis.

Figure 21:
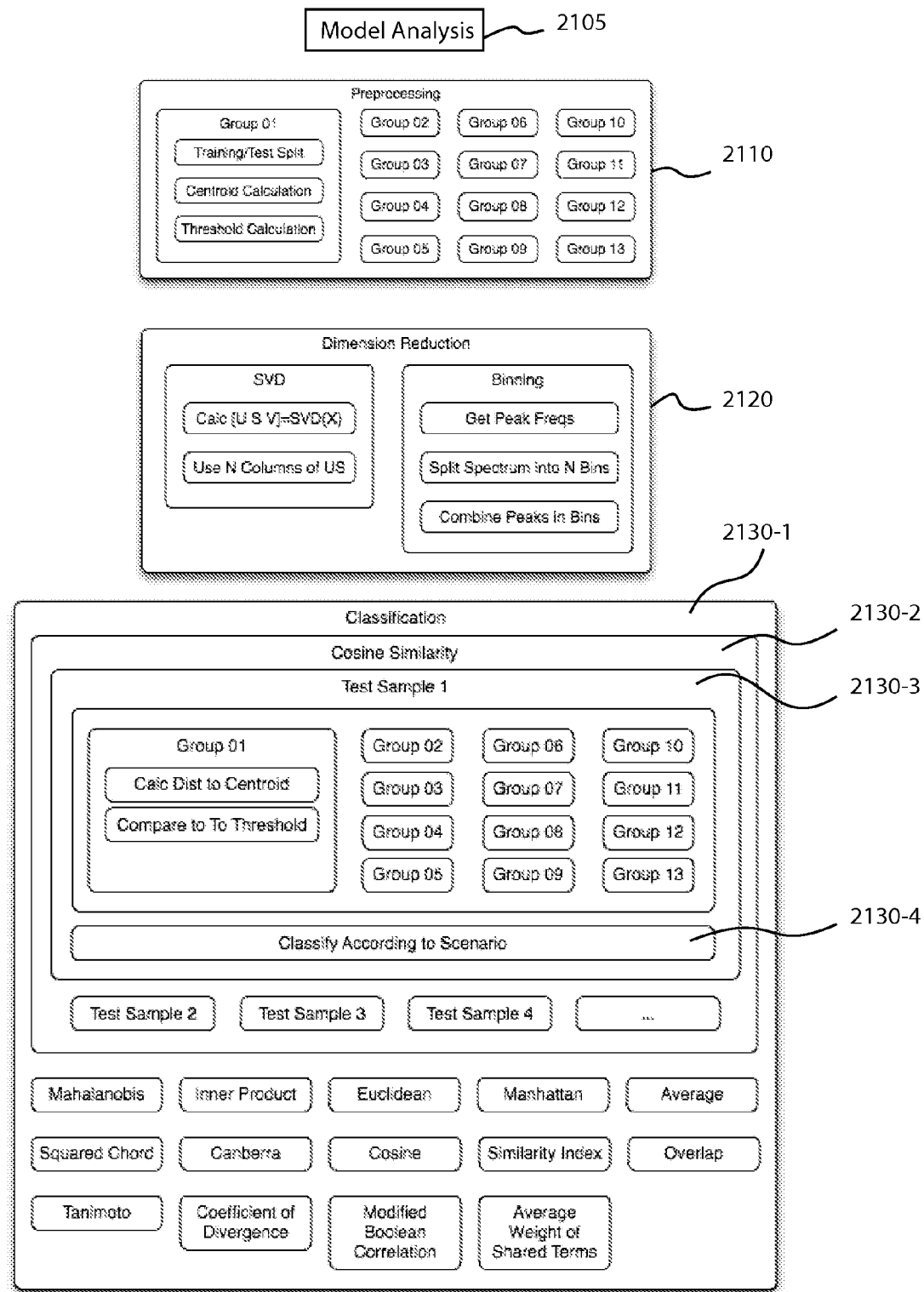
FIG. 21 is a metric analysis model process for evaluating the performance of a plurality of metrics for classifying specimens and media.

Referring to FIG. 21 there is shown a block diagram showing steps of forming and adding unknown members to a reference ESD database and classifying knowns and unknowns to groups of electrical devices in particular as well as selecting an appropriate similarity metric of a plurality of similarity metrics. Model analysis, depicted as box 2105, is optional and may comprise determining a model equivalent circuit for an electrical device per FIG. 23. Such a circuit model may result in an estimated parameter such as coefficients and order of a transfer function. Preprocessing comprises allocation of specimens and media between training (reference) and test (unknowns) for each group of electrical devices, a plurality of groups 01-13 are shown but there may be more or fewer groups of electrical devices, for example, comprising 1600 or so devices total. Dimension reduction is depicted as box 2120 comprising, for example, binning (get peak frequencies, split spectrum into N bins and combine peaks in bins) or SVD (calculation of U S V, using N columns of US). Classification 2130 using different similarity metrics may begin with a selection or decision of similarity metric to use such as cosine similarity of the plurality of metrics from Mahalanobis to Average Weight of Shared Terms. Cosine Similarity 2130-2 embraces test sample 1 2130-3 and Test Samples 2, 3, 4 and so on until all test samples are classified or not classified as discussed further herein. The test samples are classified to known groups such as group 01 by, for example, calculating a distance to a centroid and comparing the calculated distance to a threshold. As will be discussed herein further, the classification may be performed according to one of three (or more scenarios) 2130-4 where more liberal or conservative classification may be chosen. With this overview, FIGS. 21 and 22 will be further discussed below.

Determining the Best Metrics for Classification of Devices to Groups, Classifying Unknown Specimens to Groups and Determining Additional Traits or Properties A process for determining the best or top five metrics for classification of devices to groups via spectral data, impedance spectral data in particular, is depicted in FIG. 21 and its flowchart is shown in FIG. 22 (comprising FIGS. 22A, 22B and 22C). Referring first to FIG. 21, there is depicted an overall block diagram of a process of evaluating a metric from a collection of at least ten and, in this example, fourteen different metrics from Mahalanobis to average weight of shared terms as seen in classification layer 2130-1. FIG. 22 is a flowchart that may be useful to determine which of a plurality of metrics is a preferred metric to use for classifying a specimen or media to a group in a database. For example, FIG. 22 may be used for classifying electrical devices where the data acquisition device has leads and may be connected to an electrical device to gather spectral impedance data over a range of frequencies and over time. Once a particular database is established and preferred metrics determined, the flowchart and process may be simplified to characterizing the same specimen type such as an electrical device and attempting to classify the device into a group of known or reference devices. Moreover, additional traits or properties may be stored for the reference collection such as, and not limited to, manufacturer, location of manufacture, color, texture, shape, size, weight, temperature, noise and any number of parameters at the time of collection of the specimen or media. Color or temperature may be indicative of a potentially dangerous condition or imminent failure or otherwise alert a handler of a spectrum analyzer encountering an unknown specimen or component thereof. Once an unknown is classified to a group, a trait of the unknown specimen may be associated with the reference group (or vice versa) of the reference collection of like specimens (or components).

Model analysis 2105 relates to the initial step of determining, for example, an equivalent circuit (FIG. 23) for an electrical device having an impedance spectrum. A specimen gathered in the field may be fragile or subject to one time analysis before its characteristics and traits may be lost so gathering and forming a model serves to preserve at least the model of the original specimen for analysis. For example, one may use MATLAB's INVFREQS( ) function to obtain an equivalent circuit and equation.

To evaluate other types of specimens and media, model analysis may not require determining an equivalent circuit. For example, acoustic, ultrasound, radiation or passive microwave data or may be collected without connecting any electrical leads to a specimen. For example, a wideband microphone or passive antenna or camera may collect spectral magnitude data relating to frequency peaks. Noise, for example, from an audience may have to be subtracted from a media performance of a symphony orchestra. A model for an orchestral piece may, for example, be a function relating a spectrum's magnitude and phase, or energy or power content, versus frequency.

Preprocessing 2110 comprises collecting a collection of specimens and media for evaluation. In the present embodiment, some eighteen hundred forty-four electrical devices of a particular type were collected to comprise a reference collection from thirteen different reference groups. The number of specimens and groups for forming an ESD database may be a matter of design choice but may be influenced, for example, by the number of possible manufacturers, makes and models that exist or have gone out of business for a particular category of specimen and statistical significance of the size of a given reference group. For example, in the present case, one hundred fifteen members of group 01 where allocated 69 to training and 46 to test while group 04 comprising 516 members were allocated 310 to training and 206 to test. The difference between the choice of size of group 04 versus group 01 may be related to the popularity of group 4, for example, by manufacturer, make and model. Altogether, 1107 of 1844 devices were allocated to training or reference and 737 allocated to test or as unknowns. For each group of a known reference collection of specimens and media, for example, the one thousand eight hundred forty-four such specimens, preprocessing comprises allocating, for example, a number of these known specimens into a reference collection and leaving the rest as allegedly unknown or test specimens by group. This is described in preprocessing 2110 as a training/test split. The split between reference and test may, for example, be approximately 60% reference and 40% test. Any known source of noise may be subtracted or filtered during preprocessing 2110 according to well know processes.

Given that an object of the process is to determine the best metrics for classifying specimens to groups, it may be already known that there exist approximately thirteen groups of such specimens, for example, different makes and models of automobiles or, in this case, electrical devices such as transformers, AC to DC converters, electrical circuits, different appliances and the like. For each group, then, one allocates to training and to test, calculates a centroid, calculates a threshold and the like. For example, for an electrical device and an impedance frequency spectrum, one may use a known network analyzer to record magnitude and phase angle at different frequencies in the desired spectrum over time.

Modern network analyzers are known for measuring impedance of a system or electrical device over a range of frequencies. In particular, one such device is capable of taking measurements from ten MHz to over one THz with over 20,000 sample points. Analysis of all 20,000 sample points may be time consuming and unnecessary. Initial investigations show that the similarity of two impedance curves can be determined by their general shape. The collected data may be represented as vectors of complex floating values, for instance, a vector of 20,000 elements representing the real and imaginary parts of the impedance at 20,000 frequencies.

Dimension reduction 2120, as described above, may comprise using SVD processes, binning or optimization of an objective function such as variance×entropy (VE), as discussed herein. In SVD, one may calculate [U S V]=SVD (X) and use N columns of U times S. In binning, one may obtain peak frequencies, split the spectrum into N bins (for example, less than 20,000 frequency bins) and then combine peaks in similar N bins. Now, three layers will be described: classification 2130-1, cosine similarity 2130-2 and test sample 2130-3. Within test sample, 2130-3, three different scenarios may be investigated per classify according to scenario 2130-4. Different scenarios may be useful depending on a desired output and may be described as related to selecting a scenario depending on an allowable degree of error depending on the application. For example, one may not want to inaccurately classify parameters via a given metric as diagnosing a medical condition inaccurately can carry a large cost, but one may accept a more tolerant margin of error in determining a geographic origin of a specimen.

Classification by metric 2130-1 includes the following fourteen similarity metrics by way of example: Mahalanobis, inner product, Euclidean, Manhattan, average, squared chord, Canberra, cosine, similarity index, overlap, Tanimoto, coefficient of divergence, modified Boolean correlation and average weight of shared terms. Given the training and test sample split, for each test sample 2130-3, one determines if the sample belongs to a given group by calculating a distance to a centroid for the reference or training group and comparing the distance to a threshold determined in preprocessing 2110. If the distance is within the threshold, then, it may be determined that the test sample belongs within the group or another group. Moreover, with the different scenarios, the successful classification to a group may be more or less error tolerant.

Referring now to the flowchart of FIG. 22 (comprising FIGS. 22A, 22B and 22C linked by circular indicators 1-5), there are shown the specific steps of the process of determining the preferred metrics for a given specimen or media of a plurality of groups of related specimens. FIG. 22 comprises three portions: FIGS. 22A, 22B and 22C. In this particular example, impedance spectra are determined for an electrical device which may have an exemplary equivalent circuit as shown in FIG. 23(A) which may translate into an impedance Z as a seventh or higher order polynomial equation, for example, as suggested by FIG. 23(B). The equivalent circuit model may result in a derivation of estimated parameters and these may include values of resistance, capacitance, inductance, amplification, impedance and the like. Moreover, the equivalent circuit may result in estimated parameters such as coefficients and order of a transfer function. By way of example only, where the frequency spectrum may be practically unlimited, the graphs of centroid step, for example, per FIG. 24, may be in the acoustic range or from one Hertz to twenty kiloHertz, by way of example.

The process starts at step 2210 of FIG. 22A, and the spectrum analyzer results are read into memory at step 2212. A spectrum type is determined at step 2214 and the spectrum is either for a reference or training specimen or media via path 2216 (shown as a bracket) or for an unknown or test specimen or media via path 2215 (shown as a bracket). Following the reference path 2216, a reference grouping or classification of specimens or media is determined by first storing the specimen or media spectrum and results at step 2240 in memory. Compute or queue step 2242 leads to dimension reduction 2244. If there is no dimension reduction, then, the process for a training or reference specimen or media proceeds directly to centroid recomputation 2252. If there is dimension reduction, the one recomputes vector V at step 2246 and stores V at 2248. At step 2250, the calculation (Ref Data)*V is stored. The centroid for the reference sample is then recomputed and the threshold from pre-processing is recomputed. The centroids and thresholds for use in evaluating unknowns or test specimens or media are then stored at step 2256. This concludes the process for, for example, approximately one thousand electrical devices used in the present analysis.

Following path 2215 for an unknown or a test specimen or media, the specimen goes through dimension reduction at step 2218. If dimension reduction is performed, X=X' V at step 2220. The Euclidean distance is calculated to each group centroid where, for example, there exist at least ten groups and an unclassifiable scenario 1, 2 or 3 is applied at step 2230.

If speed of calculation is an important characteristic of the metric at step 2222, then, if yes, one performs a Manhattan distance metric to each group centroid. If not, then, a Canberra distance metric is applied to each group centroid. Both speed choices result in selecting an unclassifiable scenario at step 2230.

Three scenarios are applied for acceptable margins of error. A more liberal approach is scenario 1 wherein a test or unknown specimen or media is classified to a group with the most similar centroid regardless of threshold value. (In other words, one may already assume that an unknown or test specimen or media belongs to a group.) Under scenario 2, a test sample is classified to a group with the most similar centroid if the similarity value exceeds the threshold for the group. If a sample was found to be not within the threshold, then, it was placed in an unclassifiable group. Under scenario 3, if the test sample exceeded the threshold for more than one group, it also becomes unclassifiable. So under scenario 1, a test sample is immediately classified to a group with a most similar value at step 2236. Under scenario 2, a test sample is either above or below the threshold. If the threshold is exceeded, then, the sample is classified to the group with the most similar value. If the threshold is not exceeded, the sample is placed in the unclassifiable group. Under scenario 3, there is a question as to whether another threshold for another group is met or exceeded. So if two thresholds are met, the sample becomes unclassifiable via step 2234 or directly to step 2238.

As described above, a result of applying the flowchart of FIG. 22 or a similar flowchart (varied depending on the type of specimens, numbers collected, groups, allocations and the like which are provided herein by way of example for a particular physical electrical device), is the creation of an ESD and the determination of a best metric or set of metrics for evaluation of the particular physical electrical device under investigation. One may take a portable device into the field and then using FIG. 22, determine traits or properties of reference specimens from unknown specimens or, vice versa, predict traits or properties of unknown specimens based on the reference sample collection ESD trait database after an unknown is classified to a reference group of reference samples or specimens.

For example, the method disclosed herein may be implemented in a portable spectrum analyzer that can be used to acquire a spectrum in the field and utilize a stored database of spectral data to identify an object or estimate or ascertain a status of an object from which the spectrum was obtained. The portable spectrum analyzer is preferably a hand-held device that can acquire one of acoustic, electrical, optical, or isotopic spectra and utilize a stored database of spectral data of the same type to perform such identification, estimation, or ascertainment.

Spectra acquired in the field, together with any results of analysis, can be stored in the portable spectrum analyzer and uploaded to a computer or storage medium when the device is returned from the field using a communication port such as a universal serial bus (USB) or Ethernet, or a wireless network such as those based upon IEEE 802.11 standards, or a cellular data network.

The communication port or wireless network can be utilized to update the stored database in the portable spectrum analyzer by adding spectra from known or previously analyzed objects along with properties of those objects for use in future identification, estimation or ascertainment tasks. The spectral data and associated analyses acquired in the field can also be selectively added to the stored database by, for example, selecting spectra that have been identified with a specified degree of confidence to be added using statistical methods that are well known in the art.

It is preferable that a software program executing on a computer that is not a part of the portable spectrum analyzer be utilized to manage the spectra and analyses upload process and the database update. In this manner, a user can operate the software program using a graphical user interface or a web-based interface to control the upload and update processes and examine or modify the configuration of the method's implementation on the portable spectrum analyzer by, for example, examining or modifying thresholds used in the method to determine if a spectrum is unclassifiable or to select one of two or more scenarios such as those given by example above. The software program may preferably be written in the Java, C++, or C# programming language, and may or may not operate under the control of a web server program such as the Apache web server.

The software program preferably executes on a computer running the Linux operating system, but one of skill in the art will recognize that other operating systems such as a version of the Microsoft Windows operating system (such as Windows 2008 Server) or the Apple OS X operating system (such as OS X Lion) may be used. The computer may be a computer dedicated for this purpose, such as a desktop computer, or a server computer that may be either dedicated or shared. Data stored for use by the software program, and data uploaded to the computer running the software program may be stored on the computer, or on a separate computer, either in a storage device such as a hard disk drive or hard disk array, or in a database such as can be implemented by, for example, the Oracle MySQL database software. One of skill in the art will recognize that any database software that is generally available may be substituted for the Oracle MySQL database software.

Figure 23:
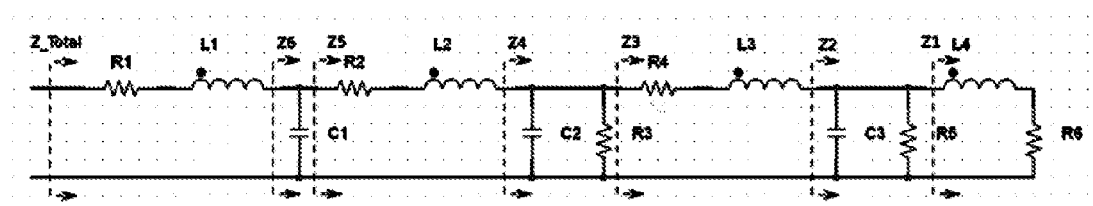
FIG. 23 is an exemplary equivalent circuit for obtaining reference impedance spectral data at a plurality of frequencies using electrical leads and an equivalent high order polynomial equation.

FIG. 23 provides an example of model analysis whereby an exemplary equivalent circuit may be obtained for a given electrical device and represented by a high order polynomial equation. As described above MATLAB's INVFREQS( ) function may be used. The electrical device, for example, may be one which does not perform in a stable condition at all times and an equivalent circuit or model may be better used than a device itself for analysis.

FIG. 24 provides an exemplary graph of training or reference group centroids for electrical devices tested by frequency analysis for impedance magnitude and phase angle for an exemplary group such as a first group G01 of electrical devices. Here, for example, peaks in magnitude of about 0.3 ohms may be seen at about 325 Hertz and 40° phase angle at 200 Hertz. Another peak in magnitude (less than 0.1 ohm) is seen at about 1000 Hertz and 10° phase angle about 900 Hertz. These centroids are used to determine a threshold for membership in a group.

FIG. 25 is representative of threshold calculation. One test sample or unknown is either a member or not of a given group. The training or reference samples are used to determine a threshold value for possible membership of an unknown or test sample in the group. In this instance, the graphs show a spread of similarity value over 0.3 to 0.65 for samples not in the group being evaluated and samples in the group are between 0.9 and 1. The threshold is selected as the value that minimizes the sum of samples not in group to the right of the threshold and samples in the group to the left of the threshold. In this example, a threshold may be selected, for example, at 0.9 for similarity value.

Now referring to FIG. 26 for scenario 1, FIG. 27 for scenario 2 and FIG. 28 for scenario 3, it may be seen that of the fourteen metrics tested, the same five metrics outperformed the others for electrical device specimens. Canberra and Manhattan hold the same top two spots but, if speed is important, it was learned that Manhattan outperforms Canberra (and has been built into the FIG. 22 flowchart). All methods performed an analysis of all samples, attempting to classify test samples to groups, and with the hardware and software used, in less than 1.5 seconds. When a test sample is classified to a group directly, per FIG. 26 and scenario 1, the next three top performers were similarity index, cosine and Euclidean (with the latter two tied at 81%). However, if an incorrectly classified value is important, it is seen from FIGS. 27 and 28 that it may be appropriate to unclassify (refuse to classify) per scenario 3 rather than suffer so many incorrectly classified under scenario 2. Worst performers were average weight, Tanimoto and modified Boolean Correlation in all three scenarios. In scenario 3, where one does not want to make a mistake in classification to a group, for example, in medical diagnostic applications, and per FIG. 28, Canberra, Manhattan, cosine and coefficient of divergence correctly classified over 50% of unknown or test samples. Of the worst performing metrics in scenario 3, inner product, average, average weight, Tanimoto and modified Boolean correlation all failed to correctly classify 10% or less of the test or unknown specimens (with average weight and modified Boolean correlation failing to correctly classify any test or unknown specimens).

A graphical user interface will now be described for a device for gathering spectral data for a spectral database including a trait that uniquely identifies each gathered spectrum such as a name or a date, time, and location gathered, collecting additional traits or properties and which also may be used to predict properties or traits and their values once an unknown specimen is classified to a reference group of a reference collection. An overview of an example of an Electrical Spectral Database (ESD) is provided in FIG. 29: Samples, Manufacturers, Sample Similarity, Traits and Signal data with exemplary parameters shown. The graphical user interface can be produced and displayed using computer software that is executing on a computer such as a desktop computer running Linux, Microsoft Windows, or Apple OS X, or on a portable spectrum analyzer running an embedded operating system, which may be based upon, for example, Linux, UNIX, or Microsoft Windows. The graphical user interface software can be implemented using any suitable language that is compatible with the operating system and hardware, such as Java, C++, C#, Python, Perl, or PUP. Other languages may be used. Samples or specimens or media may be given a sample identifier, a manufacturer identifier, a measurement device manufacturer (for example, Hewlett Packard spectrum analyzer), a measurement device model, a measurement date pursuant to ISO standard 8601, and a measurement scientist name (who took the specimen data). Samples may lead to Manufacturers where Manufacturer identifier or source provided identifier is filed. Samples may also lead to Signal Data, Sample Similarity and Traits or properties. As described above, spectral data may take many forms and equivalent formats. A given sample identifier may have a frequency value such as 1000 Hz, an S value at that frequency, a dB or decibel value, a real part, an imaginary part, a magnitude, a phase angle, a percent power delivered to load, a real S11, an imaginary S11, a real fraction, an imaginary fraction and so on. Sample Similarity may be measured by various metrics. Examples of Sample Similarity are Similarity Identifier, Sample Identifier 1 or 2, cosine angle value, Rsquare, distance normalized and/or the top five metrics mentioned above including Canberra and Manhattan. Traits may be many and various depending on specimen or media or object. The trait must be identified to a Sample Identifier, then the Trait identified and the value of the trait. For example, the sample may have a mass or a temperature or a color or a texture or other trait and a value for that trait. These may stored at the time a database is formed as traits and properties of a group member (reference collection) or be inferred from membership in a group once determined as an unknown or test specimen once allocated to a group via a selected metric and scenario.

FIG. 30 provides an example of a main graphical user interface screen for a spectral database comprising three panels from left to right and a dashboard comprising file, edit, view, tools and help. In the first column or left panel is a database explorer with folder name, import date, import user name and sample name which may be individually expanded by clicking on the + sign. The middle panel may be empty and filled later. In the "Sort by" panel, there is a metric pull down menu, a page indicator, a threshold indicator and an opportunity to rank samples, by sample and by a chosen metric.

FIG. 31 provides a select a sample view. Under Sample Name, when expanded, one may be provided with a list of samples such as M01042.txt, which is highlighted. Samples, reference or unknown, may be sequentially and automatically identified such as is shown and/or segregated as reference or unknown in the database. By highlighting and clicking, one may retrieve sample data, for example, spectral data which will appear in the middle panel of FIG. 30. It can be seen that Magnitude (and Phase angle) or alternative formats for spectral data versus frequency may be displayed, for example, in graphical or other form. The spectral data may be considered a property or trait of the given sample. In one embodiment, a sample identifier may be considered a property or trait of the specimen or media.

FIG. 32 provides a more complete view of the middle panel of FIG. 30. It also shows the resulting ranking of a selected sample M01049.txt in the right panel. FIG. 32 shows a phase angle plot versus frequency for sample M01042 while that sample turns out to be ranked first for an RSquare metric. In the right panel, there is an opportunity to pick a metric from the drop-down menu for ranking—the cursor appearing proximate to RSquare. In this example, the choices may be RSquare or Distance_Normalized. In another embodiment, the metric choices may be expanded to comprise as many as ten or fourteen metrics or the top five determined above for a given specimen category such as the electrical devices investigated above for best metrics and the like. The cursor arrow points to RSquare as the selected metric for the selected specimen M01049 which appears to be ranked number 4 in the right panel in similarity to the group centroid.

In FIG. 33, the cursor is shown proximate a page selection where, for example, one hundred samples may be displayed. FIG. 34 shows page navigation. Here, samples 1 to 200 of 2074 specimens are shown and 39 samples total are displayed.

Import of data may be performed by selecting Import from the main menu of File of the ESD Explorer of FIG. 30. A succession of screens then may be used to import data from another database. Data that has already been imported may be determined by import date or importer from the ESD left panel. For example, selecting "Import" under File may open an Import Wizard for importing files in a known manner, for example, by browsing, connecting to another database or otherwise importing data in a known manner. One of skill in the art will know that data may also be imported by capturing or acquiring the data using, for example, the hardware of a portable spectrum analyzer.

An Export Wizard is shown in FIG. 35 which is accessed by clicking Export under File in FIG. 30. For example, after selecting "Space (*.txt)," a selected sample such as M01042.txt (highlighted and indicated as selected sample) may be exported and saved. Fields and traits may be selected or added by checking a field (Fields) or naming a folder for a trait (Traits). One of skill in the art will know that data may also be exported by uploading the data to another computer using a communication link, or by writing the data to a storage medium such as a writable CD or DVD or a hard drive, which may be portable, or by transmitting the data using a data communication channel such as can be provided by a cellular modem or a wired or wireless interface card.

A Trait Manager is shown in FIG. 36, for example, selectable from a drop-down menu under Tools per FIG. 37 or actuating control T on a keyboard. Here, M06050.txt is shown highlighted and may be the sample name. The import date may be shown. A New Trait: may be defined by providing a name (or selecting from a drop down menu) and Add'ing the Trait. Examples of traits may be device manufacturer or device model number and each field may be presented, for example, as an ASCII test string or with a numerical value such as one in integer or decimal or equivalent form ($1.5 \times 10^3$ Ohms). Boxes may be clicked for deleting checked traits or committing changes or closing.

Reports may be generated, and a report generator is shown in FIG. 37 selectable under Tools as Generate Report where the cursor is shown; (control G on a keyboard). Report Generator screen FIG. 38 may provide a means for preparing a report for a particular specimen or, in this case, sample M01042.txt which may be an unknown sample missing some traits. One may check to include measured or predicted properties or traits and their values, include similarity results, provide display charts and then save (or print). In other words, while sample M01042.txt may be of unknown manufacture or source, having been matched to a group, the manufacture or source for the group may be obtained and printed of which the M01042.txt sample has been determined to be a member via the selected metric and scenario.

Applications of Metrics for Classifying Unknowns and Determining Traits

The basic components of the application of metrics for classifying unknown specimens and media using spectral properties and identifying unknown specimens and media having like spectral properties and traits involve applying a comparison of two data vectors using a method that fits the data model and shows how the samples are related. Vector comparison has been performed in many seemingly unrelated fields on different types of data. For example, in mass spectrometry, an unknown compound may be analyzed by looking at the mass to charge (m/z) ratio of the individual components creating an output graph similar to our data where peaks exist at very specific m/z values. These output graphs can then be represented as a vector of values showing the intensity at every m/z value and compared to other compounds that have been analyzed. In some methods, the spectra are reduced to a binary vector indicating whether a peak exists at a specific ratio.

Music and sound in almost all cases is digitized by analyzing the frequency and amplitude of the incoming sound waves over time. The resulting data consist of a vector of intensity values with a time constant spacing that can be displayed as a continuous waveform. The data may be compressed using methods that are well known in the art such as those that utilize wavelet or Fourier transforms. Two different people or musical instruments may make the same sound and the resulting digitized waveform will be drastically different with distinct characteristics that give them a related strength. Music enjoyed by a given individual may be stored as a reference collection and musical media compared to the reference collection to determine music similar to personal taste. In the medical arts, biological impedance tomography has been used to investigate and map the tissue composition of organisms within the medical field for many years. The impedance spectra of a tissue sample can be used to quickly identify the existence of cancerous tissue by analyzing the characteristic frequencies. Tumorous tissue exhibits a larger permittivity and conductivity than normal tissue. Following the methods discussed herein, one may analyze the complex impedance of the tissue in the frequency range of, for example, 1.5-700 kHz and diagnose cancerous tissue. Words, phrases, sentences, or entire documents can be compared and evaluated for a degree of similarity using many of the techniques disclosed herein. A word could be represented as a vector of ASCII numerical values or as a 26 element vector with the frequency of each letter. Words can be represented in compressed forms using, for example, word frequency tables and known methods of coding. Documents can be represented as a multi-dimensional vector, the size of a dictionary, with each element representing the frequency of the existence of the dictionary word in the document. The classification of plants and animals into categories, or taxa, with other plants or animals that share like characteristics can be modeled as a vector of traits with the most similar beings having similar vectors. Similarity measures can be used to compare spectra acquired through remote sensing operations to determine the surface composition and properties. Several spectral measures may be used to compare imagery data to known samples including spectral angle, Euclidean distance, and spectral correlation.

All United States and foreign patents and articles whose citations are provided above should be deemed to be incorporated by reference as to their entire contents for the purposes of understanding the underlying technology behind an embodiment of a method and apparatus for classifying specimens and media using spectral properties and identifying unknown specimens and media having like spectral properties and traits. The embodiments of a method and apparatus for predicting properties or traits and their values using similarity-based information retrieval and modeling described above including attributing traits between reference specimens of reference groups of at least one reference collection, for example, by evaluating similarity of spectral data of unknown specimens with different traits should only be deemed to be limited by the scope of the claims which follow.

PARTIAL BIBLIOGRAPHY

K. Anchukaitis and S. P. Horn, "A 2000-year reconstruction of forest disturbance from southern Pacific Costa Rica, Palaeogeography, Palaeoclimatology, Palaeoecology 221 (2005), pp. 35-54.

F. Aurenhammer, "Voronoi diagrams: a survey of a fundamental geometric data structure," *ACM Comp. Surveys (CSUR)*, 23 (3) 1991, pp. 345-405.

Bengea et al., "Optimal Control of Switching Systems," *Automatica* 41, (2005), pp. 11-27.

Bengea et al., "Optimal and Suboptimal Control of Switching Systems, *Proceedings of the 42$^{nd}$ IEEE Conference on Decision and Control,* (2003), pp. 5295-5300.

S. Benson, C. Lennard, P. Maynard, and C. Roux, "Forensic applications of isotope ratio mass spectrometry—a review," *Forensic Science International* 157, (2006), pp. 1-22.

J. D. Birdwell and B. C. Moore, chapter title: "Condensation of Information from Signals for Process Modeling and Control," *Hybrid Systems II*, Springer, Berlin/Heidelberg, 1995, pp. 45-63.

S. Boyd et al., *Linear Matrix Inequalities in System and Control Theory*, Society for Industrial Mathematics (1997), ISBN 978-0898714852.

S. P. Boyd et al., "A new CAD method and associated architectures for linear controllers," *IEEE Transactions on Automatic Control,* 33 (1988), pp. 268-283.

W. A. Burkhard and R. M. Keller, "Some approaches to best-match file searching," *Comm. ACM,* 16 (4) 1973, pp. 230-236.

R. C. Elston and J. Stewart, *A General Model for the Genetic Analysis of Pedigree Data, Human Heredity* 21 (1971), pp. 523-542.

C. E. Garcia and A. M. Morshedi, "Quadratic programming solution of dynamic matrix control (QDMC), *Chemical Engineering Communications,* 46 (1986), pp. 73-87.

D. G. Gavin, W. W. Oswald, E. R. Wahl, and J. W. Williams, "A statistical approach to evaluating distance metrics and analog assignments for pollen records," Quaternary Research, vol. 60, pp. 356-367, November 2003.

K. A. Haberyan, S. P. Horn, and B. F. Cumming, "Diatom assemblages from Costa Rican lakes: An initial ecological assessment," *Journal of Paleolimnology* 17 (1997), pp. 263-274.

Z. Huang, "Extensions to the k-means Algorithm for Clustering Large Data Sets with Categorical Values," *Data Mining and Knowledge Discovery* 2, (1998), pp. 283-304.

P. Jaccard, "Distribution de la fibre alpine dans le bassin des dranses et dans quelques regions voisines," Bulletin de la Socit Vaudoise des Sciences Naturelles, vol. 37, pp. 241-272, 1901.

L. M. Kennedy, S. P. Horn, and K. H. Orvis, "A 4000-yr record of fire and forest history from Valle de Bao, Cordillera Central, Dominican Republic," Palaeogeography, Palaeoecology, Palaeoclimatology 231 (1996), pp. 279-290.

L. M. Kennedy, S. P. Horn, and K. H. Orvis, "Modern pollen spectra from the highlands of the Cordillera Central, Dominican Republic," *Review of Palaeobotany and Palynology* 137 (2005), pp. 51-68.

W. L. G. Koontz, P. M. Narendra, and K. Fukunaga, "A branch and bound clustering algorithm," *IEEE Trans. Comp., C* 24, 1975, pp. 908-915.

D. A. Korejwo, J. B. Webb, D. A. Willard, and T. P. Sheehan, "Pollen analysis: An underutilized discipline in the U.S. forensic science community," Trace Evidence Symposium, National Institute of Justice, Aug. 13-16, 2007, Clearwater Beach, Fla.

G. N. Lance and W. T. Williams, "Computer programs for hierarchical polythetic classification ("similarity analyses")," Computer Journal, vol. 9, pp. 60-64, 1966.

J. O. Lay, M. L. Gross, J. J. Zwinselman, and N. M. M. Nibbering, "A field ionization and collisionally activated dissociation/charge stripping study of some [C9H10]+ ions," Organic Mass Spectrometry, vol. 18, no. 1, pp. 16-21, 1983.

M. Leira and S. Sabater, "Diatom assemblages distribution in catalan rivers, NE Spain, in relation to chemical and physiographical factors," Water Research 39 (2005), pp. 73-82.

P. C. Mahalanobis, "On the generalised distance in statistics," Proceedings of the National Institute of Science, India, vol. 2, pp. 49-55, April 1936.

M. McGill, "An evaluation of factors affecting document ranking by information retrieval systems," tech. rep., Syracuse Univ., N.Y. School of Information Studies, October 1979.

L. A. Milne, V. M. Bryant Jr., and D. C. Mildenhall, "Forensic palynology," in Forensic Botany: Principles and Applications to Criminal Casework, H. M. Coyle (ed.), CRC Press, Boca Raton, Fla., 2005, pp. 217-252.

B. Moerdyk et al., "Hybrid optimal control for load balancing in a cluster of computer nodes," *Proc. of the 2006 IEEE Int. Conf on Control Applications* (2006), pp. 1713-1718.

M. Morari and J. H. Lee, "Model predictive control: past, present and future," *Computers and Chemical Engineering* 23 (1999), pp. 667-682.

T. Noreault, M. McGill, and M. B. Koll, "A performance evaluation of similarity measures, document term weighting schemes and representations in a boolean environment," in Proceedings of the 3rd annual ACM conference on Research and development in information retrieval, (Cambridge, England), pp. 57-76, June 1980.

A. Oakly, "A Database Management System for Vision Applications," *Proceedings of the Conference on British Machine Vision*, vol. 2, (1994), pp. 629-639.

J. T. Overpeck, T. Webb, and I. C. Prentice, "Quantitative interpretation of fossil pollen spectra: Dissimilarity coefficients and the method of modern analogs," Quaternary Research, vol. 23, pp. 87-108, January 1985.

Y. Pan, *Image Segmentation using PDE, Variational, Morphological and Probabilistic Methods*, PhD Dissertation, Electrical Engineering, University of Tennessee, December, 2007.

Y. Pan, J. D. Birdwell and S. M. Djouadi, "Preferential image segmentation using trees of shapes," *IEEE Trans. Image Processing,* 18 (2009), pp. 854-866.

M. H. Plawecki et al., "Improved transformation of morphometric measurements for a priori parameter estimation in a physiologically-based pharmacokinetic model of ethanol," *Biomed Signal Process Control* 2 (2007), pp. 97-110.

E. Puryear, D. Angulo, A. Schilling, K. Drew, and G. von Laszewski, "Comparing mass spectra."

J. Ross Quinlan, "Induction of decision trees," *Machine Learning* 1, (1986), pp. 81-106.

K. Reitsma and J. Sagalyn, "Correlation measures," Information Storage and Retrieval, vol. 13, p. Ch. IV, 1967. vol. 13, p. Ch. IV, 1967.

D. J. Rogers and T. T. Tanimoto, "A computer program for classifying plants," Science, vol. 132, no. 3434, pp. 1115-1118, 1960.

W. K. H. Sager and P. C. Lockemann, "Classification of ranking algorithms," International Forum on Information and Documentation, vol. 1, no. 1, pp. 41-46, 1976.

C. Shen, K.-B. Liu, L. Tang, and J. T. Overpeck, "Numerical analysis of modern and fossil pollen data from the Tibetan Plateau," *Annals of the Association of American Geographers* 98 (2008), pp. 755-772.

Z. Shen, *Database Similarity Search in Metric Spaces: Limitations and Opportunities*, MS Thesis, Electrical Engineering, University of Tennessee, August, 2004.

P. H. A. Sneath and R. R. Sakai, Numerical Taxonomy: The Principles and Practice of Numerical Classification. W H Freeman & Co (Sd), June 1973.

T. T. Tanimoto, "IBM internal report," tech. rep., November 1957.

W. S. Torgerson, *Theory and Methods of Scaling*, R. E. Krieger Pub. Co., 1958.

T. Tou and R. C. Gonzalez, *Pattern Recognition Principles*, Addison-Wesley, Reading, Mass., 1992.

K. X. Wan, I. Vidaysky, and M. L. Gross, "Comparing similar spectra: From similarity index to spectral contrast angle," Journal of The American Society for Mass Spectrometry, vol. 13, pp. 85-88, 2002.)

S. Wei et al., "Applications of numerical optimal control to nonlinear hybrid systems," *Nonlinear Analysis Hybrid Systems* 1 (2007), pp. 264-279.

P. Yianilos, "Data structures and algorithms for nearest neighbor search in general metric spaces," *Proc. of the 4th Annual ACM-SIAM Symp. On Discrete Algorithms*, Austin, Tex., 1993, pp. 311-321.

What we claim is:

1. A computer-implemented method of determining a similarity metric for use in classifying an unknown specimen having spectral data to a reference group of a plurality of different reference groups of a reference collection of specimens having spectral data of a spectral database and storing a trait of the unknown specimen in the spectral database, the method comprising:

reducing a dimension of input spectral data of the spectral database of the reference collection using a data processor;

storing a first input trait of the unknown specimen in memory;

receiving an input selecting a similarity metric of a plurality of different similarity metrics to classify the unknown specimen to the reference group of the reference collection of specimens, wherein the similarity metric is selected as one of Manhattan, Canberra, similarity index, cosine and Euclidean distance;

determining at least one similarity threshold value associated with the spectral data of the reference group of the reference collection via the data processor responsive to the selected similarity metric for classifying the unknown specimen to the reference group of the reference collection of specimens; and predicting a value of a second different trait of the unknown specimen by determining membership of the unknown specimen in the reference group of the reference collection of specimens, the spectral database storing the second different trait of the reference group of specimens for output once membership of the unknown specimen in the reference group is determined by the data processor.

2. The method of claim 1 further comprising calculating a centroid for the reference group and receiving an input selecting one of three scenarios, a first scenario comprising classifying the unknown specimen to the reference group regardless of threshold value; a second scenario comprising classifying the unknown specimen to the reference group using the threshold value and a third scenario wherein the unknown specimen remains unclassified if the threshold value is met for two different reference groups.

3. The method of claim 1 with the data processor determining a most similar reference group to the unknown specimen using search manager apparatus being coupled to the spectral database, the spectral database comprising a data processor and memory, to predict a further different trait of the unknown specimen.

4. The method of claim 1 wherein the dimension reduction comprises binning by spectral frequency.

5. The method of claim 1 further comprising associating a stored trait and trait value of the unknown specimen with the reference group of specimens of the reference collection to which the unknown specimen has been classified as a member.

6. The method of claim 1 further comprising fitting input spectral data comprising magnitude at a frequency to a circuit model for the unknown specimen to obtain a transfer function using the data processor.

7. The method of claim 2 further comprising iteratively receiving spectral data corresponding to a further unknown specimen, comparing spectral data of the further unknown specimen to spectral data of the plurality of different reference groups of the reference collection according to the selected similarity metric and scenario, allocating the further unknown specimen to a reference group according to the selected metric and scenario and storing the received spectral data in the spectral database for the classified reference group.

8. Apparatus for performing a computer-implemented method of determining a similarity metric for use in classifying an unknown specimen to a reference group of a plurality of different reference groups of a reference collection of spectral data for reference specimens in a spectral database and predicting a value of a trait of the unknown specimen, the apparatus comprising:

a data processor for reducing a dimension of input spectral data of the spectral database; for receiving input for selecting a similarity metric of a plurality of different similarity metrics to classify the unknown specimen to the reference group of specimens; determining a threshold responsive to the selected metric for classifying the unknown specimen to the reference group of specimens; and predicting the value of a trait of the unknown specimen by determining membership of the unknown specimen in the reference group of specimens the spectral database storing a value of a trait of the reference group of electrical device specimens in the spectral database memory for output once membership of the unknown specimen in the reference group is determined by the data processor according to a similarity threshold; and a spectrum analyzer for collecting spectral data over a frequency range for input to the spectral database of the spectral database memory of the data processor, the input spectral data comprising a magnitude for each frequency for which spectral data are collected.

9. The apparatus of claim 8 further comprising:
a graphical user interface for receiving input for associating a trait with an electrical device specimen.

10. The apparatus of claim 9 wherein the trait of the specimen comprises two of identification data, a manufacturer, a location, a temperature, a color, an impedance and a date and time of day of specimen collection.

11. The apparatus of claim 8 further comprising a graphical user input for receiving data import and export input as a file selection.

12. The apparatus of claim 8 further comprising a communications interface to a different database than the spectral database of the spectral database memory of the data processor, the communications interface for importing from or exporting data to the different database.

13. The apparatus of claim 11 wherein imported data comprise different trait data for a reference specimen.

14. A computer implemented method for classifying an unknown specimen having spectral data to a reference group of a plurality of different reference groups of a reference collection of specimens of a reference spectral database of a data processor, a reference specimen having a first trait, the method comprising:
storing measured spectral data for a reference group of a plurality of different groups of reference specimens in said reference spectral database of data processor memory, each reference spectral data specimen of the spectral database comprising spectral data of magnitude at a frequency and a value for the first trait associated with the reference group of the spectral database;
generating, an index for the spectral database having data objects, each data object comprising a vector of attributes the attributes comprising one of real and imaginary parts, frequency, magnitude and base phase angle and equivalent means for defining a spectral vector;
determining a similarity threshold for membership in the reference group of reference specimens using a selected metric of a plurality of different similarity metrics,
classifying the unknown specimen having a different trait as belonging to the reference group of the reference spectral database using the selected similarity metric of the plurality of different similarity metrics;
and associating the different trait of the unknown specimen as belonging to the group of reference specimens having the first trait.

15. The computer implemented method of claim 14 further comprising receiving an input selecting one of three scenarios, a first scenario comprising classifying an unknown specimen to the reference group regardless of the threshold; a second scenario comprising classifying the unknown specimen to the reference group using the threshold and a third scenario wherein the unknown specimen remains unclassified if the threshold is met for two different reference groups.

16. The computer implemented method of claim 14 wherein the selected similarity metric is one of Manhattan, Canberra, similarity index, cosine and Euclidean distance.

17. The computer implemented method of claim 14 further comprising reducing a dimension of the input spectral data, the dimension reduction comprising binning by spectral frequency.

18. A computer-implemented method of determining a similarity metric for use in classifying an unknown specimen having spectral data to a reference group of a plurality of different reference groups of a reference collection of specimens having spectral data of a spectral database and storing a trait of the unknown specimen in the spectral database, the method comprising:
reducing a dimension of input spectral data of the spectral database of the reference collection using a data processor, the dimension reduction comprising principal component analysis;
storing a first input trait of the unknown specimen in memory;
receiving an input selecting a similarity metric of a plurality of different similarity metrics to classify the unknown specimen to the reference group of the reference collection of specimens;
determining at least one similarity threshold value associated with the spectral data of the reference group of the reference collection via the data processor responsive to the selected similarity metric for classifying the unknown specimen to the reference group of the reference collection of specimens; and
predicting a value of a second different trait of the unknown specimen by determining membership of the unknown specimen in the reference group of the reference collection of specimens, the spectral database storing the second different trait of the reference group of specimens for output once membership of the unknown specimen in the reference group is determined by the data processor.

19. The computer implemented method of claim 18 wherein said principal component analysis comprises singular value decomposition.

20. A computer implemented method for classifying an unknown specimen having spectral data to a reference group of a plurality of different reference groups of a reference collection of specimens of a reference spectral database of a data processor, a reference specimen having a first trait, the method comprising:
storing measured input spectral data for a reference group of a plurality of different groups of reference specimens in said reference spectral database of data processor memory, each reference spectral data specimen of the spectral database comprising spectral data of magnitude at a frequency and a value for the first trait associated with the reference group of the spectral database;
reducing a dimension of the input spectral data, the dimension reduction comprising binning by spectral frequency;
determining a similarity threshold for membership in the reference group of reference specimens using a selected metric of a plurality of different similarity metrics,
classifying the unknown specimen having a different trait as belonging to the reference group of the reference spectral database using the selected similarity metric of the plurality of different similarity metrics;
and associating the different trait of the unknown specimen as belonging to the group of reference specimens having the first trait.

21. A computer implemented method for classifying an unknown specimen having spectral data to a reference group of a plurality of different reference groups of a reference collection of specimens of a reference spectral database of a data processor, a reference specimen having a first trait, the method comprising:
storing measured input spectral data for a reference group of a plurality of different groups of reference specimens in said reference spectral database of data processor memory, each reference spectral data specimen of the spectral database comprising spectral data of magnitude at a frequency and a value for the first trait associated with the reference group of the spectral database;

reducing a dimension of the input spectral data, the dimension reduction comprising utilizing a projection selected to reveal structure inherent in the spectral data;

determining a similarity threshold for membership in the reference group of reference specimens using a selected metric of a plurality of different similarity metrics, classifying the unknown specimen baying a different trait as belonging to the reference group of the reference spectral database using the selected similarity metric of the plurality of different similarity metrics;

and associating the different trait of the unknown specimen as belonging to the group of reference specimens having the first trait.

22. The computer implemented method of claim 21 wherein said projection is also selected to optimize a variancexentropy function.

23. The computer implemented method of claim 21 wherein said projection is selected using a projection search method.

24. The computer implemented method of claim 23 wherein said projection search method comprises simulated annealing.

* * * * *